United States Patent
Enda et al.

(10) Patent No.: US 8,319,906 B2
(45) Date of Patent: Nov. 27, 2012

(54) ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, ACTIVE MATRIX SUBSTRATE MANUFACTURING METHOD, AND LIQUID CRYSTAL PANEL MANUFACTURING METHOD

(75) Inventors: Kenji Enda, Osaka (JP); Ikumi Itsumi, Osaka (JP); Toshihide Tsubata, Osaka (JP); Masanori Takeuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 444 days.

(21) Appl. No.: 12/525,764

(22) PCT Filed: Oct. 29, 2007

(86) PCT No.: PCT/JP2007/070987
§ 371 (c)(1),
(2), (4) Date: Jan. 28, 2010

(87) PCT Pub. No.: WO2008/096483
PCT Pub. Date: Aug. 14, 2008

(65) Prior Publication Data
US 2010/0141849 A1   Jun. 10, 2010

(30) Foreign Application Priority Data

Feb. 9, 2007   (JP) ................................ 2007-031238
Jun. 28, 2007   (JP) ................................ 2007-171276

(51) Int. Cl.
*G02F 1/1362* (2006.01)
(52) U.S. Cl. ............ 349/43; 349/48; 349/143; 349/144; 349/192
(58) Field of Classification Search ........................ None
See application file for complete search history.

(56) References Cited

U.S. PATENT DOCUMENTS

| 4,890,097 A | 12/1989 | Yamashita et al. |
| 4,902,638 A | 2/1990 | Muto |
| 4,907,861 A | 3/1990 | Muto |

(Continued)

FOREIGN PATENT DOCUMENTS

EP   0 458 173 A2   11/1991

(Continued)

OTHER PUBLICATIONS

English International Search Report for PCT/JP2007/070987 mailed Jan. 22, 2008.

(Continued)

*Primary Examiner* — Mike Stahl
(74) *Attorney, Agent, or Firm* — Nixon & Vanderhye P.C.

(57) ABSTRACT

A scanning signal line (16) includes an opening (29) leading from the outside of a pixel region through below a data signal line (15) into the pixel region, and first and second scanning electrode portions (16a/16b) or two side portions of the opening confronting in a column direction through that opening. The end portion of the first scanning electrode portion (16a) in the pixel region is a first end portion (EP1), and the end portion of the second scanning electrode portion (16b) in the pixel region is a second end portion (EP2). A first transistor has a source electrode (9a) and a drain electrode (8a) individually overlapping the first electrode portion (16a) but not the first end portion (EP1) in the pixel region. A second transistor has a source electrode (9b) and a drain electrode (8b) individually overlapping the second electrode portion (16b) but not the second end portion EP2) in the pixel region. According to the aforementioned constitution, it is possible to realize a pixel split type active matrix substrate capable of easily correcting the short-circuits of the data signal line (15) and the scanning signal line (16).

52 Claims, 33 Drawing Sheets

U.S. PATENT DOCUMENTS

| | | | |
|---|---|---|---|
| 5,097,297 A | 3/1992 | Nakazawa | |
| 5,303,074 A | 4/1994 | Salisbury | |
| 5,897,182 A * | 4/1999 | Miyawaki | 349/43 |
| 6,548,831 B1 * | 4/2003 | Tokuhiro et al. | 257/72 |
| 7,579,201 B2 * | 8/2009 | Kim et al. | 438/30 |
| 8,023,054 B2 * | 9/2011 | Cho | 349/43 |
| 2004/0001167 A1 | 1/2004 | Takeuchi et al. | |
| 2006/0097972 A1 | 5/2006 | Takeuchi et al. | |
| 2009/0021658 A1 | 1/2009 | Takeuchi et al. | |
| 2009/0115708 A1 * | 5/2009 | Sagawa et al. | 345/76 |
| 2009/0262274 A1 | 10/2009 | Noda et al. | |
| 2009/0268119 A1 * | 10/2009 | Lee et al. | 349/54 |
| 2010/0109989 A1 * | 5/2010 | Itsumi et al. | 345/87 |
| 2010/0245679 A1 * | 9/2010 | Shohraku | 348/731 |

FOREIGN PATENT DOCUMENTS

| | | | |
|---|---|---|---|
| JP | 63-221325 A * | 9/1988 | |
| JP | 05-232503 | 9/1993 | |
| JP | 6-208130 A * | 7/1994 | |
| JP | 11-119253 | 4/1999 | |
| WO | WO 2006/064789 | 6/2006 | |
| WO | WO 2007/043399 A1 * | 4/2007 | |

OTHER PUBLICATIONS

U.S. Appl. No. 12/532,700, filed Sep. 23, 2009, entitled "Active Matrix Substrate, Liquid Crystal Panel, Liquid Crystal Display Unit, Liquid Crystal Display Device, Television Receiver, and Method of Manufacturing Liquid Crystal Panel".

Supplementary EP Search Report mailed Apr. 1, 2010 in corresponding EP application 07830721.2.

Office Action from U.S. Appl. No. 12/532,700 mailed Jul. 12, 2012; ITSUMI.

* cited by examiner

LASER IRRADIATION

LASER IRRADIATION

ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, ACTIVE MATRIX SUBSTRATE MANUFACTURING METHOD, AND LIQUID CRYSTAL PANEL MANUFACTURING METHOD

This application is the U.S. national phase of International Application No. PCT/JP2007/070987 filed 29 Oct. 2007, which designated the U.S. and claims priority to JP Application Nos. 2007-031238 filed 9 Feb. 2007; and 2007-171276 filed 28 Jun. 2007, the entire contents of each of which are hereby incorporated by reference.

TECHNICAL FIELD

The present invention relates to an active matrix substrate and a liquid crystal panel, capable of repairing defect in wires.

BACKGROUND ART

A liquid crystal display device has outstanding features such as high definition, reduced thickness, a low consumption of electricity and other features. In recent years, the market size of the liquid crystal display device has been rapidly expanding. For example, Patent Literature 1 discloses a liquid crystal display device in a pixel segmentation (multi pixel drive) system which includes a plurality of pixel electrodes in one pixel. The liquid crystal display device in the pixel segmentation system is capable of having regions with different luminance in one pixel. As a result, view angle dependency of a γ property (a difference between a γ property at a time when the liquid crystal display device is observed from front and a γ property at a time when the liquid crystal display device is observed from an oblique angle) is improved.

Meanwhile, Patent Literature 2 discloses a configuration of a liquid crystal display device in the pixel segmentation system in which a wiring defect can be repaired. This configuration is illustrated in FIG. 39. As illustrated in FIG. 39, the liquid crystal display device includes an active matrix substrate 700 including scanning signal lines 702 and data signal lines 703 which intersect with each other, and pixels, which each pixel includes a first transistor 707a, a second transistor 707b, a first pixel electrode 705a, a second pixel electrode 705b, a first retention capacity wire 712a, a second retention capacity wire 712b, a first drain drawing wire 711a, a second drain drawing wire 711b, a first drain drawing electrode 713a, and a second drain drawing electrode 713b. The first transistor 707a includes a source electrode 709a, a drain electrode 710a, and a gate electrode 708a drawn from the scanning signal line 702, and the second transistor 707b includes a source electrode 709b, a drain electrode 710b and a gate electrode 708b drawn from the scanning signal line 702.

The source electrode 709a of the first transistor and the source electrode 709b of the second transistor are connected to the data signal line 703. The drain electrode 710a of the first transistor is connected to the first drain drawing electrode 713a via the first drain drawing wire 711a. The drain drawing electrode 713a and the first pixel electrode 705a are connected together via a contact hole. Furthermore, the first drain drawing electrode 713a and an apron section 714a of the first retention capacity wire 712a provides a retention capacity. Similarly, the drain electrode 710b of the second transistor is connected to the second drain drawing electrode 713b via the second drain drawing wire 711b, and this second drain drawing electrode 713b is connected to the second pixel electrode 705b via a contact hole. Furthermore, the second drain drawing electrode 713b and an apron section 714b of the second retention capacity wire 712b provides a retention capacity.

In this configuration, the first pixel electrode 705a and the second pixel electrode 705b receive the same signal potential. However, by separately controlling potentials of the first retention capacity wire 712a and the second retention capacity wire 712b, the first pixel electrode 705a and the second pixel electrode 705b may have different potentials from each other. This makes it possible to have regions of different luminance in one pixel.

In the active matrix substrate 700, an opening 715 is provided on the scanning signal line 702 in such a manner as to be positioned between the gate electrode 708a of the first transistor and the gate electrode 708b of the second transistor. Therefore, when the scanning signal line 702 and the data signal line 703 get short-circuited (so-called SG leakage) at an intersection 720 of the scanning signal line 702 and the data signal line 703, repairing is carried out in such a manner that the data signal line 703 is cut at a region 722 above the opening 715 and at a portion 723 adjacent to the first pixel electrode 705a, and a signal potential is supplied from the opposite side of the data signal line 703 by means of an auxiliary wire etc (not shown). This allows driving the second transistor 707b, repairing the SG leakage.

CITATION LIST

Patent Literature 1

Japanese Patent Application Publication, Tokukai, No. 2004-78157 A (Publication Date: Mar. 11, 2004)

Patent Literature 2

International Publication WO2006/064789 (Publication Date: Jun. 22, 2006)

SUMMARY OF INVENTION

However, in the liquid crystal display device of Patent Literature 2, when SG leakage occurs, an auxiliary wire must be connected with both ends of the data signal line where the SG leakage occurs, which is troublesome. In addition, connecting the auxiliary wire results in further load. On the other hand, repairing without using the auxiliary wire requires a source driver to be configured such that a signal potential can be supplied from both ends of the data signal line. Further, in a case of an active matrix substrate without the auxiliary wire or the source driver configured as above, when SG leakage occurs, it cannot be repaired, which results in a defective product.

The present invention was made in view of the foregoing problems. An object of the present invention is to provide an active matrix substrate in a pixel segmentation system, capable of easily repairing a short-circuit between a data signal line and a scanning signal line.

An active matrix substrate of the present invention includes: scanning signal lines each extending in a row direction (e.g. extending in a row direction so as to cross individual pixel regions); data signal lines each extending in a column direction (e.g. extending in a column direction so as to be along individual pixel regions); and pixel regions each including a first transistor and a second transistor that are connected with a same data signal line, a first pixel electrode connected with the first transistor, and a second pixel electrode connected with the second transistor, each of the scanning signal lines including an opening extending from outside a pixel region into the pixel region by crossing under a data signal line, and a first scanning electrode section and a second scanning electrode section that are provided on respective sides adjacent to the opening in such a manner that the first scanning electrode section and the second scanning electrode section face each other in a column direction with the opening therebetween, a source electrode and a drain electrode of the first transistor being provided so as to overlap the first scanning electrode section and not to overlap a first end portion in the pixel region, and a source electrode and a drain electrode of the second transistor being provided so as to overlap the second scanning electrode section and not to overlap a second end portion in the pixel region, the first end portion being an end portion within the pixel region out of two end portions of the first scanning electrode section in a row direction and the second end portion being an end portion within the pixel region out of two end portions of the second scanning electrode section in a row direction.

The present active matrix substrate is designed such that when a short-circuit occurs between the data signal line and the first scanning electrode section, an electrode is cut at the first end portion and an end portion in the pixel region out of two end portions of the first scanning electrode section in a row direction (third end portion), and thus the first scanning electrode section is separated (cut) from the scanning signal line. This allows a signal potential to be supplied from the data signal line to the second transistor and subsequent transistors, without using an auxiliary line etc. Since the present active matrix substrate is designed such that the source electrode and the drain electrode of the first transistor do not overlap the first end portion, it is possible to easily and surely cut an electrode at the first end portion.

When a short-circuit occurs between the data signal line and the second scanning electrode section, an electrode is cut at the second end portion and an end portion outside the pixel region out of two end portions of the second scanning electrode section in a row direction (fourth end portion), and thus the second scanning electrode section is separated (cut) from the scanning signal line. This allows a signal potential to be supplied from the data signal line to the first transistor and transistors subsequent to the second transistor, without using an auxiliary line etc. Since the present active matrix substrate is designed such that the source electrode and the drain electrode of the second transistor do not overlap the second end portion, it is possible to easily and surely cut an electrode at the second end portion.

As described above, with the present active matrix substrate, it is possible to repair a defect in wiring (SG leakage) without using an auxiliary line etc. Therefore, application of the present configuration to an active matrix substrate with an auxiliary line allows repairing SG leakage without the step of connecting both ends of a data signal line with the auxiliary line, and further allows avoiding the increase in load caused by connection with the auxiliary line. Application of the present configuration to an active matrix substrate without an auxiliary line allows an active matrix substrate that has been so far regarded as defective due to SG leakage to be made an acceptable product, thereby increasing the yielding ratio. These effects are particularly evident when the present configuration is applied to a large liquid crystal panel.

The active matrix substrate of the present invention may be arranged so that a first drain drawing line is drawn from the drain electrode of the first transistor in such a manner as not to overlap the first end portion, and a second drain drawing line is drawn from the drain electrode of the second transistor in such a manner as not to overlap the second end portion, and the first drain drawing line is connected with the first pixel electrode and the second drain drawing line is connected with the second pixel electrode.

It is preferable to arrange the active matrix substrate of the present invention so that the opening has a rectangular shape extending in a row direction. This allows individual scanning electrode sections to have a shape extending in a row direction, allowing individual widths (lengths in a row direction) of the first to fourth end portions to be suitable for cutting.

It is preferable to arrange the active matrix substrate of the present invention so that a part of each of the first end portion and the second end portion is a notch section (incised section). Similarly, It is preferable to arrange the active matrix substrate of the present invention so that a part of each of the third end portion and the fourth end portion is a notch section. This makes the cutting step at individual end portions easier.

The active matrix substrate of the present invention may be arranged so that an electrode extending from a data signal line serves as a source electrode that is common between the first transistor and the second transistor. This allows reducing the width of the scanning signal line in the pixel region, thereby increasing an opening ratio.

It is preferable to arrange the active matrix substrate of the present invention so that the electrode extending from the data signal line overlaps the opening. This allows reducing parasitic capacitance between the gate electrode (scanning signal line) and the source electrode.

The active matrix substrate of the present invention may be arranged so that a first electrode serving as a source electrode of the first transistor, a second electrode serving as a source electrode of the second transistor, and a third electrode serving as a source electrode common between the first transistor and the second transistor extend from the data signal line in a row direction, and a drain electrode of the first transistor is provided between the first electrode and the third electrode, and a drain electrode of the second transistor is provided between the third electrode and the second electrode.

With the arrangement, the first electrode and the third electrode serve as the source electrode of the first transistor, and the third electrode and the second electrode serve as the source electrode of the second transistor. As described above, providing a channel at both ends of the drain electrode of each transistor allows reducing the channel width, thereby preventing a short-circuit between a source and a drain.

An active matrix substrate of the present invention may be arranged so as to include: scanning signal lines each extending in a row direction (e.g. extending in a row direction so as to cross individual pixel regions); data signal lines each extending in a column direction (e.g. extending in a column direction so as to be along individual pixel regions); and pixel regions each including a first transistor and a second transistor that are connected with a same data signal line, a first pixel electrode connected with the first transistor, and a second pixel electrode connected with the second transistor, each of the scanning signal lines including an opening extending from outside a pixel region into the pixel region by crossing under a data signal line, and a first scanning electrode section and a second scanning electrode section that are provided on respective sides adjacent to the opening in such a manner that the first scanning electrode section and the second scanning electrode section face each other in a column direction with the opening therebetween, a first gate extending section being drawn from the first scanning electrode section in a direction away from the opening in the pixel region, and a second extending section being drawn from the second scanning electrode section in a direction away from the opening in the pixel region, a source electrode and a drain electrode of the first transistor being provided so as to overlap the first gate extending section and not to overlap a first end portion, and a source electrode and a drain electrode of the second transistor being provided so as to overlap the second gate extending section and not to overlap a second end portion, the first end portion being an end portion within the pixel region out of two end portions of the first scanning electrode section in a row direction and the second end portion being an end portion within the pixel region out of two end portions of the second scanning electrode section in a row direction.

An active matrix substrate, comprising: scanning signal lines each extending in a row direction (e.g. extending in a row direction so as to cross individual pixel regions); data signal lines each extending in a column direction (e.g. extending in a column direction so as to be along individual pixel regions); and pixel regions each including a first transistor and a second transistor that are connected with a same data signal line, a first pixel electrode connected with the first transistor, and a second pixel electrode connected with the second transistor, each of the scanning signal lines including a first opening extending from outside a pixel region into the pixel region by crossing under a data signal line, a second opening positioned side by side with respect to the first opening in a row direction, a bridging electrode section positioned on a space between the first opening and the second opening, and a first scanning electrode section and a second scanning electrode section that are provided on respective sides adjacent to a wormhole region consisting of the first opening, the second opening, and the bridging electrode section in such a manner that the first scanning electrode section and the second scanning electrode section sandwich the wormhole region in a column direction, a source electrode and a drain electrode of the first transistor being provided so as to overlap the first scanning electrode section and not to overlap a first end portion in the pixel region, and a source electrode and a drain electrode of the second transistor being provided so as to overlap the second scanning electrode section and not to overlap a second end portion in the pixel region, the first end portion being an end portion within the pixel region out of two end portions of the first scanning electrode section in a row direction and the second end portion is a portion within the pixel region out of two end portions of the second scanning electrode section in a row direction.

The present active matrix substrate is designed such that when a short-circuit occurs between the data signal line and the first scanning electrode section, an electrode is cut at the first end portion, an end portion outside the pixel region out of two end portions of the first scanning electrode section in a row direction (third end portion), and the bridging electrode section, and thus the first scanning electrode section is separated (cut) from the scanning signal line.

The present active matrix substrate is designed such that when a short-circuit occurs between the data signal line and the second scanning electrode section, an electrode is cut at the second end portion, an end portion outside the pixel region out of two end portions of the second scanning electrode section in a row direction (fourth end portion), and the bridging electrode section, and thus the second scanning electrode section is separated (cut) from the scanning signal line.

As described above, with the present active matrix substrate, it is possible to repair a defect in wiring (SG leakage) without using an auxiliary line etc. Therefore, application of the present configuration to an active matrix substrate with an auxiliary line allows repairing SG leakage without the step of connecting both ends of a data signal line with the auxiliary line, and further allows avoiding the increase in load caused by connection with the auxiliary line. Application of the present configuration to an active matrix substrate without an auxiliary line allows an active matrix substrate that has been so far regarded as defective due to SG leakage can be made an acceptable product, thereby increasing the yielding ratio. These effects are particularly evident when the present configuration is applied to a large liquid crystal panel.

Further, the active matrix substrate with this configuration is designed such that the first opening and the second opening are positioned side-by-side with the bridging electrode therebetween (opening is divided by the bridging electrode), it is possible to reduce the width (length in a row direction) of each opening, compared with the configuration in which one opening with a large size is provided. Consequently, even when the active matrix substrate is enlarged and the size of individual pixel regions is larger, it is possible to use the opening (edge thereof) of the scanning signal line for positioning of layers etc., which is convenient.

An active matrix substrate of the present invention may be arranged so as to include: scanning signal lines each extending in a row direction (e.g. extending in a row direction so as to cross individual pixel regions); data signal lines each extending in a column direction (e.g. extending in a column direction so as to be along individual pixel regions); and pixel regions each including a first transistor and a second transistor that are connected with a same data signal line, a first pixel electrode connected with the first transistor, and a second pixel electrode connected with the second transistor, each of the scanning signal lines including a first opening extending from outside a pixel region into the pixel region by crossing under a data signal line, a second opening positioned side by side with respect to the first opening in a row direction, a bridging electrode section positioned on a space between the first opening and the second opening, and a first scanning electrode section and a second scanning electrode section that are provided on respective sides adjacent to a wormhole region consisting of the first opening, the second opening, and the bridging electrode section in such a manner that the first scanning electrode section and the second scanning electrode section sandwich the wormhole region in a column direction, a first gate extending section being drawn from the first scanning electrode section in a direction away from the opening in the pixel region, and a second gate extending section being drawn from the second scanning electrode section in a direction away from the opening in the pixel region, a source electrode and a drain electrode of the first transistor being provided so as to overlap the first gate extending section and not to overlap a first end portion, and a source electrode and a drain electrode of the second transistor being provided so as to overlap the second gate extending section and not to overlap a second end portion, the first end portion being an end portion within the pixel region out of two end portions of the first scanning electrode section in a row direction and the second end portion being an end portion within the pixel region out of two end portions of the second scanning electrode section in a row direction.

The active matrix substrate of the present invention may be arranged so that the scanning signal line extends in a row direction in such a manner as to cross the pixel region and the data signal line extends in a column direction in such a manner as to be along with an edge of the pixel region.

The active matrix substrate of the present invention may be arranged so as to further include: a main electrode serving as a source electrode common between the first transistor and the second transistor; and a coupling electrode that couples the main electrode with the data signal line, the coupling electrode being positioned above the opening. Alternatively, the active matrix substrate of the present invention may be arranged so as to further include: a main electrode serving as a source electrode common between the first transistor and the second transistor; and a coupling electrode that couples the main electrode with the data signal line, the coupling electrode being positioned above the first opening.

That is, if SG leakage is observed in a pixel region and if it is unclear whether the SG leakage is caused by a short-circuit between the data signal line and the first scanning electrode section or the second scanning electrode section or by a short-circuit between the source electrode and the first scanning electrode section or the second scanning electrode section, it is possible to cut the coupling electrode (before cutting the scanning signal line) and separate the main electrode (serving as a source electrode common between the two transistors) from the data signal line. This allows repairing SG leakage without cutting the scanning signal line, when the SG leakage is caused by a short-circuit between the main electrode and the first scanning electrode section or the second scanning electrode section. In this case, making the width of the coupling electrode in a column direction smaller than the width of the main electrode in a column direction or making the coupling electrode have a shape wider in a row direction than in a column direction (shape elongated in a row direction) allows easy cutting of the coupling electrode.

It is preferable to arrange the active matrix substrate of the present invention so that the opening (or first opening) is designed such that at least a part of a portion overlapping one of two regions adjacent to the coupling electrode bulges in a column direction and at least a part of a portion overlapping the other of the two regions bulges in a column direction. This allows easy cutting of the coupling electrode without enlarging the width of the whole opening in a column direction. Enlarging the width of the whole opening in a column direction would enlarge the width of the scanning signal line, resulting in a low open ratio. However, the above arrangement allows avoiding such a problem.

The active matrix substrate of the present invention may be arranged so that a part of an edge of the main electrode which part is in contact with a channel region between the drain electrode of the first transistor and the main electrode is L-shaped, and a part of an edge of the main electrode which part is in contact with a channel region between the drain electrode of the second transistor and the main electrode is L-shaped.

With the arrangement, even when only the main electrode serves as the source electrode of the first transistor and only the main electrode serves as the source electrode of the second transistor, it is possible to keep sufficient channel width.

The active matrix substrate of the present invention may be arranged so as to further include: a first retention capacitor line; a first retention capacitor line extending section drawn from the first retention capacitor line; a second retention capacitor line; and a second retention capacitor line extending section drawn from the second retention capacitor line, an end of the first retention capacitor line extending section overlapping an end of the first drain drawing line, and an end of the second retention capacitor line extending section overlapping an end of the second drain drawing line.

With the arrangement, when the first scanning electrode section and the data signal line get short-circuited, repairing is carried out in such a manner that the first scanning electrode section is separated from the main part of the scanning signal line and an end portion of the first drain drawing line is connected (e.g. melt-connected) with an end portion of the first retention capacitor line extending section, allowing the first pixel electrode to be connected with the first retention capacitor line. That is, it is possible to reduce the potential of the first pixel electrode to the potential of the first retention capacitor line, and to change a sub-pixel including a pixel electrode connected with a defective transistor to a black point in a liquid crystal display device including the active matrix substrate of the present invention. When the first scanning electrode section and the main electrode (source electrode) get short-circuited, repairing is carried out in such a manner that the main electrode is separated from the data signal line and the end portion of the first drain drawing line is connected with the end portion of the first retention capacitor line extending section.

The active matrix substrate of the present invention may be arranged so that a contact hole connecting the first drain drawing line and the first pixel electrode is provided in such a manner as to overlap an end of the first drain drawing line, and a contact hole connecting the second drain drawing line and the second pixel electrode is provided in such a manner as to overlap an end of the second drain drawing line. With the arrangement, when melt-connecting the end portion of the drain drawing line and the end portion of the retention capacitor line, it is also possible to remove a defective contact (defective connection between a drain drawing line and a pixel electrode) derived from the remnant of an interlayer insulating film in a contact hole.

A liquid crystal panel of the present invention includes the aforementioned active matrix substrate. It is preferable that a black matrix formed on a substrate (e.g. color filter substrate) facing the active matrix substrate overlaps the opening of the scanning signal line.

A liquid crystal display unit of the present invention includes the aforementioned liquid crystal panel.

A liquid crystal display device of the present invention includes the aforementioned liquid crystal display unit.

A television receiver of the present invention includes the aforementioned liquid crystal display device and a tuner section for receiving television broadcasting.

A method of the present invention for producing an active matrix substrate includes: scanning signal lines each extending in a row direction in such a manner as to cross pixel regions; and data signal lines each extending in a column direction along edges of pixel regions, each of the pixel regions including a first transistor and a second transistor that are connected with a same data signal line, a first pixel electrode connected with the first transistor, and a second pixel electrode connected with the second transistor, said method comprising the steps of: forming a scanning signal line including (i) an opening extending from outside a pixel region into the pixel region and (ii) a first scanning electrode section and a second scanning electrode section that are provided on respective sides adjacent to the opening in such a manner that the first scanning electrode section and the second scanning electrode section face each other in a column direction with the opening therebetween; forming (i) a first transistor whose gate electrode is a part of the first scanning electrode, (ii) a second transistor whose gate electrode is a part of the second scanning electrode, and (iii) the data signal line; determining whether a short-circuit between the data signal line and the first scanning electrode section exists or not, and whether a short-circuit between the data signal line and the second scanning electrode section exists or not; when a short-circuit between the data signal line and the first scanning electrode section exists, separating the first scanning electrode section including a short-circuited portion from the scanning signal line by cutting an electrode at a first end portion and a third end portion, and when a short-circuit between the data signal line and the second scanning electrode section exists, separating the second scanning electrode section including a short-circuited portion from the scanning signal line by cutting an electrode at a second end portion and a fourth end portion, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

This allows repairing a defect in wiring (SG leakage) without using an auxiliary line etc. Therefore, in a case of producing an active matrix substrate with an auxiliary line, it is possible to repair SG leakage without the step of connecting both ends of a data signal line with the auxiliary line, and further to avoid the increase in load caused by connection with the auxiliary line. In a case of producing an active matrix substrate without an auxiliary line, it is possible to make an active matrix substrate that has been so far regarded as defective due to SG leakage an acceptable product, thereby increasing the yielding ratio. These effects are particularly evident when the present configuration is applied to a large liquid crystal panel.

A method of the present invention for producing a liquid crystal panel includes an active matrix substrate including: scanning signal lines each extending in a row direction in such a manner as to cross pixel regions; and data signal lines each extending in a column direction along edges of pixel regions, each of the pixel regions including a first transistor and a second transistor that are connected with a same data signal line, a first pixel electrode connected with the first transistor, and a second pixel electrode connected with the second transistor, said method comprising the steps of: forming a scanning signal line including (i) an opening extending from outside a pixel region into the pixel region and (ii) a first scanning electrode section and a second scanning electrode section that are provided on respective sides adjacent to the opening in such a manner that the first scanning electrode section and the second scanning electrode section face each other in a column direction with the opening therebetween; forming (i) a first transistor whose gate electrode is a part of the first scanning electrode, (ii) a second transistor whose gate electrode is a part of the second scanning electrode, and (iii) the data signal line; determining whether a short-circuit between the data signal line and the first scanning electrode section exists or not, and whether a short-circuit between the data signal line and the second scanning electrode section exists or not; when a short-circuit between the data signal line and the first scanning electrode section exists, separating the first scanning electrode section including a short-circuited portion from the scanning signal line by cutting an electrode at a first end portion and a third end portion, and when a short-circuit between the data signal line and the second scanning electrode section exists, separating the second scanning electrode section including a short-circuited portion from the scanning signal line by cutting an electrode at a second end portion and a fourth end portion, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

This allows repairing a defect in wiring (SG leakage) without using an auxiliary line etc. Therefore, in a case of producing a liquid crystal panel with an auxiliary line, it is possible to repair SG leakage without the step of connecting both ends of a data signal line with the auxiliary line, and further to avoid the increase in load caused by connection with the auxiliary line. In a case of producing an active matrix substrate without an auxiliary line, it is possible to make a liquid crystal panel that has been so far regarded as defective due to SG leakage an acceptable product, thereby increasing the yielding ratio. These effects are particularly evident when the present configuration is applied to a large liquid crystal panel.

A method of the present invention for producing an active matrix substrate includes: scanning signal lines each extending in a row direction in such a manner as to cross pixel regions; and data signal lines each extending in a column direction along edges of pixel regions, each of the pixel regions including a first transistor and a second transistor that are connected with a same data signal line, a first pixel electrode connected with the first transistor, and a second pixel electrode connected with the second transistor, said method comprising the steps of: forming a scanning signal line including (i) a first opening with a rectangular shape, extending from outside a pixel region into the pixel region, (ii) a second opening positioned side by side with respect to the first opening in a row direction, (iii) a bridging electrode section serving as a space between the first opening and the second opening, and (iv) a first scanning electrode section and a second scanning electrode section that are provided on respective sides adjacent to a wormhole region consisting of the first opening, the second opening, and the bridging electrode section in such a manner that the first scanning electrode section and the second scanning electrode section face each other in a column direction with the wormhole region therebetween; forming (i) a first transistor whose gate electrode is a part of the first scanning electrode, (ii) a second transistor whose gate electrode is a part of the second scanning electrode, and (iii) the data signal line; determining whether a short-circuit between the data signal line and the first scanning electrode section exists or not, and whether a short-circuit between the data signal line and the second scanning electrode section exists or not; when a short-circuit between the data signal line and the first scanning electrode section exists, separating the first scanning electrode section including a short-circuited portion from the scanning signal line by cutting an electrode at a first end portion, a third end portion, and the bridging electrode section, and when a short-circuit between the data signal line and the second scanning electrode section exists, separating the second scanning electrode section including a short-circuited portion from the scanning signal line by cutting an electrode at a second end portion, a fourth end portion, and the bridging electrode section, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction. With the method, two edges along a column direction of the first opening can be used for layer alignment, in addition to the above effects.

A method of the present invention for producing a liquid crystal panel includes an active matrix substrate including: scanning signal lines each extending in a row direction in such a manner as to cross pixel regions; and data signal lines each extending in a column direction along edges of pixel regions, each of the pixel regions including a first transistor and a second transistor that are connected with a same data signal line, a first pixel electrode connected with the first transistor, and a second pixel electrode connected with the second transistor, said method comprising the steps of: forming a scanning signal line including (i) a first opening with a rectangular shape, extending from outside a pixel region into the pixel region, (ii) a second opening positioned side by side with respect to the first opening in a row direction, (iii) a bridging electrode section serving as a space between the first opening and the second opening, and (iv) a first scanning electrode section and a second scanning electrode section that are provided on respective sides adjacent to a wormhole region consisting of the first opening, the second opening, and the bridging electrode section in such a manner that the first scanning electrode section and the second scanning electrode section face each other in a column direction with the wormhole region therebetween; forming (i) a first transistor whose gate electrode is a part of the first scanning electrode, (ii) a second transistor whose gate electrode is a part of the second scanning electrode, and (iii) the data signal line; determining whether a short-circuit between the data signal line and the first scanning electrode section exists or not, and whether a short-circuit between the data signal line and the second scanning electrode section exists or not; when a short-circuit between the data signal line and the first scanning electrode section exists, separating the first scanning electrode section including a short-circuited portion from the scanning signal line by cutting an electrode at a first end portion, a third end portion, and the bridging electrode section, and when a short-circuit between the data signal line and the second scanning electrode section exists, separating the second scanning electrode section including a short-circuited portion from the scanning signal line by cutting an electrode at a second end portion, a fourth end portion, and the bridging electrode section, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

As described above, with the present active matrix substrate, it is possible to repair a defect in wiring (SG leakage) without using an auxiliary line etc. Therefore, application of the present configuration to an active matrix substrate with an auxiliary line allows repairing SG leakage without the step of connecting both ends of a data signal line with the auxiliary line, and further allows avoiding the increase in load caused by connection with the auxiliary line. Application of the present configuration to an active matrix substrate without an auxiliary line allows an active matrix substrate that has been so far regarded as defective due to SG leakage to be made an acceptable product, thereby increasing the yielding ratio.

These effects are particularly evident when the present configuration is applied to a large liquid crystal panel.

Figure 1:
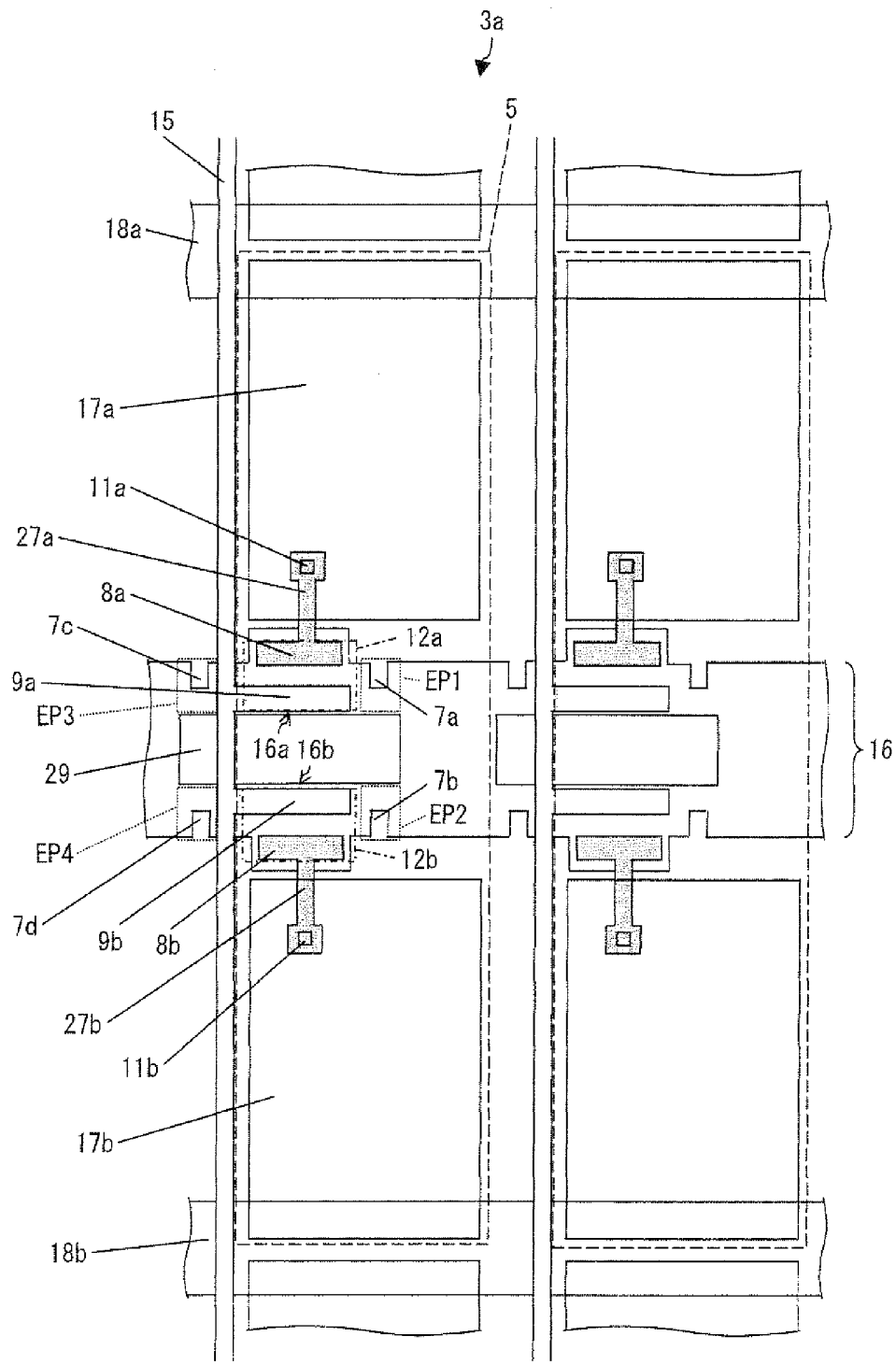
FIG. 1 is a plane drawing illustrating a configuration of an active matrix substrate in accordance with the present embodiment.

REFERENCE SIGNS LIST 3a-3f: active matrix substrate
5: pixel region
7a-7d: notch section
9x: main electrode
9y: coupling electrode
10: liquid crystal panel
12a: first transistor
12b: second transistor
15: data signal line
16: scanning signal line
16a: first scanning electrode section
16b: second scanning electrode section
16x: first gate extending section
16y: second gate extending section
17a: first pixel electrode
17b: second pixel electrode
18a: first retention capacitor line
18b: second retention capacitor line
18ax: first retention capacitor line extending section
18bx: second retention capacitor line extending section
29: opening
29a: first opening
29b: second opening
31: wormhole region
32: bridging electrode section
100: liquid crystal display unit
110: liquid crystal display device 601: television receiver
EP1-EP4: first-fourth end portions

DESCRIPTION OF EMBODIMENTS

FIG. 1 is a (perspective) plan view showing a part of an active matrix substrate according to the present Embodiment of the present invention. As shown in the drawing, an active matrix substrate 3a includes data signal lines 15 and scanning signal lines 16 which intersect at right angles to each other, first and second retention capacitor wires 18a and 18b, and pixel regions 5 provided in a matrix pattern. It should be noted that a layer in which the data signal lines 15 are provided is provided above a layer in which the scanning signal lines 16 are provided. Each scanning signal line 16 extends in a row direction (horizontal direction in the drawing) so as to cross individual pixel regions 5. Each data signal line 15 extends in a column direction (vertical direction in the drawing) along edges of individual pixel regions (edges in a direction perpendicular to the scanning signal line). Each of the first retention capacitor wire 18a and the second retention capacitor wire 18b extends in the row direction (horizontal direction in the drawing) so as to overlap adjacent end portions of respective two pixel regions adjacent in the column direction.

Each pixel region 5 includes a first transistor 12a, a second transistor 12b, a first pixel electrode 17a, a second pixel electrode 17b, a first retention capacitor wire 18a, a second retention capacitor wire 18b, a first drain drawing wire 27a, a second drain drawing wire 27b, a first contact hole 11a, and a second contact hole 11b.

Each of the scanning signal lines 16 which crosses centers of the pixel regions 5 has rectangular openings 29 leading from outside individual pixel regions to inside that pixel regions by crossing under individual data signal lines 15. Each scanning signal line 16 has a first scanning electrode section 16a and a second scanning electrode section 16b that are provided on respective sides adjacent to a corresponding one of the openings 29, that is, sections which face each other in the column direction so as to sandwich the corresponding opening 29. A part of the first scanning electrode 16a serves as a gate electrode of the first transistor 12a, and a part of the second scanning electrode section 16b serves as a gate electrode of the second transistor 12b.

Furthermore, the first scanning electrode 16a has two ends in the row direction, and one end which is provided inside a pixel region is indicated as a first end portion EP1 and one end which is provided outside a pixel region (outside the data signal line 15) is indicated as a third end portion EP3. Further, the second scanning electrode 16b has two ends in the row direction, and one end which is provided inside a pixel region is indicated as a second end portion EP2 and one end which is provided outside a pixel region (outside the data signal line 15) is indicated as a fourth end portion EP4.

Figure 5:
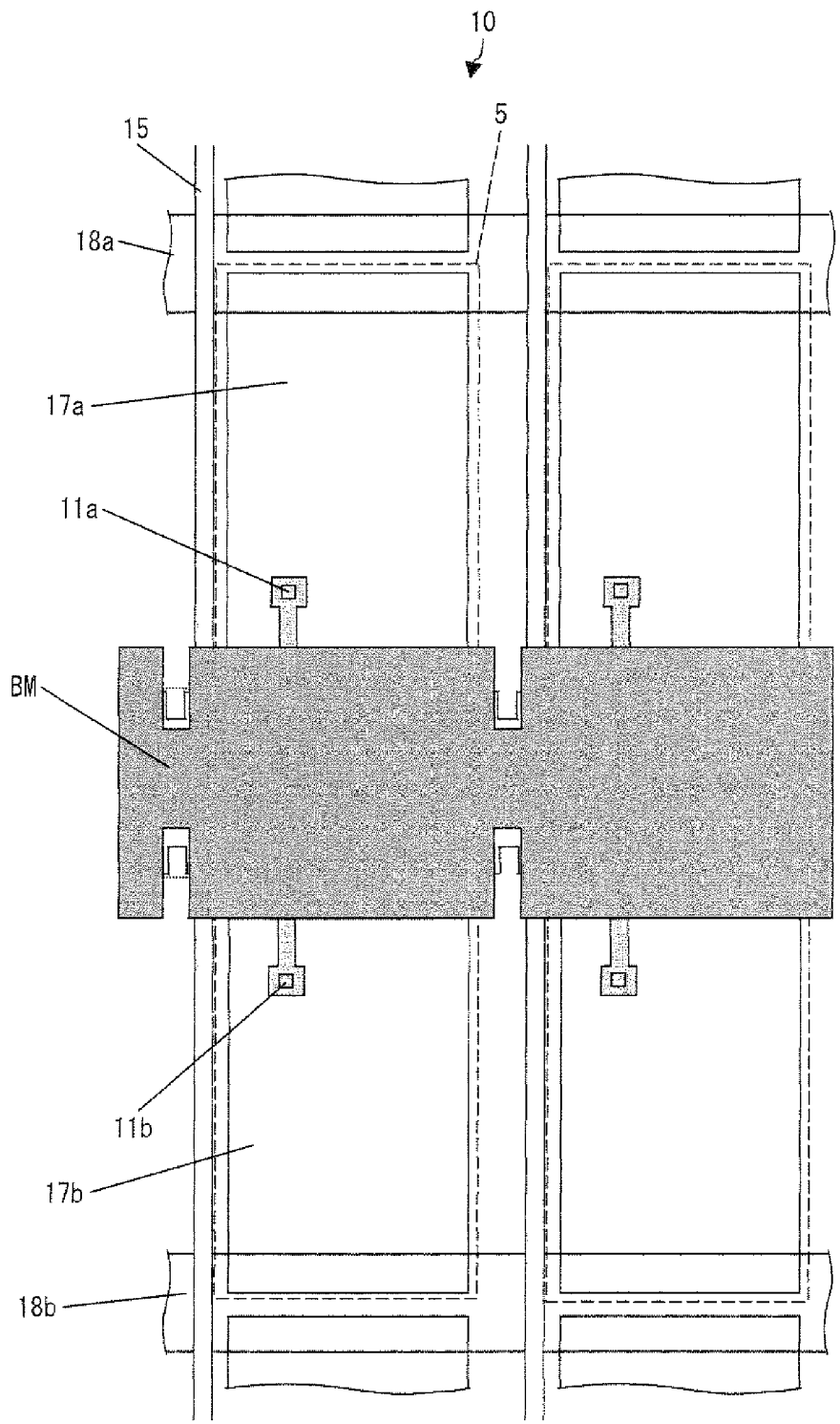
FIG. 5 is a plane drawing illustrating a configuration of a liquid crystal panel in accordance with the present embodiment.

The first pixel electrode 17a is provided on one side (upper side in the drawing) of the scanning signal line 16, and the second pixel electrode 17b is provided on the other side (lower side in the drawing) of the scanning signal line 16. In a case where a liquid crystal panel includes the present active matrix substrate 3a, a first pixel capacitor is formed by (i) the first pixel electrode 17a, (ii) a counter electrode (common electrode) formed on a color filter substrate, and (iii) a liquid crystal material provided between the two electrodes; and a second pixel capacitor is formed by (i) the second pixel electrode 17b, (ii) the counter electrode, and (iii) a liquid crystal material between the two electrodes. Moreover, in the case where a liquid crystal panel includes the present active matrix substrate 3a, a black matrix BM is superposed on the openings 29 of the scanning signal line 16, as shown in FIG. 5. Therefore, there is no fear of leak of light or the like.

A source electrode 9a of the first transistor is drawn from the data signal line 15 in a row direction in such a manner as to overlap the first scanning electrode section 16a. A drain electrode 8a of the first transistor is provided in such a manner as to overlap the first scanning electrode section 16a and to face the source electrode 9a, and is connected with the first pixel electrode 17a via the first drain drawing line 27a and the contact hole 11a. Further, a first retention capacitor is provided on a part where the first pixel electrode 17a and the first retention capacitor line 18a overlap.

Similarly, a source electrode 9b of the second transistor is drawn from the data signal line 15 in a row direction in such a manner as to overlap the first scanning electrode section 16a. A drain electrode 8b of the second transistor is provided in such a manner as to overlap the second scanning electrode section 16b and to face the source electrode 9b, and is connected with the second pixel electrode 17b via the second drain drawing line 27b and the contact hole 11b. Further, a second retention capacitor is provided on a part where the second pixel electrode 17b and the second retention capacitor line 18b overlap.

With the arrangement, although the same signal potential is supplied to the first pixel electrode 17a and the second pixel electrode 17b from the data signal line 15, individually controlling potentials of the first and second retention capacitor lines 18a and 18b allows causing the first pixel electrode 17a and the second pixel electrode 17b to have different potentials via first and second retention capacitors. That is, the liquid crystal display device including the active matrix substrate 3a of the present invention allows providing different luminance areas in one pixel and thus allows halftone expression by area coverage modulation, improving excess brightness in a screen.

The active matrix substrate 3a of the present invention is configured such that the source electrode 9a and the drain electrode 8a of the first transistor and the drain drawing line 27a are provided in such a manner as to overlap the first scanning electrode section 16a and not to overlap a first end portion EP1, and a part of the first end portion EP1 serves as a notch section 7a. Further, the active matrix substrate 3a of the present invention is configured such that the source electrode 9b and the drain electrode 8b of the second transistor and the drain drawing line 27b are provided in such a manner as to overlap the second scanning electrode section 16b and not to overlap a second end portion EP2, and a part of the second end portion EP2 serves as a notch section 7b. Further, a part of a third end portion EP3 serves as a notch section 7c and a part of a fourth end portion EP4 serves as a notch section 7d. In the configuration of FIG. 1, the notch sections (7a-7d) of the end portions (EP1-EP4) are provided on the scanning signal line 16 in such a manner as to be at a side closer to the edge of the scanning signal line 16, but the present invention is not limited to this configuration. Alternatively, the notch sections may be provided on the scanning signal line 16 in such a manner as to be at a side closer to the opening 29. Alternatively, notch sections may be provided on the scanning signal line 16 in such a manner as to be both at a side closer to the edge of the scanning signal line 16 and at a side closer to the opening 29, and narrowed sections may be provided at individual end portions (EP1-EP4).

Figure 19:
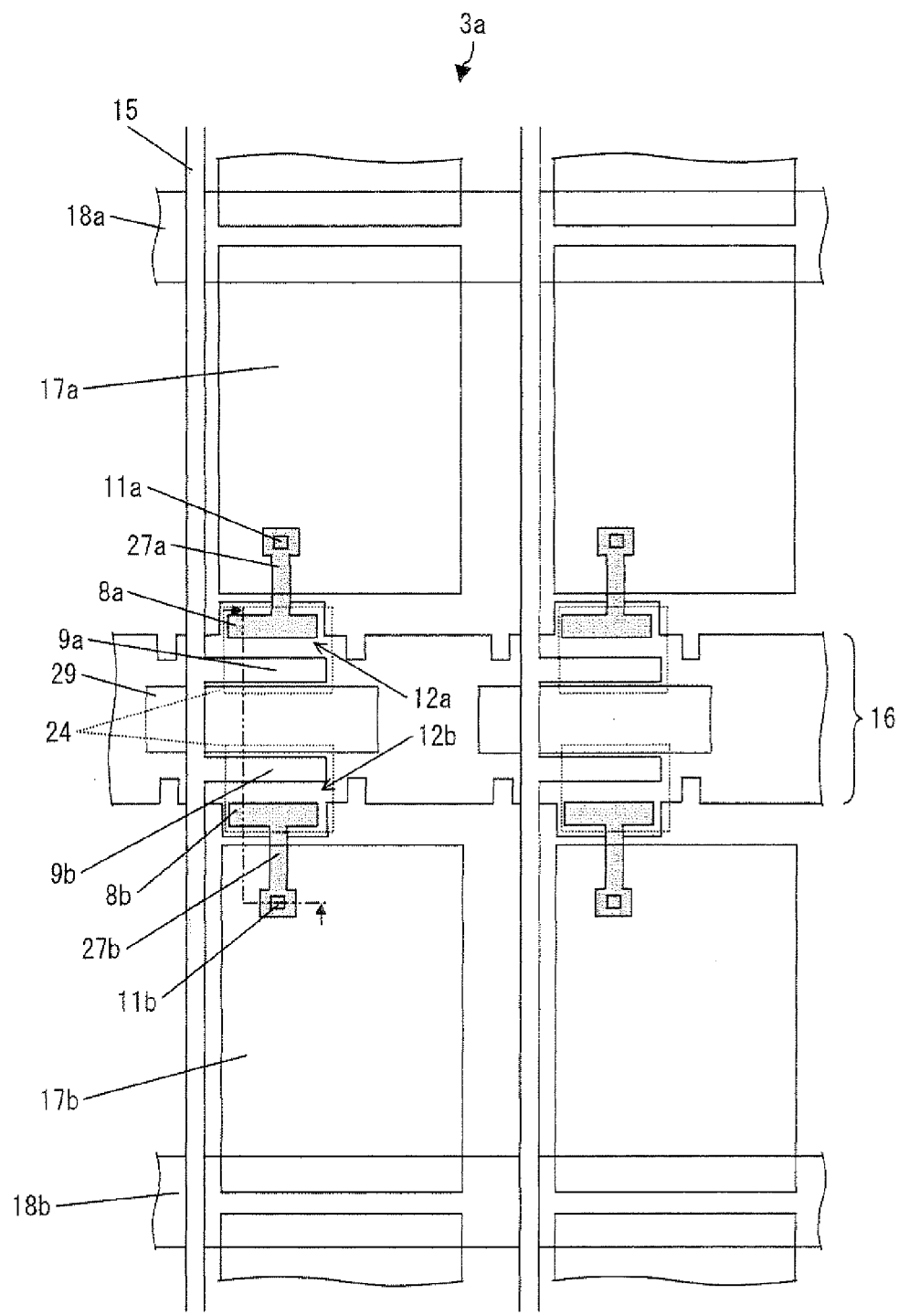
FIG. 19 is a plane drawing illustrating a configuration of the active matrix substrate of FIG. 1 in more detail.
Figure 26:
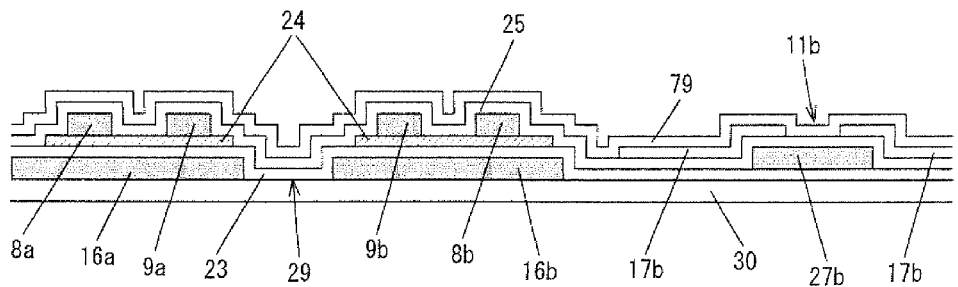
FIG. 26 is a cross sectional drawing illustrating the active matrix substrate of FIG. 19 viewed in an arrow direction of FIG. 19.

FIG. 19 is a drawing illustrating the position of a semiconductor layer in FIG. 1. FIG. 26 is a cross sectional drawing of FIG. 19 viewed in an arrow direction of FIG. 19. As illustrated in FIG. 26, in the active matrix substrate 3a of the present invention, a scanning signal line (first and second scanning electrode sections 16a and 16b) including the opening 29 is provided on the substrate 30, and a gate insulating film 23 is provided on the scanning signal line. On the gate insulating film 23, the source electrodes 9a and 9b and the drain electrodes 8a and 8b are provided via the semiconductor layer 24, and the drain drawing line 27b is provided. An interlayer insulating film (inorganic interlayer insulating film) 25 is provided on the source electrodes 9a and 9b and the drain electrodes 8a and 8b and the drain drawing line 27b, and the second pixel electrode 17b is provided on the interlayer insulating film 25. The second pixel electrode 17 is covered by an alignment layer 79. The interlayer insulating film 25 is removed at the contact hole 11b, allowing the drain drawing line 27b and the second pixel electrode 17b to be connected with each other.

Figure 6:
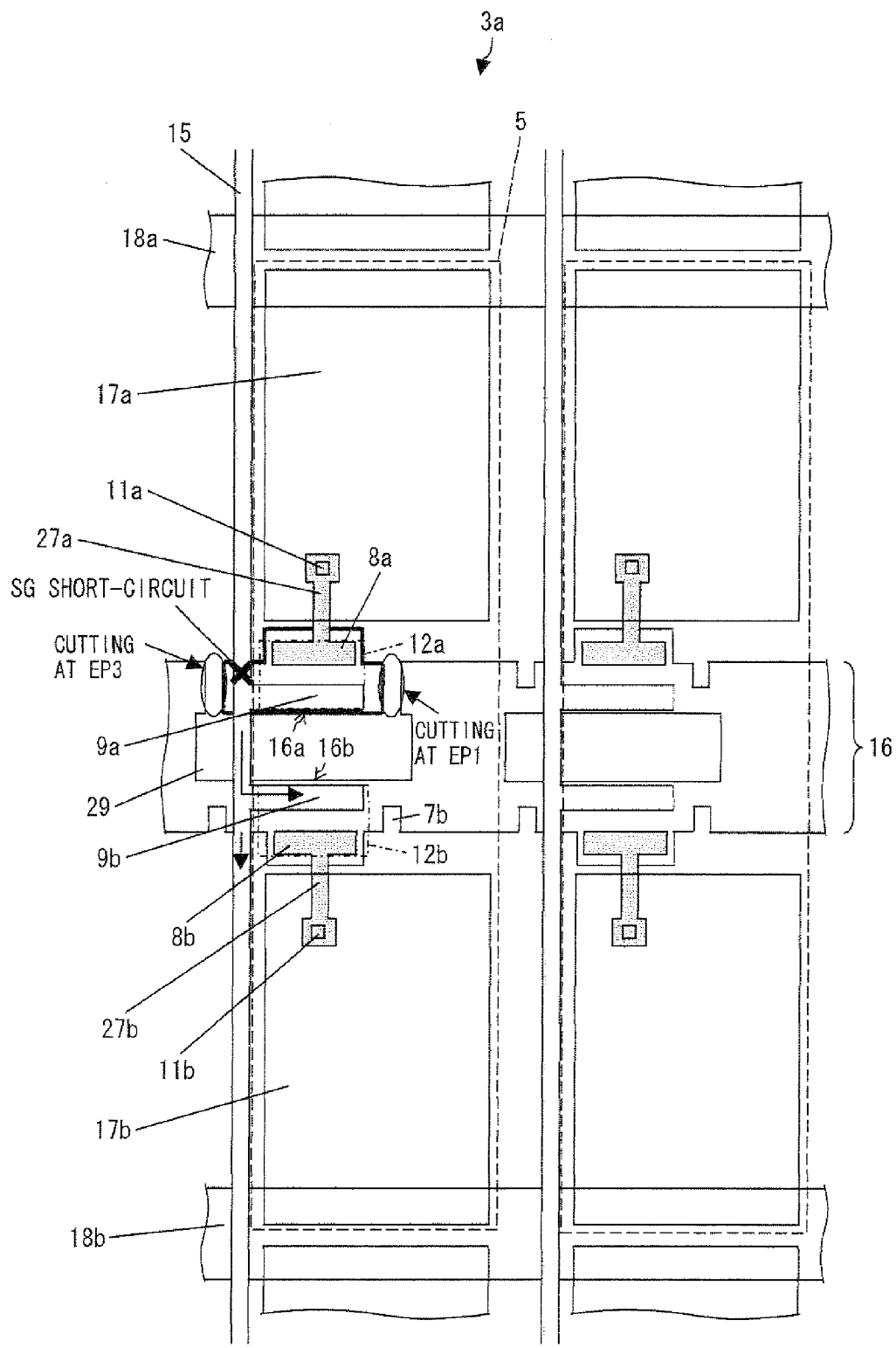
FIG. 6 is a plane drawing illustrating how to repair SG leakage in the active matrix substrate of FIG. 1.

In the active matrix substrate 3a of the present invention, when a short-circuit (SG leakage) occurs between the data signal line 15 and the first scanning electrode section 16a as illustrated in FIG. 6, it is possible to carry out a step of repairing a short-circuit as follows. A part between the notch section 7a and the opening 29 in the first end portion EP1 (in a pixel region) and a part between the notch section 7c and the opening 29 in the third end portion EP3 (outside the data signal line 15) are cut, separating the first scanning electrode section 16a short-circuited with the data signal line 15 from the main part of the scanning signal line 16. Since the active matrix substrate of the present invention is configured such that the source electrode 9a and the drain electrode 8a of the first transistor and the drain drawing line 27a are provided in such a manner as not to overlap the end portion EP1, it is possible to easily and surely cut the electrode at the first end portion EP1.

Figure 27:
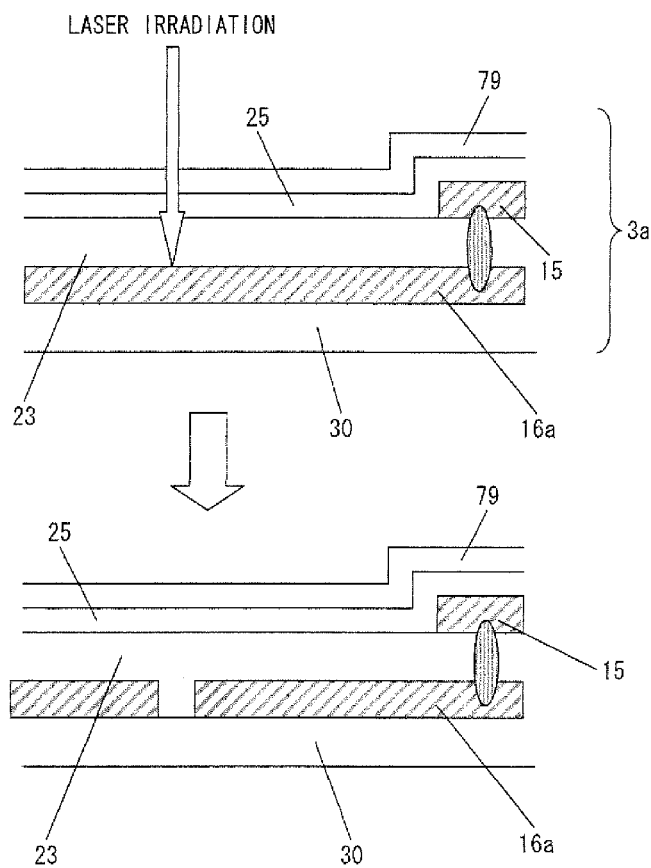
FIG. 27 is a cross sectional drawing illustrating how to repair the active matrix substrate of FIG. 19.

FIG. 27 is a cross sectional drawing illustrating how the electrode is cut at the third end portion EP3 (outside the data signal line 15) in FIG. 6. As illustrated in FIG. 27, cut of the electrode (separation by breakage) in the step of repairing a short-circuit is carried out by irradiating laser to the surface of the active matrix substrate. Laser light used here is not particularly limited. An example of the laser light is YAG (yttrium aluminum garnet) laser, and an example of its wavelength is a fourth higher harmonic wave (wavelength: 266 nm) etc.

The step of repairing a short-circuit allows supplying a signal potential from the data signal line 15 to the second transistor 12b and subsequent transistors, without using an auxiliary line etc. After the step of repairing a short-circuit, the first transistor 12a remains as a defect. However, this defect influences only a half of one pixel region, and a region influenced by the defect appears as a black point, and therefore the defect causes a very little influence on display quality.

Further, in a case where the source electrode 9a of the first transistor is short-circuited with the first scanning electrode section 16a, it is possible to repair the short-circuit by the aforementioned step of repairing a short-circuit. A short-circuit at a part where the data signal line 15 and the first scanning electrode section 16a cross each other and a short-circuit at a part where the source electrode 9a of the first transistor and the first scanning electrode section 16a cross each other can be surely repaired by carrying out the step of repairing a short-circuit in the active matrix substrate 3a.

Figure 38:
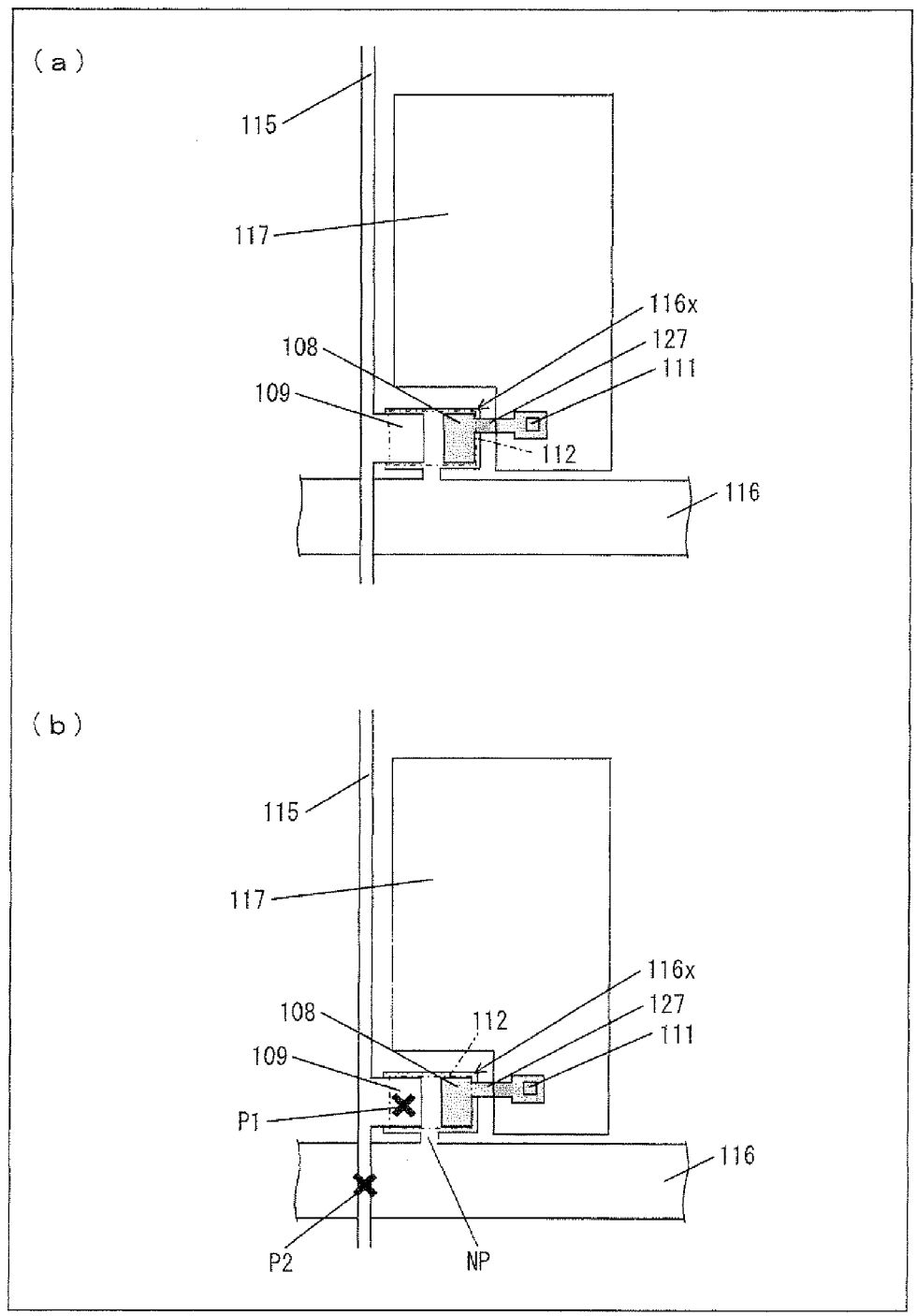
FIG. 38 is a referential drawing explaining an effect of an active matrix substrate of the present invention.
Figure 39:
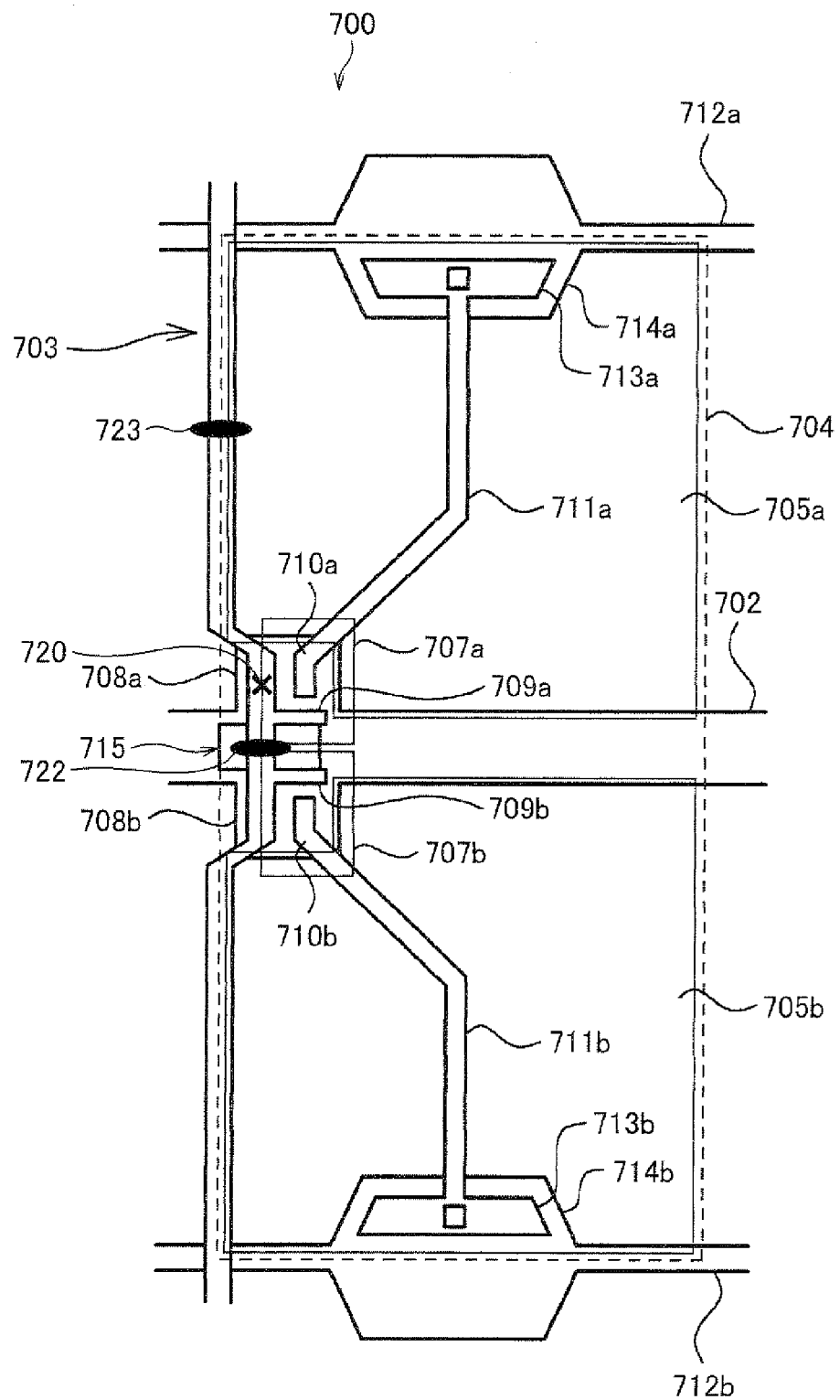
FIG. 39 is a plane drawing illustrating a configuration of a conventional active matrix substrate.

FIG. 38(a) is a referential drawing illustrating an active matrix substrate in which a gate extending section 116x is drawn from a scanning signal line 116, a source electrode 109 and a drain electrode 108 of a transistor 112 are provided on the gate extending section 112, and the drain electrode 108 is connected with a pixel electrode 117 via a drain drawing line 127 and a contact hole 111. With such a configuration, a short-circuit at a part P1 where the source electrode 109 of the transistor 112 and the gate extending section 116x cross each other can be repaired by cutting a root NP at the gate extending section 116x. However, a short-circuit at a part P2 where the data signal line 115 and the scanning signal line 116 cross each other cannot be repaired, or can be repaired by cutting the data signal line 115 at two parts and rewiring the data signal line 115 by use of an auxiliary line etc.

In contrast thereto, in the active matrix substrate of the present invention illustrated in FIG. 1, a short-circuit at a part where the data signal line 15 and the scanning electrode section 16 cross each other and a short-circuit at a part where the source electrode (9a and 9b) of the transistor and the scanning electrode section 16 cross each other can be repaired without using an auxiliary line etc. since the scanning electrode section (16a or 16b) including the short-circuited part can be easily and surely separated from a main part of the scanning signal line 16.

Figure 11:
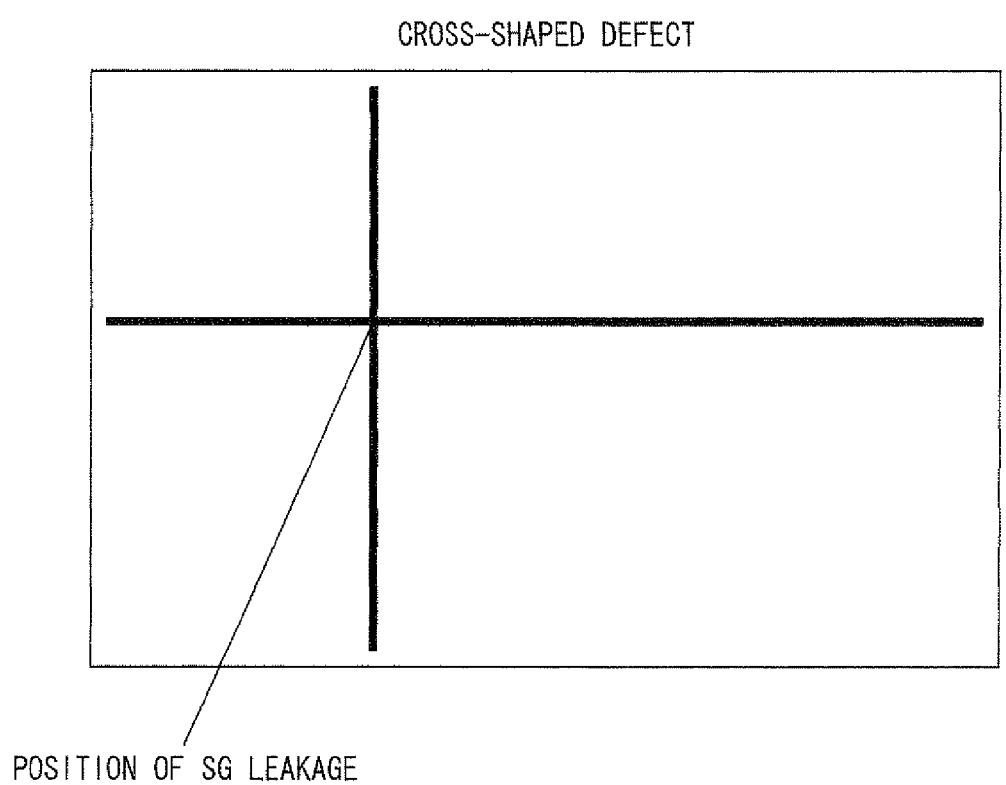
FIG. 11 is a drawing schematically illustrating a cross-shaped defect due to SG leakage.

An example of a method for detecting SG leakage in the active matrix substrate is a method using a modulator in which optical transmittance changes depending on the strength of an electric field. One surface of the modulator is provided with a transparent electrode and the other surface of the modulator is provided with a light reflection surface. An active matrix substrate is mounted on the light reflection surface-side of the modulator and an electric field is generated between the active matrix substrate and the transparent electrode of the modulator, and light is irradiated from the transparent electrode-side of the modulator into the modulator. Light having passed through the modulator and reflected by the reflection surface is received by a CCD (Charge Coupled Device) camera, and a defected part (SG leakage) is identified according to the strength of the reflected light. When the SG leakage occurs, a pixel region on a short-circuited scanning signal line and a pixel region including a transistor connected with a short-circuited data signal line are recognized as a cross-shaped defect. Therefore, the position of short-circuited coordinates (SG leakage position) can be detected by recognizing the cross point of the cross with a microscope (see FIG. 11).

Further, SG leakage may be detected by visual examination with use of pattern recognition. That is, patterns of reflected lights are compared with each other between adjacent pixel regions, and SG leakage is detected according to the result of the comparison.

The following explains an example of how to produce an active matrix substrate.

Initially, a metal film such as titanium, chrome, aluminum, molybdenum, tantalum, tungsten, and copper, a film of alloy thereof, or a laminate film thereof is formed on a transparent insulating substrate such as glass and plastic by sputtering etc. in such a manner that the film thickness is 1000-3000 Å. This film is patterned by photo etching to have a desired shape. Thus, scanning signal lines (which double as gate electrodes of transistors) and retention capacitor lines are formed.

Subsequently, a silicon nitride film (SiNx) serving as a gate insulating film, a highly resistive semiconductor layer made of amorphous silicon, polysilicon etc., and a lowly resistive semiconductor layer made of n+ amorphous silicon etc. are sequentially formed by plasma CVD (Chemical Vapor Deposition) etc., and are patterned by photo etching. The film thickness of the silicon nitride film serving as the gate insulating film is set to approximately 3000-5000 Å for example. The film thickness of the amorphous silicon film serving as the highly resistive semiconductor layer is set to 1000-3000 Å for example. The film thickness of the n+ amorphous silicon film serving as the lowly resistive semiconductor film is set to 400-700 Å for example.

Subsequently, a metal film such as titanium, chrome, aluminum, molybdenum, tantalum, tungsten, and copper, a film of alloy thereof, or a laminate film thereof is formed by sputtering etc. in such a manner that the film thickness is 1000-3000 Å. This film is patterned by photo etching etc. to have a desired shape. Thus, a data signal line, a source electrode, a drain electrode, and a drain drawing line are formed. In the active matrix substrate, as shown in FIG. 1, the source electrode 9a and the drain electrode 8a of the first transistor and the drain drawing line 27a are formed in such a manner as to overlap the first scanning electrode section 16a and not to overlap the first end portion EPI, and the source electrode 9b and the drain electrode 8b of the second transistor and the drain drawing line 27b are formed in such a manner as to overlap the second scanning electrode section 16b and not to overlap the second end portion EP2.

Subsequently, the highly resistive semiconductor layer (i layer) such as the amorphous silicon film and the lowly resistive semiconductor layer (n+ layer) such as the n+ amorphous silicon film are subjected to channel etching by dry etching with patterns of the data signal line, the source electrode, the drain electrode, and the drain drawing electrode being masks. In this process, the film thickness of the i layer is optimized and transistors (channel regions) are formed. Here, the semiconductor layer that is not covered by the data signal line, the source electrode, the drain electrode, and the drain drawing electrode is removed by etching, and the i layer with a film thickness required for performance of individual transistors remains.

Subsequently, a photosensitive acrylic resin film, an inorganic insulating film such as silicon nitride and silicon oxide, or a laminate film thereof etc., each serving as an interlayer insulating film, is formed so as to cover individual transistors (channel regions), the scanning signal line, the data signal line, the source electrode, the drain electrode, and the drain drawing electrode. Specifically, a silicon nitride film of 2000-5000 Å in film thickness, formed by plasma CVD etc., or a photosensitive acrylic resin film of 20000-40000 Å in film thickness, formed by spin coating, or a laminate film thereof may be used. The present active matrix substrate includes a silicon nitride film as an interlayer insulating film (passivation film). A polyimide resin film, a resin film without photosensitivity, or a spin on glass (SOG) film etc. may be used as an interlayer insulating film.

Subsequently, in accordance with the position of the contact hole, the interlayer insulating film is etched to form a hole. Here, a photosensitive resist is patterned by photolithography (exposure and development) to make etching.

Subsequently, a transparent conductive film such as ITO (Indium Tin Oxide), IZO, zinc oxide, and tin oxide is formed on the interlayer insulating film by sputtering to have a film thickness of 1000-2000 Å, and is patterned by photo etching etc. to have a required shape. Thus, pixel electrodes are formed. In an active matrix substrate used in an MVA liquid crystal panel, individual pixel electrodes are formed to have a shape such as a slit.

Subsequently, an orientation film is applied by an ink-jet method etc. Thus, an active matrix substrate is formed.

Detection of SG leakage (short-circuit) and the step of repairing a short-circuit are carried out at least after formation of the individual pixel electrodes, in a case where the modulator is used in the detection. Alternatively, the detection of SG leakage and the step of repairing a short-circuit may be carried out after formation of a data signal line and channel etching, in a case where pattern recognition is used in the detection.

The following explains how to seal liquid crystals between an active matrix substrate and a color filter substrate that is a counter substrate.

Sealing of liquid crystals may be carried out by a method (vacuum filling method) in which an opening for pouring liquid crystals is provided in a thermosetting sealing resin, the opening is immersed in liquid crystals in vacuum, the opening is put in the air so that the liquid crystals are poured, and thereafter the opening is sealed with UV curing resin etc. Alternatively, sealing of liquid crystals may be carried out by a one drop filling process as explained below.

A UV curing sealing resin containing spaces such as fiber glass is applied on the peripheral of an active matrix substrate, and liquid crystals are dropped on a color filter substrate by a one drop filling process. The one drop filling process allows the most appropriate amount of liquid crystals to be regularly dropped inside the seal. The amount of liquid crystals to be dropped depends on the cell gap value and the volume of liquid crystals that can be filled in cells.

Subsequently, in order to combine the color filter substrate on which the seal has been drawn and to which liquid crystals have been dropped with the active matrix substrate, the pressure of atmosphere in a combining device is reduced to 1 Pa, and the two substrates are combined with each other under the atmosphere with the reduced pressure. Reducing the pressure of the atmosphere in the combining device to atmospheric pressure allows the sealed portions to be crushed.

Subsequently, the combined substrates are subjected to UV irradiation by a UV curing device so that the sealing resin is temporarily cured. Thereafter, the substrates are baked so that the sealing resin is finally cured. At this point, liquid crystals pervade the inside of the sealing resin and the cell is filled with the liquid crystals.

The color filter substrate includes colored layers (R, G, B) positioned in a matrix manner so as to correspond to individual pixels of the active matrix substrate, black matrices provided at gaps of the color layers, counter electrodes (common electrodes) etc. By combining the color filter substrate having such configuration with the active matrix substrate of the present invention and pouring and sealing liquid crystals as described above, the liquid crystal panel of the present invention is produced.

Figure 28:
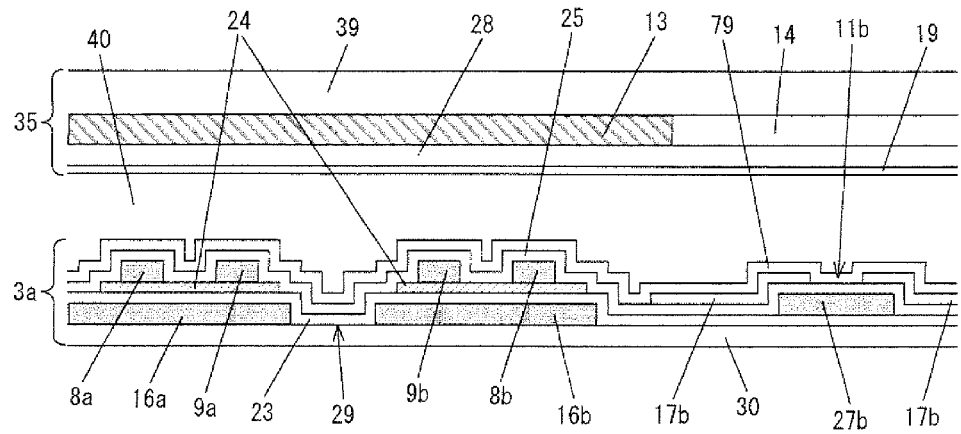
FIG. 28 is a cross sectional drawing illustrating a liquid crystal panel including the active matrix substrate of FIG. 26.

FIG. 28 is a cross sectional drawing showing an example of a liquid crystal panel including the active matrix substrate of FIG. 1. The active matrix substrate 3a has been already explained above with reference to FIG. 26. As shown in FIG. 28, the color filter substrate 35 includes: a substrate 39; a black matrix (BM) 13 and ROB colored layers 14 provided on the substrate 39; a common electrode 28 (counter electrode) provided on the black matrix 13 and the RGB colored layers 14; and an orientation layer 19 covering the common electrode 28. A liquid crystal layer 40 is provided between the color filter substrate 35 and the active matrix substrate 3a.

Detection of SG leakage (short-circuit) and the step of repairing a short-circuit may be carried out in the step of producing an active matrix as described above. Alternatively, the detection of SG leakage (short-circuit) and the step of repairing a short-circuit may be carried out after production of a liquid crystal panel.

For example, polarization plates are provided on both sides of a liquid crystal panel, a predetermined electronic signal is supplied to the liquid crystal panel, and light is irradiated to the back side of the liquid crystal panel so as to display a predetermined image. When SG leakage occurs, a pixel region on the short-circuited scanning signal line and a pixel region including a transistor connected with the short-circuited data signal line are recognized as a cross-shaped defect. Therefore, the position of short-circuited coordinates (SG leakage position) can be detected by recognizing the cross point of the cross with a microscope from the side of the active matrix substrate (see FIG. 11). For example, when the data signal line 15 and the first scanning electrode section 16a get short-circuited (SG leakage), repairing is carried out in such a manner that the electrode is cut at the first end portion EP1 (inside a pixel region) and the third end portion EP3 (outside the data signal line 15) of the active matrix substrate 3a (see FIGS. 1 and 6), separating the first scanning electrode section 16a short-circuited with the data signal line 15 from the main part of the scanning signal line 16.

Figure 29:
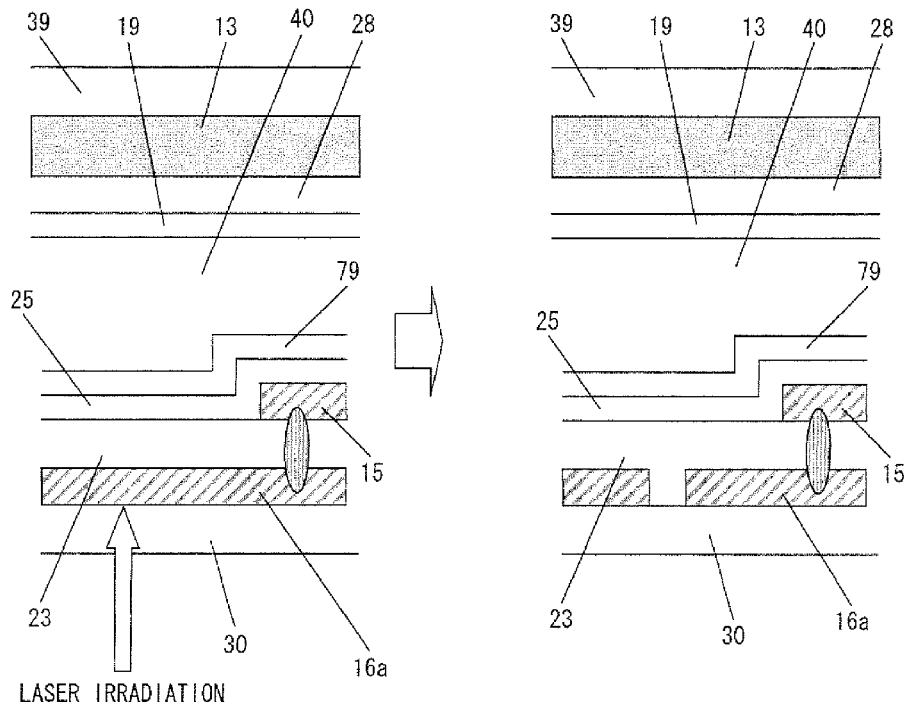
FIG. 29 is a cross sectional drawing illustrating how to repair a liquid crystal panel of FIG. 28.

FIG. 29 is a cross sectional drawing illustrating how the electrode is cut at the third end portion EP3 (outside the data signal line 15). As illustrated in FIG. 29, cut of the electrode (separation by breakage) is carried out by irradiating laser to the backside of the liquid crystal panel.

As described above, it is suffice to carry out detection of SG leakage (short-circuit) and the step of repairing a short-circuit at the stage of an active matrix substrate or at the stage of a liquid crystal panel. Alternatively, the detection of SG leakage (short-circuit) and the step of repairing a short-circuit may be carried out both at the stage of an active matrix substrate and at the stage of a liquid crystal panel. This allows more surely preventing a defective product from being sent to a subsequent stage (such as a stage of producing a later-mentioned liquid crystal unit and a later-mentioned television receiver).

Figure 20:
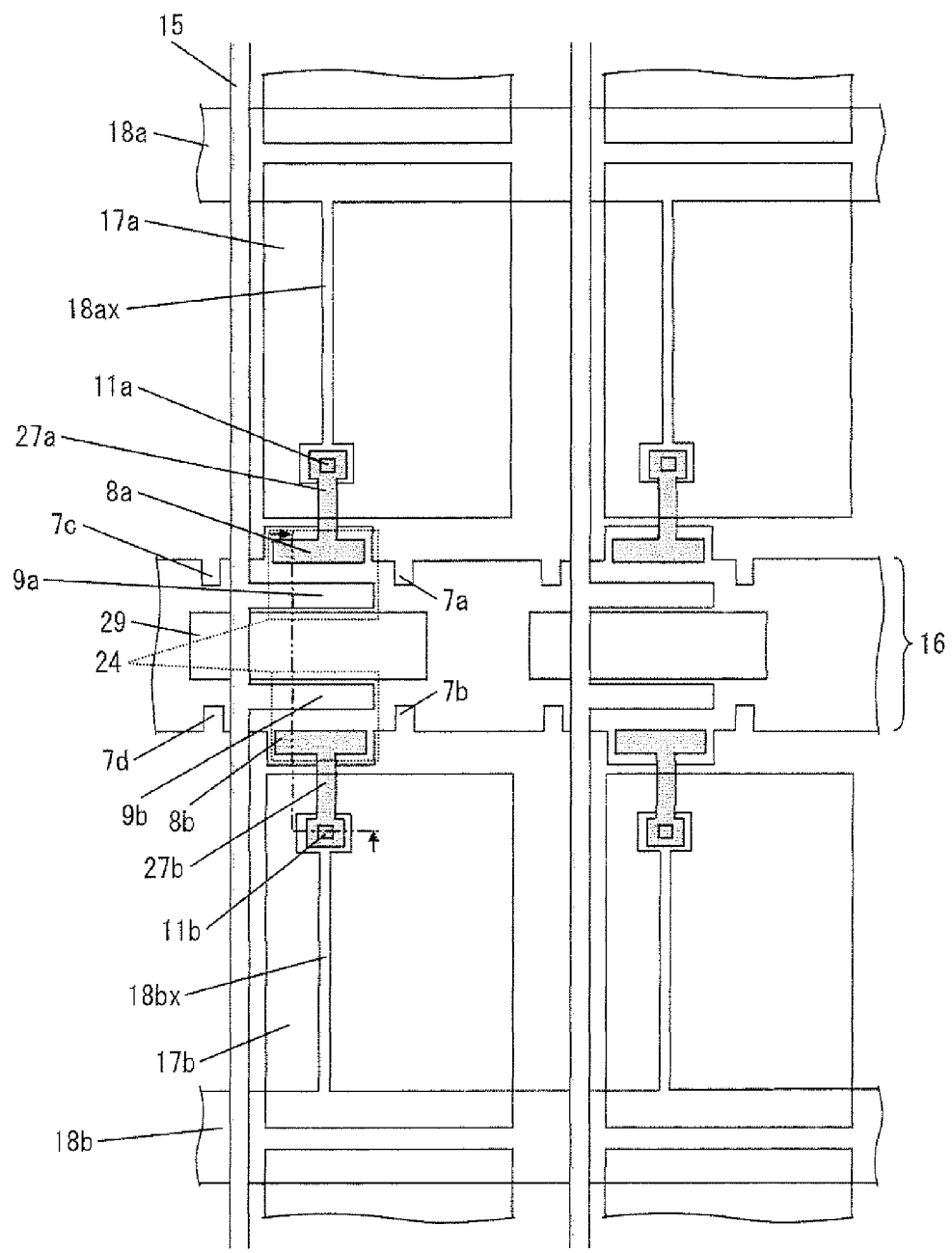
FIG. 20 is a plane drawing illustrating a modification example of the active matrix substrate of FIG. 1.
Figure 35:
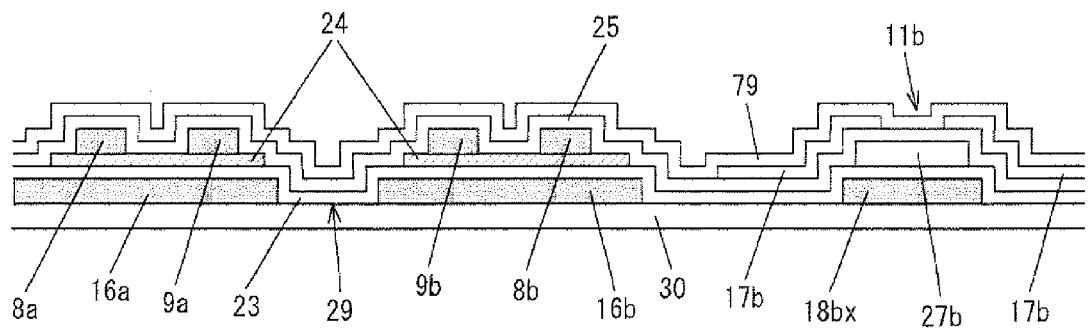
FIG. 35 is a cross sectional drawing illustrating the active matrix substrate of FIG. 20 viewed in an arrow direction of FIG. 20.

The active matrix substrate of the present invention may be configured as shown in FIG. 20. In this configuration, a first retention capacitor line extending section 18ax is drawn from the first retention capacitor line 18a, and an end portion of the first retention capacitor line extending section 18ax overlaps an end portion of the drain drawing line 27a. Further, a second retention capacitor line extending section 18bx is drawn from the second retention capacitor line 18b, and an end portion of the second retention capacitor line extending section 18bx overlaps an end portion of the drain drawing line 27b. A first contact hole 11a connecting the first drain drawing line 27a and the first pixel electrode 17a is provided on the end portion of the first drain drawing line 27a, and a second contact hole 11b connecting the second drain drawing line 27b and the second pixel electrode 17b is provided on the end portion of the second drain drawing line 27b. FIG. 35 is a cross sectional drawing of FIG. 20 viewed in an arrow direction of FIG. 20. As illustrated in FIG. 35, the second retention capacitor line extending section 18bx is provided on the substrate 30 and is overlapped by the second drain drawing line 27b provided on the gate insulating film 23. Further, the second contact hole 11b is provided on the overlapping portion. Other portions of this configuration are the same as those of the configuration in FIG. 26.

Figure 36:
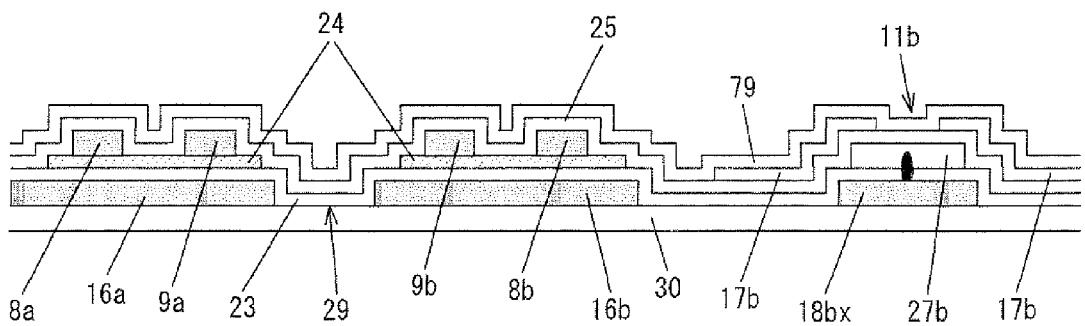
FIG. 36 is a cross sectional drawing explaining how a retention capacitor line extending section is melt-connected with a drain electrode in the active matrix substrate of FIG. 20.

With this configuration, when the data signal line 15 and the second scanning electrode section 16b get short-circuited, repairing is carried out in such a manner that the second scanning electrode section 16b short-circuited with the data signal line 15 is separated from the main part of the scanning signal line 16 and an end portion of the drain drawing line 27b is melt-connected with an end portion of the second retention capacitor line extending section 18bx (see FIG. 36), allowing the second pixel electrode 17b to be connected with the second retention capacitor line 18b. That is, when the data signal line 15 and the second scanning electrode section 16b get short-circuited, it is possible to reduce the potential of the second pixel electrode 17b to the potential of the second retention capacitor line 18b, and to change a sub-pixel including the second pixel electrode 17b connected with a defective transistor to a black point in a liquid crystal display device including the active matrix substrate of the present invention. When melt-connecting the end portion of the drain drawing line and the end portion of the retention capacitor line, it is also possible to remove a defective contact (defective connection between a pixel electrode and a drain drawing line) derived from the remnant of an interlayer insulating film in a contact hole etc.

Figure 2:
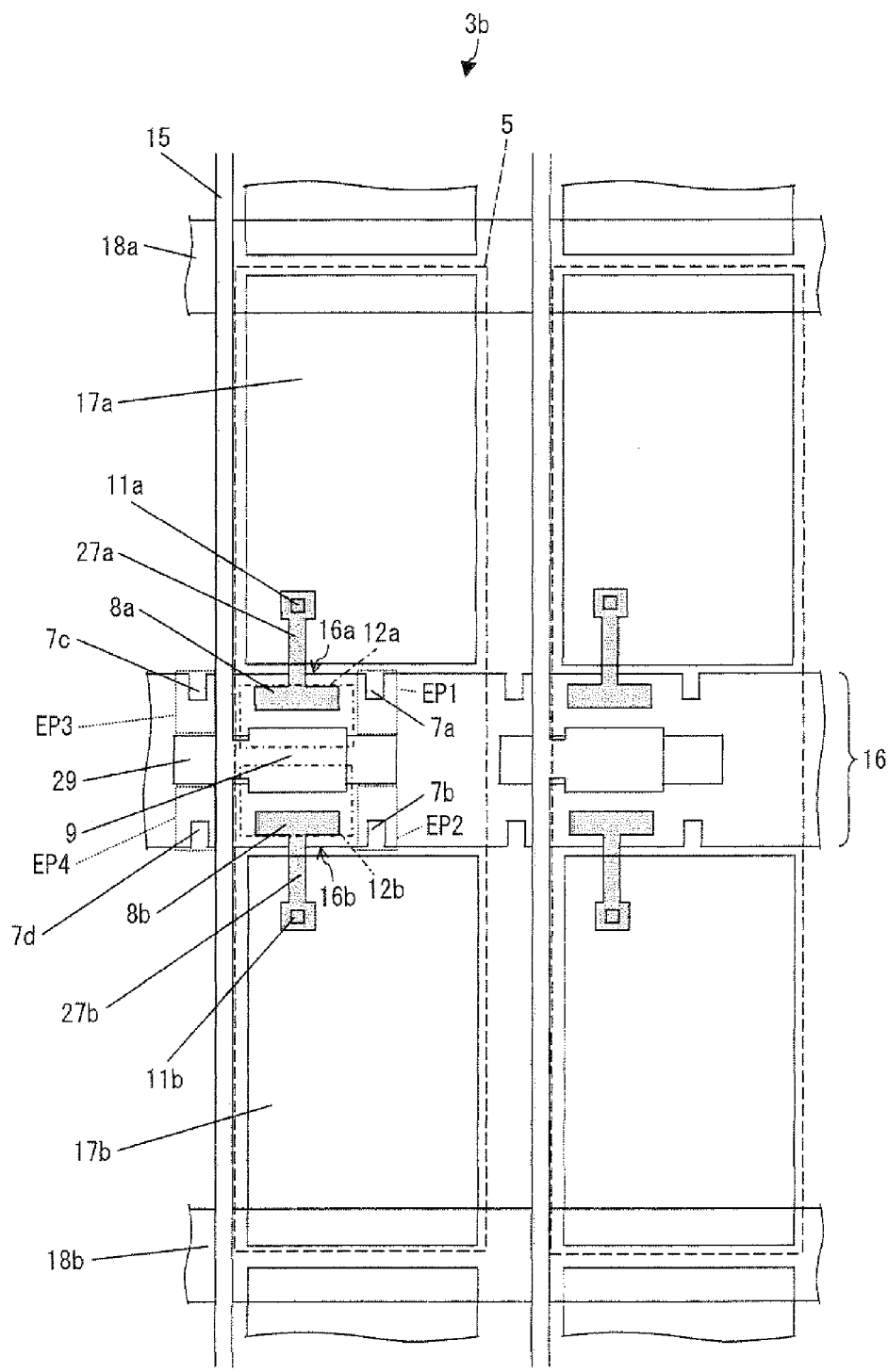
FIG. 2 is a plane drawing illustrating another configuration of an active matrix substrate in accordance with the present embodiment.

The active matrix substrate of the present invention may be configured as shown in FIG. 2. An active matrix substrate 3b is configured such that a common source electrode 9 drawn from the data signal line 15 into a pixel region serves as both a source electrode of a first transistor and a source electrode of a second transistor.

Specifically, Each of the scanning signal lines 16 which crosses a center of the respective pixel regions 5 has rectangular openings 29 leading from outside a pixel region to inside that pixel region by crossing under the data signal line 15. Each scanning signal line 16 has a first scanning electrode section 16a and a second scanning electrode section 16b that are provided on respective sides adjacent to a corresponding one of the openings 29, that is, sections which face each other in the column direction so as to sandwich the corresponding opening 29. A part of the first scanning electrode 16a serves as a gate electrode of the first transistor 12a, and a part of the second scanning electrode section 16b serves as a gate electrode of the second transistor 12b. The common source electrode 9 extends in a row direction in such a manner as to overlap the opening 29 and the first scanning electrode section 16a and the second scanning electrode section 16b. The drain electrode 8a of the first transistor overlaps the first scanning electrode section 16a and faces the common source electrode 9, and the drain electrode 8b of the second transistor overlaps the second scamming electrode section 16b and faces the common source electrode 9. Other portions of this configuration are the same as those of the configuration of FIG. 1.

With this configuration, there is yielded not only the effect of repairing SG leakage without using an auxiliary line etc. but also the following effect: since it is unnecessary to separate a source electrode above the opening 29, it is possible to reduce the length of the opening 29 in a column direction (upper and lower direction in the drawing). This eliminates the need to design a scanning signal line to have a large width or to have a larger width in a pixel region than in other region, allowing an open area ratio of a pixel to be higher.

Usually, a source electrode is formed in a photolithography step by applying a resist and patterning the resist by exposing the resist to light and developing the resist, and further carrying out etching by use of this pattern as a mask. Here, if the length of the opening 29 in the column direction (vertical direction in the drawing) is short, a surface height of the resist above the opening follows a surface height of the resist above the scanning electrode sections (on both sides of the opening). This causes a resist film provided above the opening to be thicker than the resist film provided above the scanning electrode sections. Hence, setting an amount of light exposure so as to suit a depth of the resist provided above the opening such that separate source electrodes can be provided to each of the transistors, causes edges of the electrodes to recede. As a result, a channel length becomes long in length. Thus, in a configuration in which electrodes drawn from the data signal line are provided separately above the opening, it is unavoidable to have a long opening 29 in a column direction (vertical direction in the drawing), such that the surface height of the resist provided above the opening does not follow the surface height of the resist provided above the scanning electrode sections. This causes the width of the scanning signal lines 16 to be broad in the pixel regions.

Figure 3:
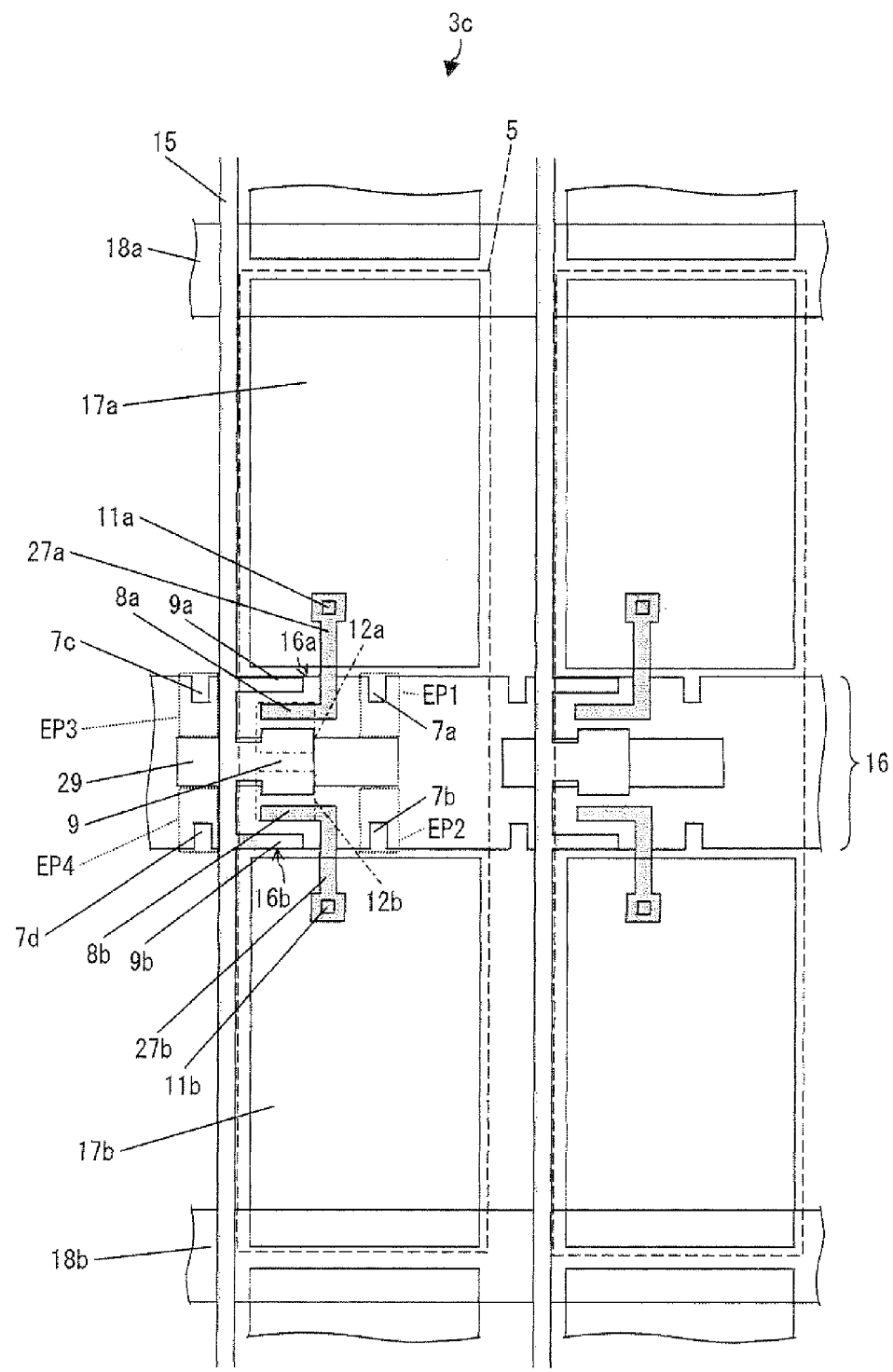
FIG. 3 is a plane drawing illustrating another configuration of an active matrix substrate in accordance with the present embodiment.

The present active matrix substrate may be configured as shown in FIG. 3. An active matrix substrate 3c is configured such that source electrodes face each other and a drain electrode is provided therebetween in each transistor.

Specifically, each of the scanning signal lines 16 which crosses a center of the individual pixel regions 5 has rectangular openings 29 leading from outside a respective pixel region to inside that pixel region by crossing under individual data signal lines 15. Each scanning signal line 16 has a first scanning electrode section 16a and a second scanning electrode section 16b that are provided on respective sides adjacent to a corresponding one of the openings 29, that is, sections which face each other in the column direction so as to sandwich the corresponding opening 29. A part of the first scanning electrode 16a serves as a gate electrode of the first transistor 12a, and a part of the second scanning electrode section 16b serves as a gate electrode of the second transistor 12b. The common source electrode 9 is drawn in the row direction in such a manner as to overlap the opening 29 and the first scanning electrode section 16a and the second scanning electrode section 16b. The source electrode 9a of the first transistor is drawn in such a manner as to overlap the first scanning electrode section 16a and to face the common source electrode 9, and the source electrode 9b of the second transistor is drawn in such a manner as to overlap the first scanning electrode section 16b and to face the common source electrode 9. Further, the drain electrode 8a of the first transistor is provided between the common source electrode 9 and the source electrode 9a in such a manner as to overlap the first scanning electrode section 16a, and the drain electrode 8b of the second transistor is provided between the common source electrode 9 and the source electrode 9b in such a manner as to overlap the second scanning electrode section 16b. Other portions of this configuration are the same as those of the configuration of FIG. 1.

With this configuration, there is yielded not only the effect of repairing SG leakage without using an auxiliary line etc. but also the following effect: since channels are provided on either side of a drain electrode in each transistor, it is possible to make a channel width smaller and to reduce short-circuits between a source electrode and a drain electrode due to debris or the like.

Figure 8:
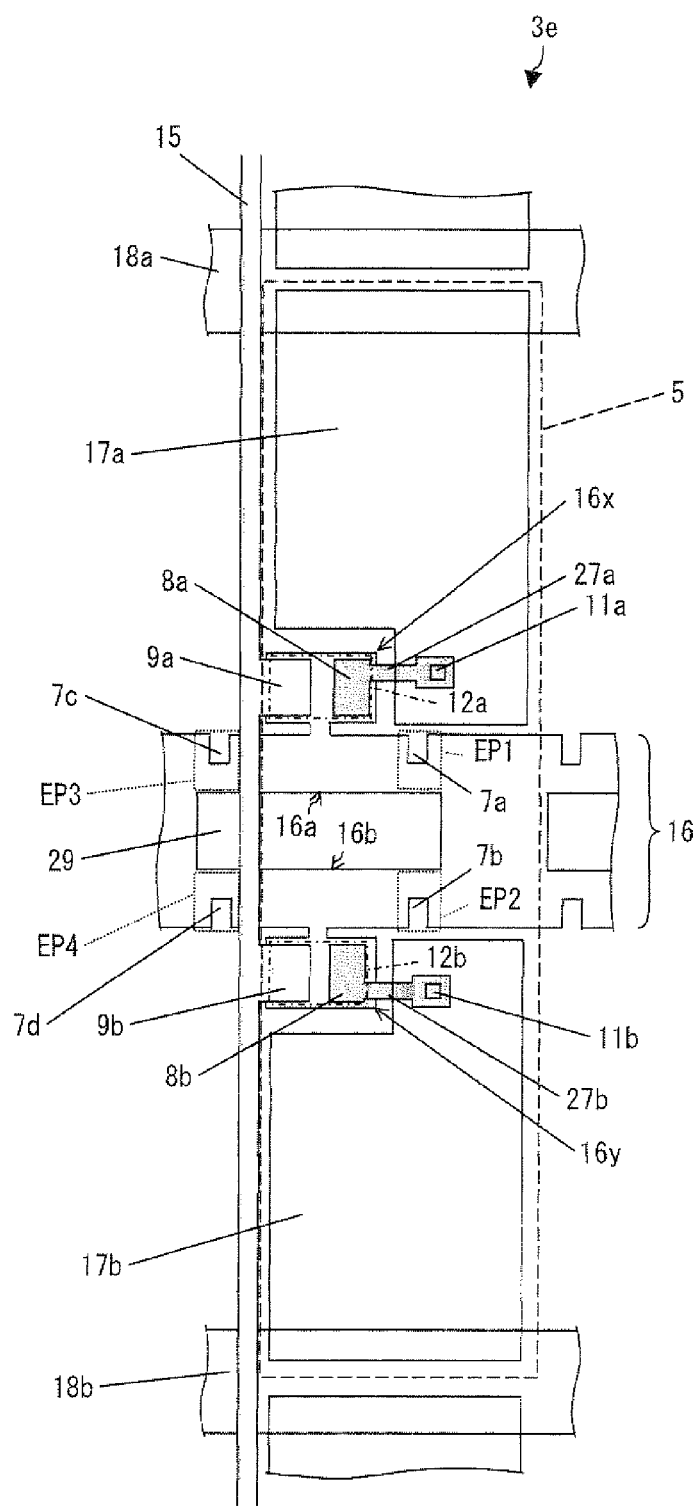
FIG. 8 is a plane drawing illustrating another configuration of an active matrix substrate in accordance with the present embodiment.

The present active matrix substrate may be configured as shown in FIG. 8. An active matrix substrate 3e is configured such that gate extending sections 16x and 16y are drawn in the column direction from their respective scanning electrodes 16a and 16b (in a direction away from the opening 29). Further, the gate extending section 16x serves as a gate electrode of the first transistor 12a, and the gate extending section 16y serves as a gate electrode of the second transistor 12b.

Specifically, the source electrode 9a of the first transistor is drawn in the row direction in such a manner as to overlap the gate extending section 16x, and the drain electrode 8a of the first transistor is provided in such a manner as to overlap the gate extending section 16x and to face the source electrode 9a. Similarly, the source electrode 9b of the second transistor is drawn in the row direction in such a manner as to overlap the gate extending section 16y, and the drain electrode 8b of the second transistor is provided in such a manner as to overlap the gate extending section 16y and to face the source electrode 9b. Other portions of this configuration are the same as those of the configuration of FIG. 1.

Figure 9:
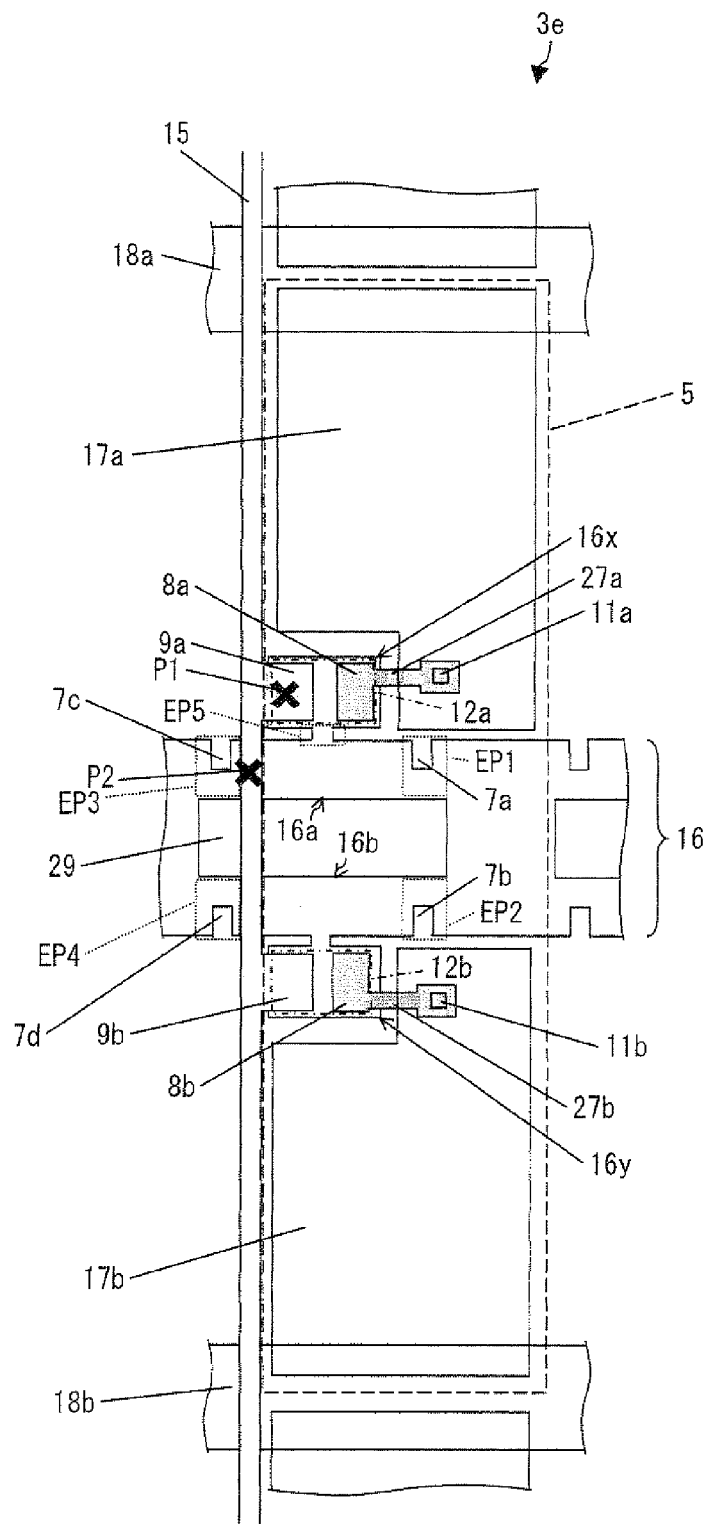
FIG. 9 is a plane drawing illustrating how to repair SG leakage in the active matrix substrate of FIG. 8.

In the active matrix substrate 3e, when a short-circuit occurs at an intersection P1 of the source electrode 9a and the gate extending section 16x, SG leakage can be repaired by cutting a root EP5 at the gate extending section 16x, as illustrated in FIG. 9. Of course, the electrode may be cut at the first end portion EP1 and the third end portion EP3 in this case (when a short-circuit occurs at the intersection P1). However, when a short-circuit occurs at an intersection P2 of the data signal line 15 and the first scanning signal electrode 16a, the electrode needs to be cut at the first end portion EP1 and the third end portion EP3. That is, even if a short-circuit occurs at either of the intersections P1 and P2, the short-circuit can be repaired by cutting the electrode at the first end portion EP1 and the third end portion EP3.

Figure 4:
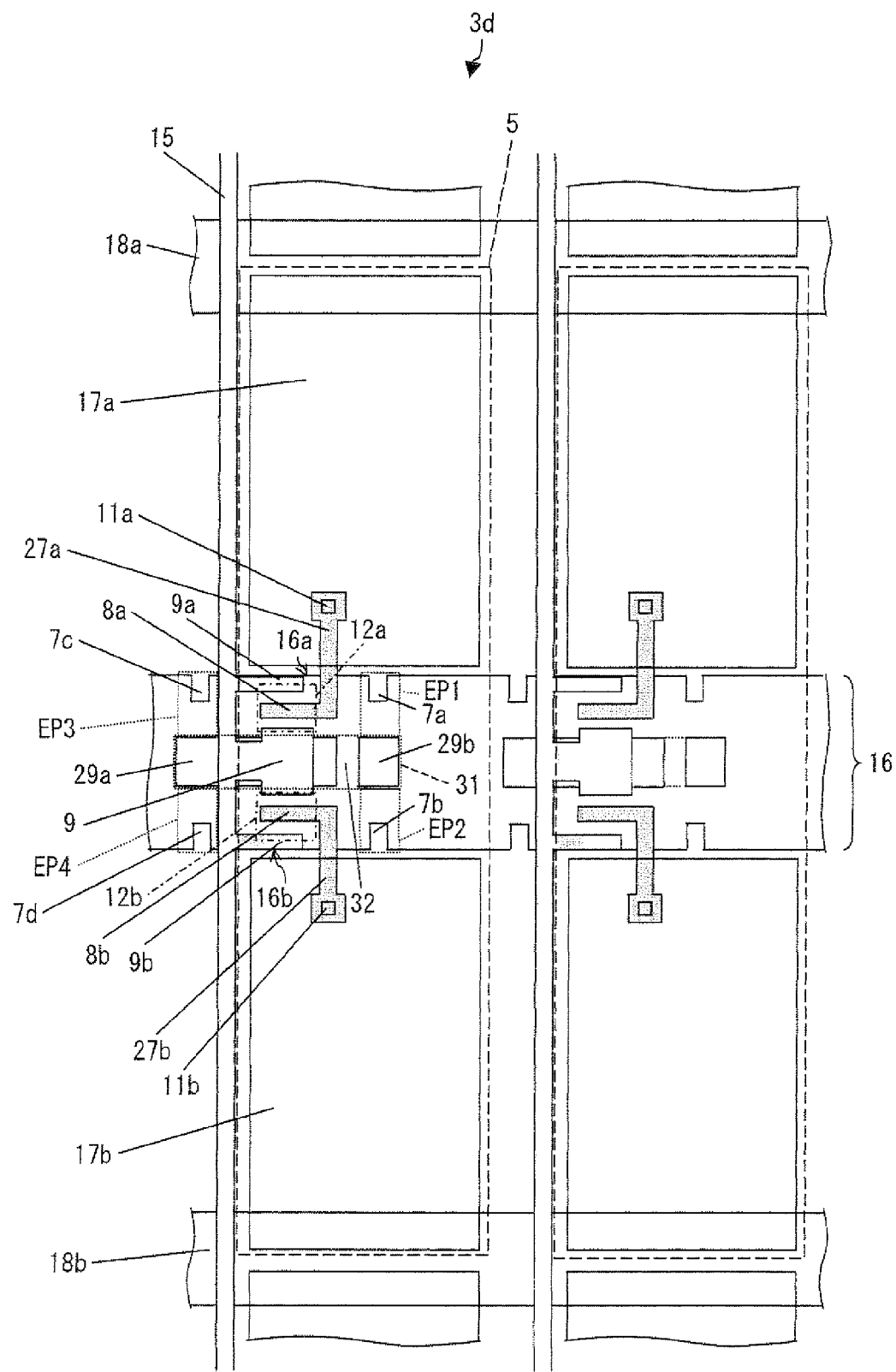
FIG. 4 is a plane drawing illustrating another configuration of an active matrix substrate in accordance with the present embodiment.

The present active matrix substrate may be configured as shown in FIG. 4. An active matrix substrate 3d is configured such that the opening of the scanning signal line 16 is divided into plural openings each with a reduced width (length in the row direction) and an edge of each opening is used for layer alignment.

Specifically, each of the scanning signal lines 16 which crosses centers of the individual pixel regions 5 has first rectangular openings 29a leading from outside a respective pixel region to inside that pixel region by crossing under individual data signal lines, second rectangular openings 29b arranged in parallel to the first openings 29a in the row direction, and bridging electrode sections 32 located in gaps between the openings 29a and the openings 29b. Parts which are on either side of a wormhole region 31 including the first opening 29a and the second opening 29b and the bridging electrode section 32 and face each other in the column direction in such a manner as to sandwich the wormhole region 31 are the first electrode section 16a and the second scanning electrode section 16b. A part of the first scanning electrode 16a serves as a gate electrode of the first transistor 12a, and a part of the second scanning electrode section 16b serves as a gate electrode of the second transistor 12b. Other portions of this configuration are the same as those of the configuration of FIG. 3.

Figure 7:
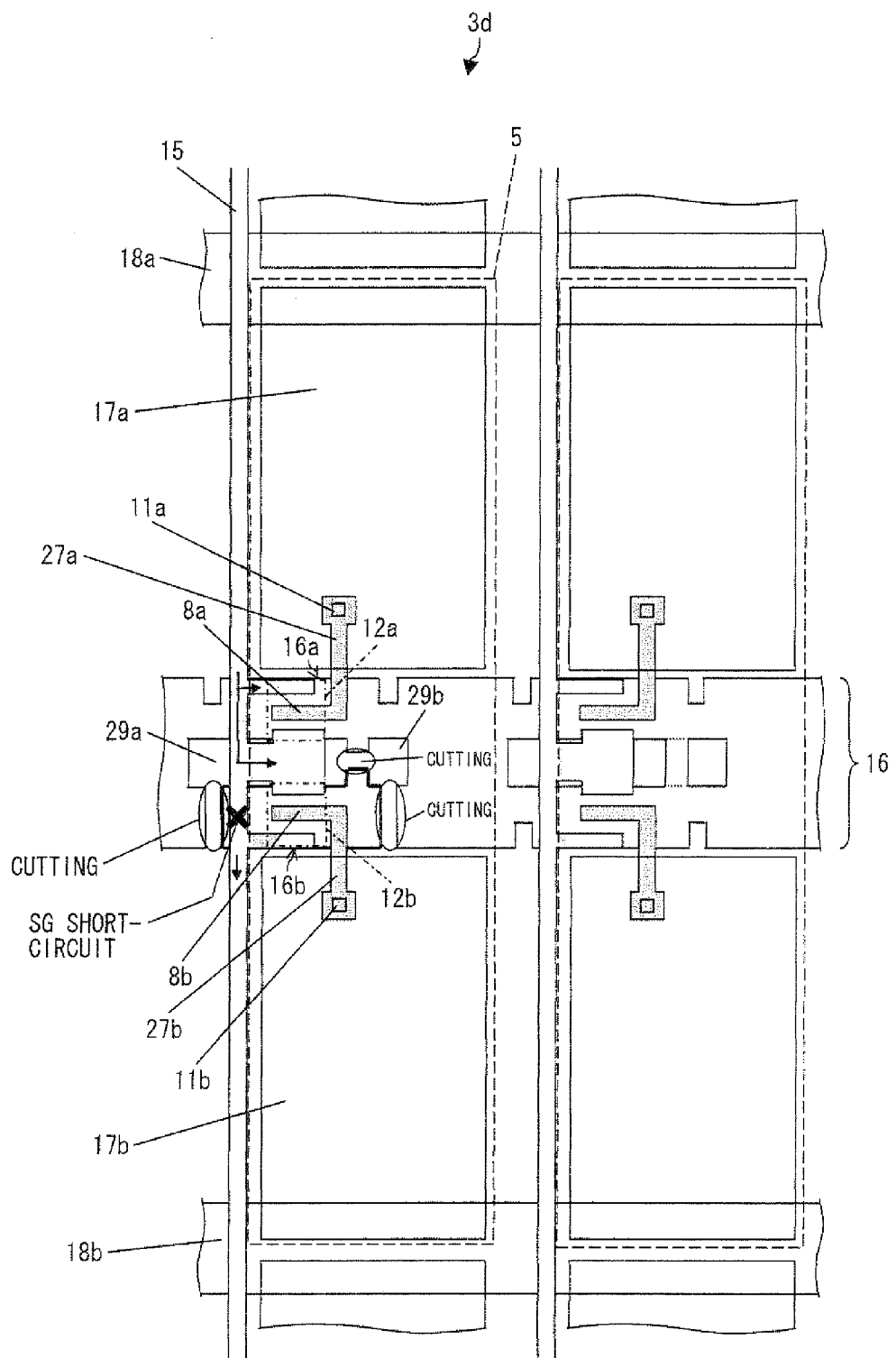
FIG. 7 is a plane drawing illustrating how to repair SG leakage in the active matrix substrate of FIG. 4.

In the active matrix substrate 3d, when a short-circuit (SG leakage) occurs between the data signal line 15 and the second scanning electrode section 16b as illustrated in FIG. 7, it is possible to carry out a step of repairing a short-circuit as follows. A part between the notch section 7b and the opening 29 in the second end portion EP2 (in a pixel region), a part between the notch section 7d and the opening 29a in the fourth end portion EP4 (outside the data signal line 15), and the bridging electrode section 32 are cut, separating the second scanning electrode section 16b short-circuited with the data signal line 15 from the main part of the scanning signal line 16. Since the present active matrix substrate is configured such that the source electrode 9b and the drain electrode 8b of the second transistor and the drain drawing line 27b are provided in such a manner as not to overlap the second end portion EP2, it is possible to easily and surely cut the electrode at the second end portion EP2. Further, when a short-circuit occurs between the source electrode 9b of the second transistor and the second scanning electrode section 16b, it is only necessary to carry out the same step of repairing a short-circuit as mentioned above.

The step of repairing a short-circuit allows supplying a signal potential from the data signal line 15 to the first transistor 12a and transistors subsequent to the second transistor 12b, without using an auxiliary line etc. After the step of repairing a short-circuit, the second transistor 12b remains as a defect. However, this defect influences only a half of one pixel region, and a region influenced by the defect appears as a black point in a normally black liquid crystal display panel, and therefore the defect causes a very little influence on display quality.

In a photolithography step, there is a case where an image of a pattern edge is automatically recognized and a state of alignment is analyzed based on a result of the recognition. For example, when a state of alignment of the scanning signal line extending in the row direction with the data signal line extending in the column direction is analyzed in the active matrix substrate 3a of FIG. 1, two edges (two sides along the column direction) of the opening provided on the scanning signal line are detected and a center line of the edges is determined. Thereby, a standard position of the scanning signal line is determined. Further, edges of the data signal line along the row direction is detected and a center line of the edges is determined. Then, a state of alignment is determined by measuring a distance between those center lines.

In this case, two edges of the opening need to be inside a pattern edge detectable region. However, if each transistor increases in size as a liquid crystal panel is made larger, the opening for allowing repairing SG leakage is also larger and there might be some cases where two edges of the opening are outside the pattern edge detection region and a state of alignment cannot be analyzed.

However, in the active matrix substrate 3d of FIG. 4, by providing two openings on the scanning signal line 16 (dividing one opening by the bridging electrode section 32), both edges (two sides along the column direction) of the first opening 29a can be inside the pattern edge detection region. With this, also in a large-sized liquid crystal panel, a state of alignment can be determined with use of two edges of the opening provided on the scanning signal line.

Figure 10:
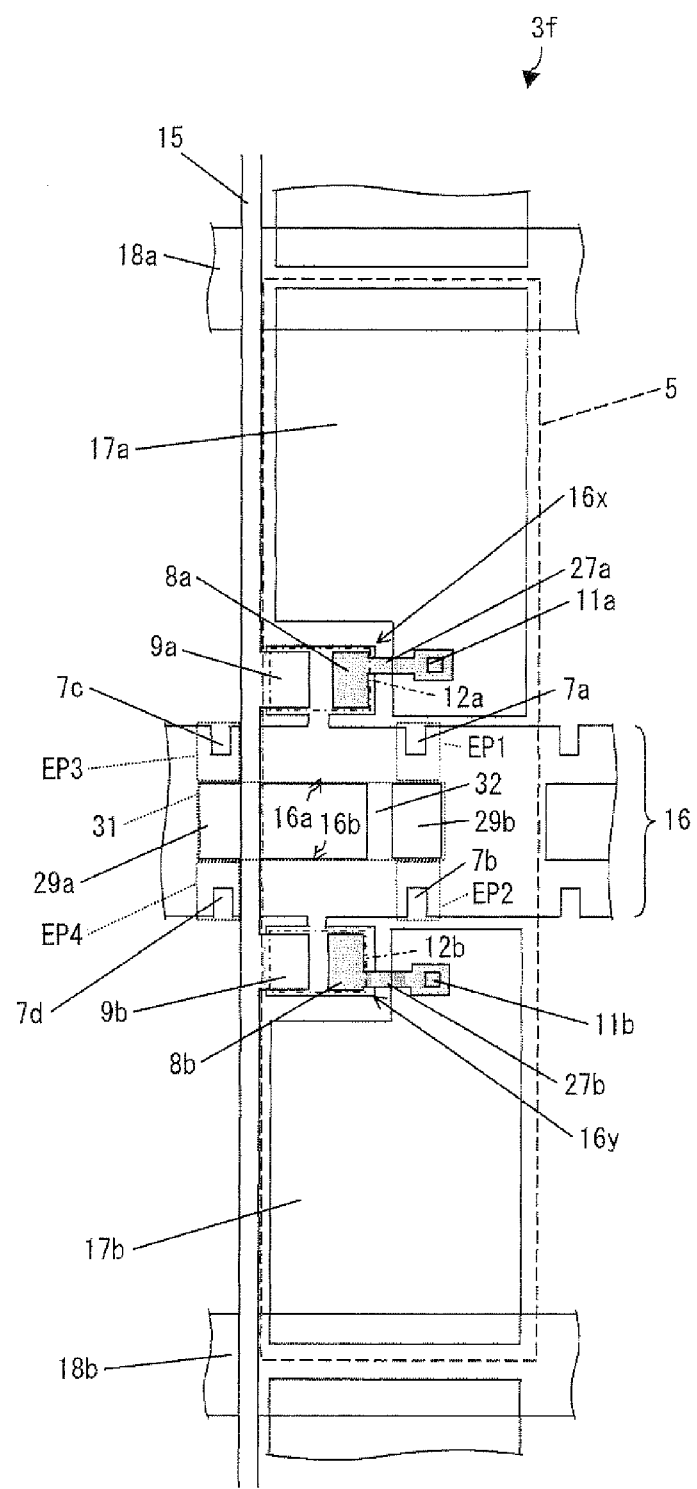
FIG. 10 is a plane drawing illustrating another configuration of an active matrix substrate in accordance with the present embodiment.

The present active matrix substrate may be configured as shown in FIG. 10. In an active matrix substrate 3f, each of the scanning signal lines 16 which crosses centers of the individual pixel regions 5 has first rectangular openings 29a leading from outside a respective pixel region to inside that pixel region by crossing under individual data signal lines, second rectangular openings 29b arranged in parallel to the first openings 29a in the row direction, and bridging electrode sections 32 located in gaps between the openings 29a and the openings 29b. Parts which are on either side of a wormhole region 31 including the first opening 29a and the second opening 29b and the bridging electrode section 32 and face each other in the column direction so as to sandwich the wormhole region 31 are the first electrode section 16a and the second scanning electrode section 16b. Here, the gate extending sections 16x and 16y are drawn from their respective scanning electrode sections (16a and 16b) in the column direction (in a direction away from the wormhole region 31). The gate extending section 16x serves as a gate electrode of the first transistor 12a, and the gate extending section 16y serves as a gate electrode of the second transistor 12b.

In the active matrix substrate 3f, whether a short-circuit occurs at an intersection of the source electrode 9a and the gate extending section 16x or at an intersection of the data signal line 15 and the first scanning electrode 16a, the short-circuit can be repaired by cutting the electrode at the first end portion EP1, the third end portion EP3, and the bridging electrode 32. Further, even if a liquid crystal panel is made larger, a state of alignment can be determined with use of both edges (two sides along the column direction) of the first opening 29a provided on the scanning signal line.

Figure 21:
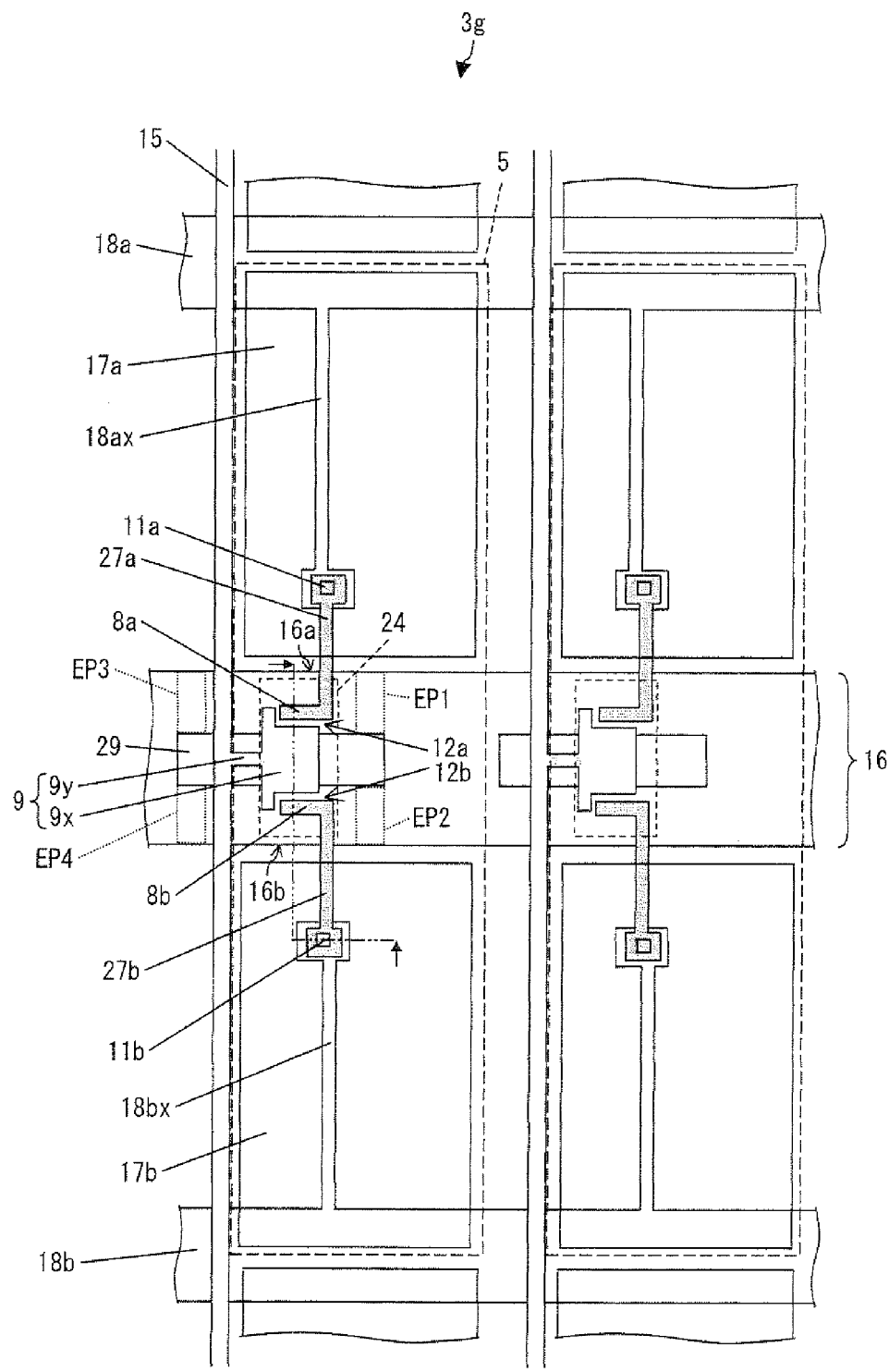
FIG. 21 is a plane drawing illustrating further another configuration of an active matrix substrate in accordance with the present embodiment.

The present active matrix substrate may be configured as shown in FIG. 21. An active matrix substrate 3g is configured such that an electrode (a main electrode 9x) serving as the source electrode common to the first and second transistors can be easily separated from the data signal line 15.

Figure 30:
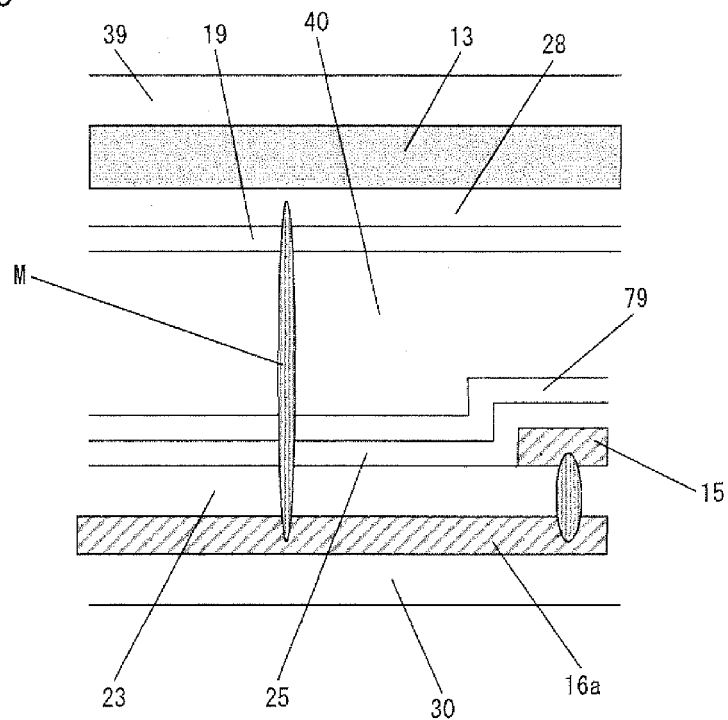
FIG. 30 is a cross sectional drawing illustrating an example of a failure in repairing in FIG. 29.

When SG leakage is found in a pixel (pixel region), this might be caused by a short-circuit between the data signal line 15 and the first scanning electrode section 16a or the second scanning electrode section 16b or by a short circuit between the source electrode and the first scanning electrode section 16a or the second scanning electrode section 16b. Here, for example, by cutting the electrode at the first end portion EP1 (in a pixel region) and the third end portion EP3 (outside the data signal line 15) and separating the first scanning electrode section 16a from the main part of the scanning signal line 16 as illustrated in FIG. 6, a short-circuit between the first scanning electrode section 16a and the source electrode 9a can be repaired. However, for example, in a case where the scanning signal line 16 is provided to be thick for reducing resistance, it is easier to cut the source electrode 9a or 9b than to cut the scanning signal line 16. When the scanning signal line is cut at the stage of a liquid crystal panel in this case (in a case where the scanning signal line 16 is made thick), G-C leakage (a short-circuit between the scanning signal line and the common electrode) might be newly caused by a broken piece M of a gate metal, as illustrated in FIG. 30. If so, it may be an effective method to cut the source electrode first (before cutting the scanning signal line 16) when it is unknown whether SG leakage found in a pixel (pixel region) is caused by a short circuit between the data signal line 15 and the first scanning electrode section 16a or the second scanning electrode section 16b or by a short circuit between the source electrode and the first scanning electrode section 16a or the second scanning electrode section 16b.

In view of these circumstances, the active matrix substrate 3g of FIG. 21 is configured such that the main electrode 9x serving as a source electrode common to the first and second transistors 12a and 12b and a connecting electrode 9y connecting this main electrode 9x to the data signal line 15 are provided, and the connecting electrode 9y is arranged above the opening 29 and has a shape wider in width in the row direction than in the column direction (a shape extending long and thin in the row direction). Further, the drain electrode 8a of the first transistor 12a is provided to face one side of the main electrode 9x and the drain drawing wire 27a is drawn from the drain electrode 8a. Further, the drain electrode 8b of the second transistor 12b is provided to face the other side of the main electrode 9x and the drain drawing wire 27b is drawn from the drain electrode 8b.

Figure 31:
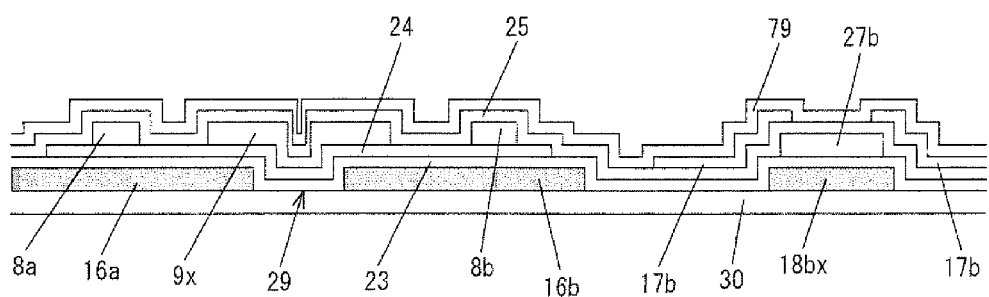
FIG. 31 is a cross sectional drawing illustrating the active matrix substrate of FIG. 21 viewed in an arrow direction of FIG. 21.

In the active matrix substrate 3g, each of the scanning signal lines 16 which crosses centers of the individual pixel regions 5 has rectangular openings 29 leading from outside a respective pixel region to inside that pixel region by crossing under individual data signal lines 15. Each scanning signal line 16 has a first scanning electrode section 16a and a second scanning electrode section 16b that are provided on respective sides adjacent to a corresponding one of the openings 29, that is, sections which face each other in the column direction so as to sandwich the corresponding opening 29. A part of the first scanning electrode 16a serves as a gate electrode of the first transistor 12a, and a part of the second scanning electrode section 16b serves as a gate electrode of the second transistor 12b. Furthermore, the first scanning electrode 16a has two ends in the row direction, and one end which is provided inside a pixel region is indicated as a first end portion EP1 and one end which is provided outside a pixel region (outside the data signal line 15) is indicated as a third end portion EP3. Further, the second scanning electrode 16b has two ends in the row direction, and one end which is provided inside a pixel region is indicated as a second end portion EP2 and one end which is provided outside a pixel region (outside the data signal line 15) is indicated as a fourth end portion EP4. Here, the main electrode 9x is provided in such a manner as to overlap the first and second scanning electrode sections 16a and 16b but not to overlap the first and second end portions EP1 and EP2 in a pixel region. Furthermore, in a pixel region, the drain electrode 8a and the drain drawing wire 27a are provided in such a manner as to overlap the first scanning electrode section 16a but not to overlap the first end portion EP1. Further, the drain electrode 8b and the drain drawing wire 27b are provided in such a manner as to overlap the second scanning electrode section 16b but not to overlap the second end portion EP2 in a pixel region. Moreover, the first retention capacitor line extending section 18ax is drawn from the first retention capacitor line 18a, and the end portion of the first retention capacitor line extending section 18ax overlaps the end portion of the drain drawing line 27a. Further, the second retention capacitor line extending section 18bx is drawn from the second retention capacitor line 18b, and the end portion of the second retention capacitor line extending section 18bx overlaps the end portion of the drain drawing line 27b. FIG. 31 is a cross sectional drawing of FIG. 21 viewed in an arrow direction of FIG. 21. Other portions of this configuration than the main electrode 9x provided as the source electrode common to the transistors 12a and 12b are the same as those of the configuration of FIG. 35.

Figure 22:
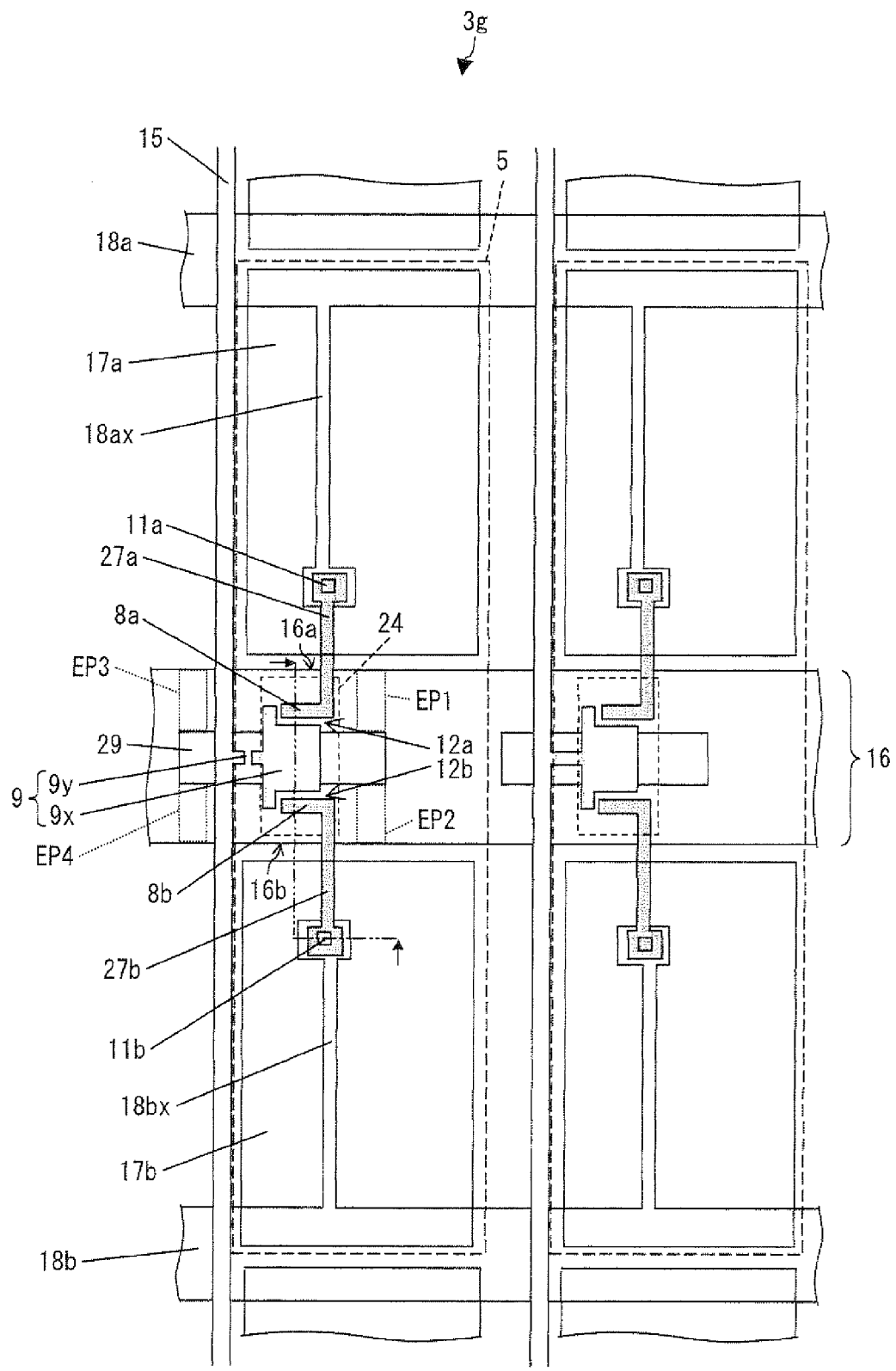
FIG. 22 is a plane drawing illustrating how to repair the active matrix substrate of FIG. 21.
Figure 32:
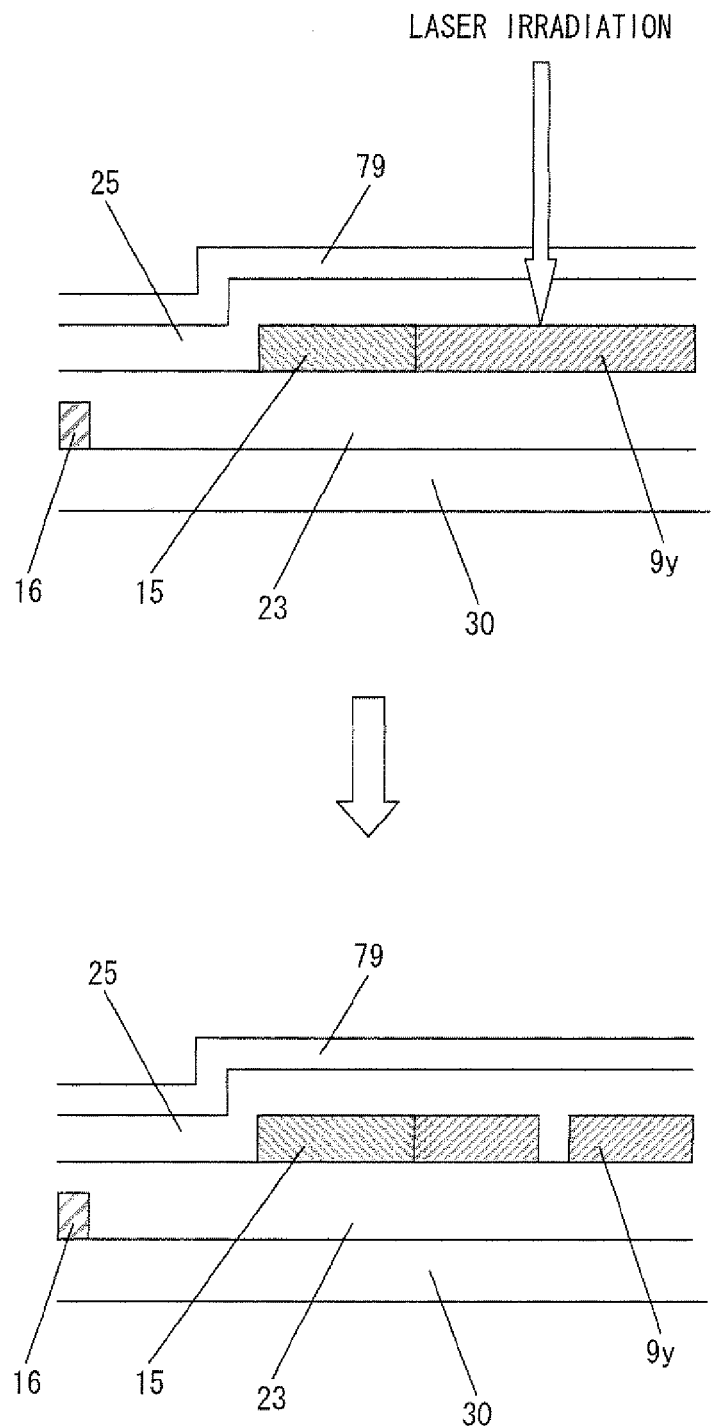
FIG. 32 is a cross sectional drawing illustrating how to repair the active matrix substrate of FIG. 21.

In the active matrix substrate 3g of FIG. 21, in a case where SG leakage is found but it is unknown where the SG leakage occurs, the following step can be taken. As illustrated in FIG. 22, the connecting electrode 9y is cut first so as to separate the main electrode 9x (common source electrode) from the data signal line 15. When the SG leakage is not repaired by this cut, the electrode is cut at the first end portion EP1 (in a pixel region) and the third end portion EP3 (outside the data signal line 15) so as to separate the first scanning electrode section 16a from the main part of the scanning signal line 16. FIG. 32 is a cross sectional view illustrating how the connecting electrode 9y is cut. As illustrated in FIG. 32, cut of the electrode (separation by breakage) is carried out by irradiating laser to the surface of the active matrix substrate.

Furthermore, the main electrode 9x has a hat shape. A part of an edge of the main electrode 9x which part is in contact with a channel region between the drain electrode 8a of the first transistor 12a and the main electrode 9x is L-shaped, and a part of an edge of the main electrode which part is in contact with a channel region between the drain electrode 8b of the second transistor 12b and the main electrode 9x is L-shaped. With this, a sufficient channel width can be secured even in such a configuration as the active matrix substrate 3g in which it is only the main electrode 9x that serves as the source electrode of the first transistor 12a and the source electrode of the second transistor 12b.

Figure 33:
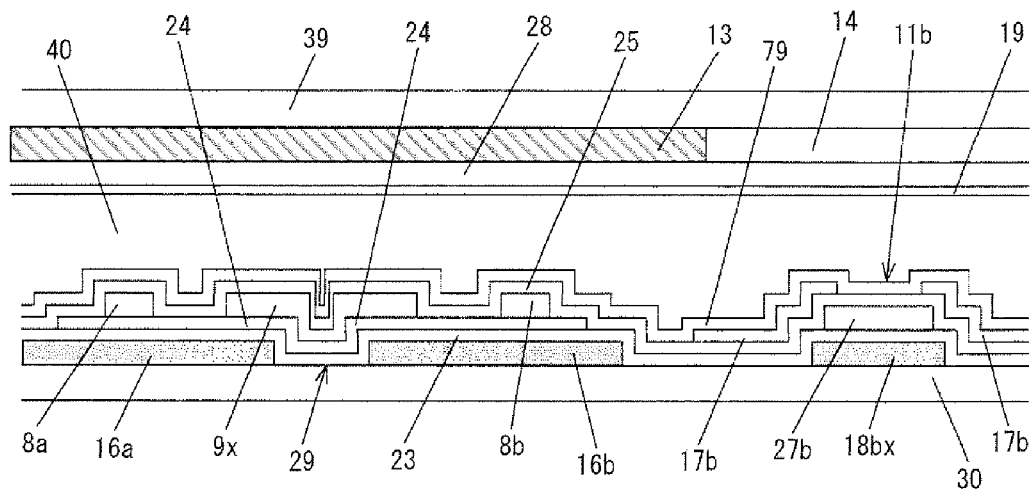
FIG. 33 is a cross sectional drawing illustrating a liquid crystal panel including the active matrix substrate of FIG. 31.
Figure 34:
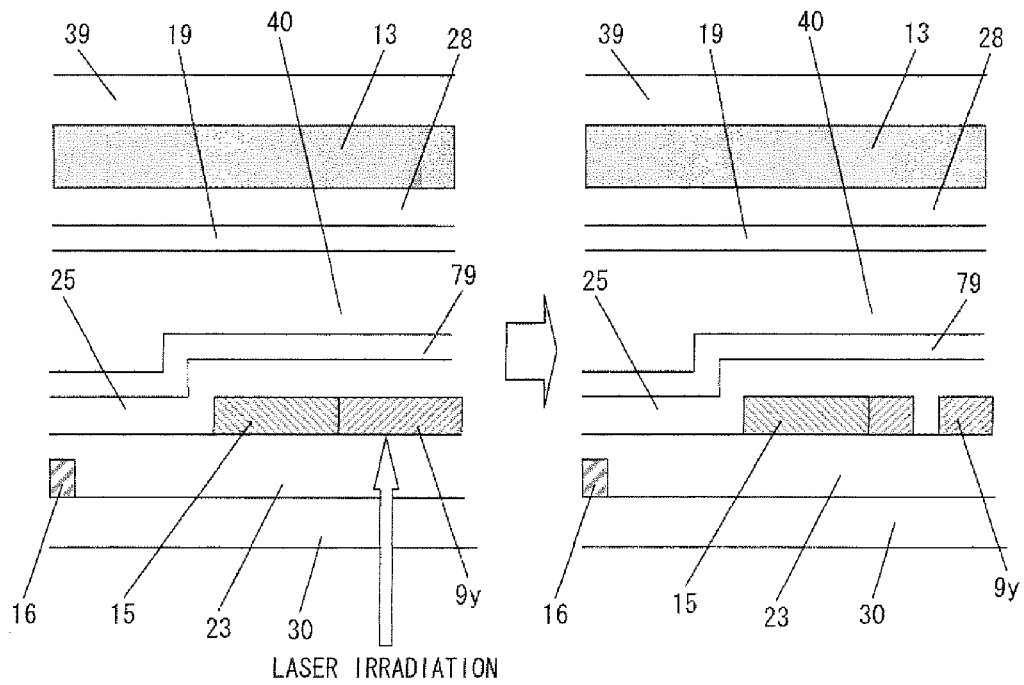
FIG. 34 is a cross sectional drawing illustrating how to repair the liquid crystal panel of FIG. 33.

FIG. 33 is a cross sectional drawing showing an example of a liquid panel including the active matrix substrate of FIG. 21. Also for FIG. 33, other portions of the configuration than the main electrode 9x provided as the source electrode common to the transistors 12a and 12b are the same as those of the configuration of FIG. 28. FIG. 34 is a cross sectional drawing illustrating how the connecting electrode 9y is cut at the stage of a liquid crystal panel. As illustrated in FIG. 34, cut of the electrode (separation by breakage) is carried out by irradiating laser to the backside of the liquid crystal panel.

Figure 23:
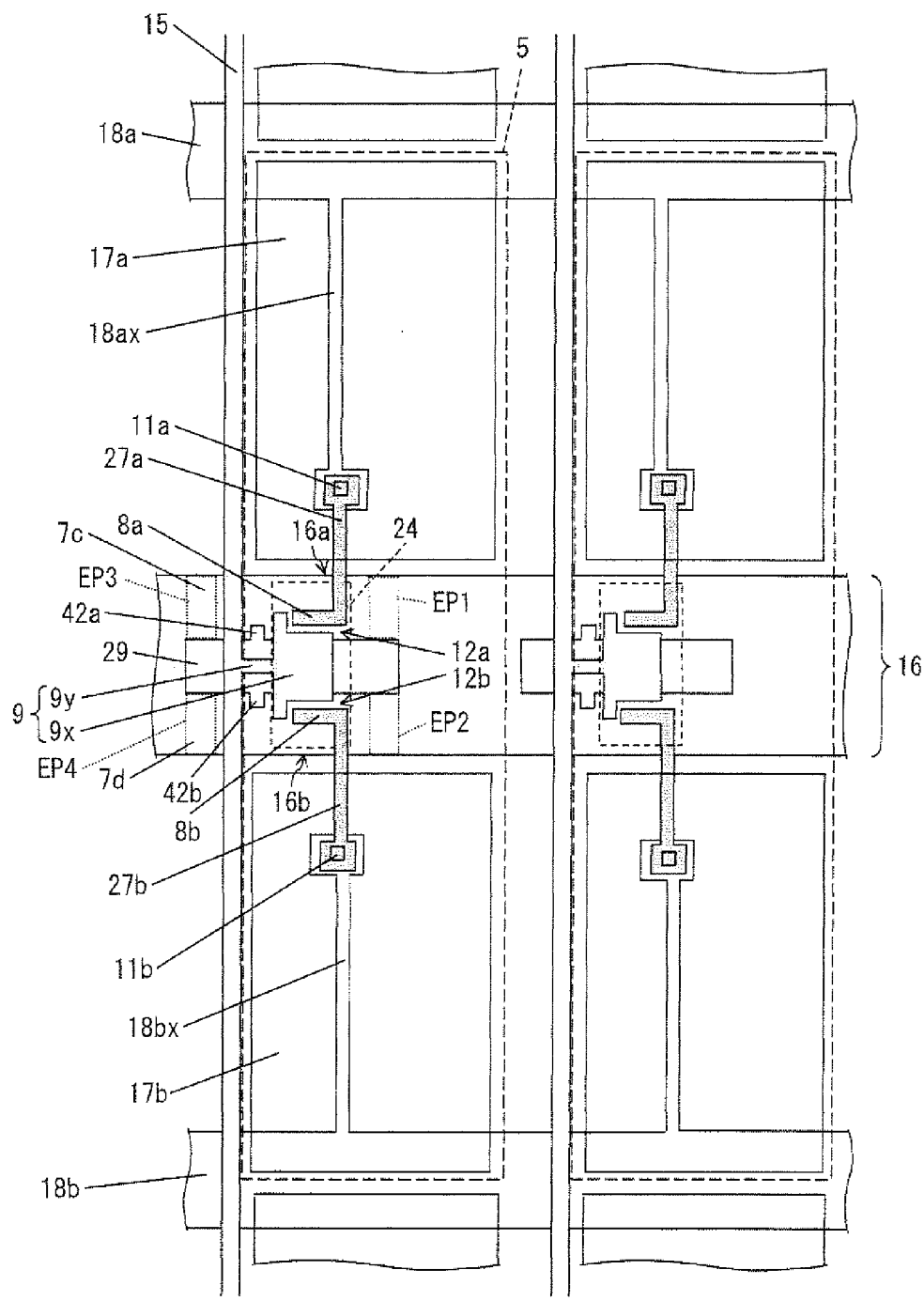
FIG. 23 is a plane drawing illustrating a modification example of the active matrix substrate of FIG. 21.

Moreover, the active matrix substrate illustrated in FIG. 21 may be configured as shown in FIG. 23: a part of the opening which part overlaps one of both regions adjacent to the connecting electrode 9y and a part of the opening which part overlaps the other of the both regions adjacent to the connecting electrode 9y are respectively bulged 42a, 42b in the column direction. This can facilitate cutting the connecting electrode 9y without the need of increasing a width of the entire opening 29 in the column direction. When the width of the entire opening 29 is increased in the column direction, a width of the scanning signal line 16 itself is larger and an open area ratio is lower. However, such a problem can be resolved with the aforementioned configuration.

Figure 24:
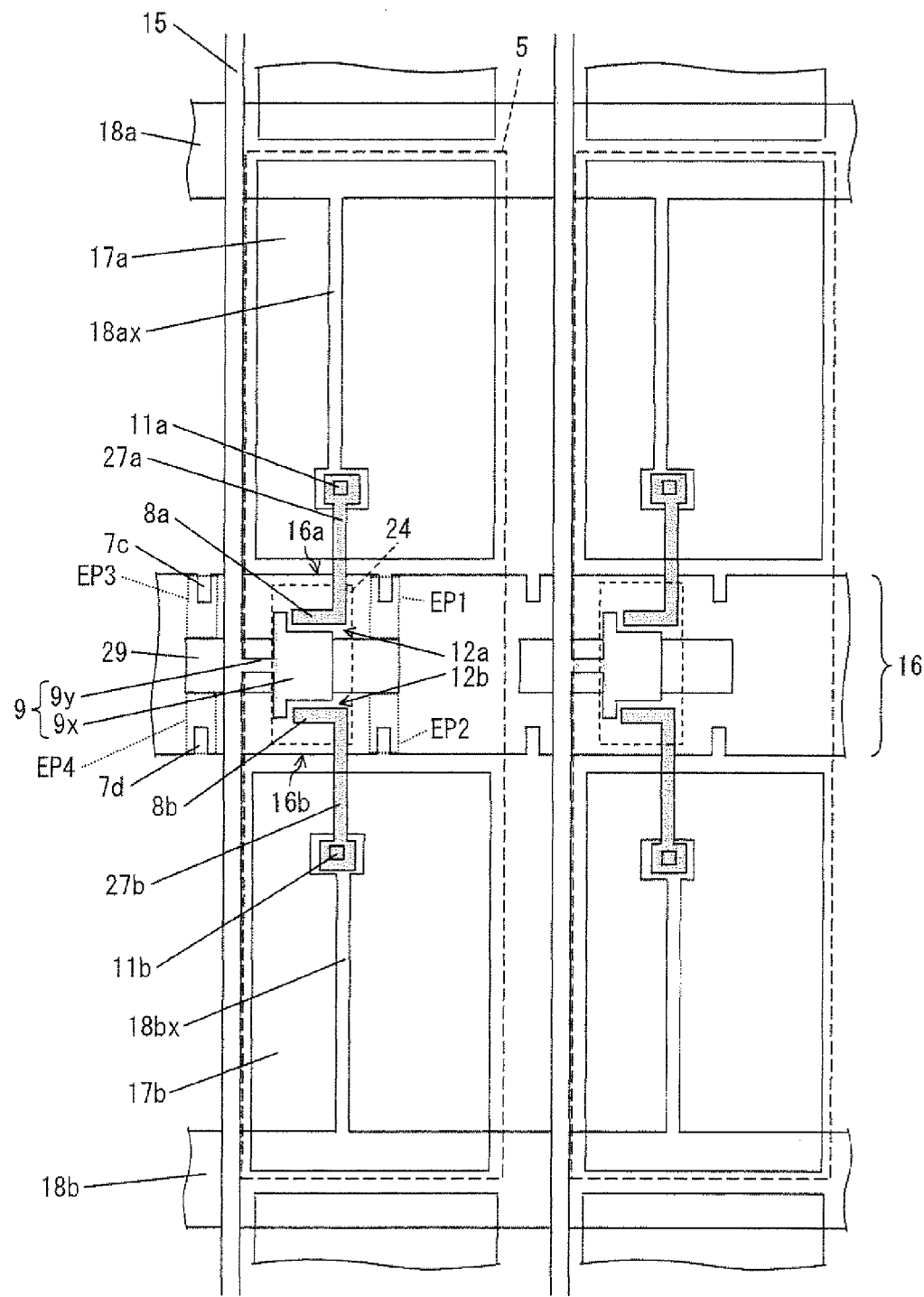
FIG. 24 is a plane drawing illustrating a modification example of the active matrix substrate of FIG. 21.

Furthermore, the active matrix substrate illustrated in FIG. 21 may be configured as shown in FIG. 24: the notch sections (7a-7d) are provided in their respective end portions (EP1-EP4) of the first and second scanning signal electrodes 16a and 16b. With this, when SG leakage is not repaired by cutting the connecting electrode 9y, it is possible to easily cut the electrode at the first end portion EP1 (in a pixel region) and the third end portion EP3 (outside the data signal line 15) or at the second end portion EP2 (in a pixel region) and the fourth end portion EP4 (outside the data signal line 15).

Figure 25:
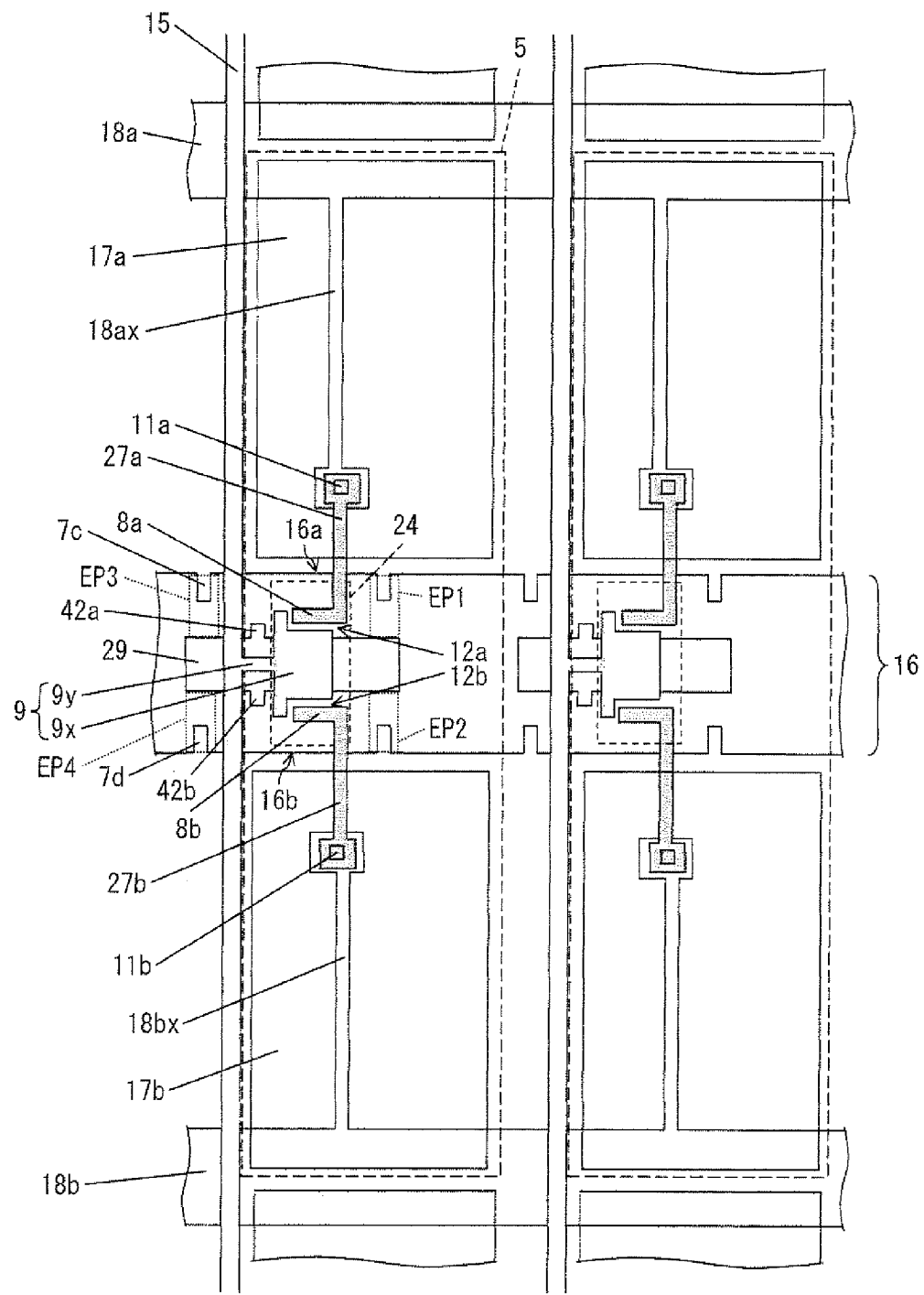
FIG. 25 is a plane drawing illustrating a modification example of the active matrix substrate of FIG. 21.

Further, as shown in an active matrix substrate of FIG. 25, it is also possible to combine together (i) the configuration of partially bulging, in the column direction, two parts of the opening 29, each of which faces the connecting electrode 9x and (ii) the configuration of providing the notch sections (7a-7d) in their respective end portions (EP1-EP4) of the first and second scanning signal electrodes 16a and 16b.

Figure 37:
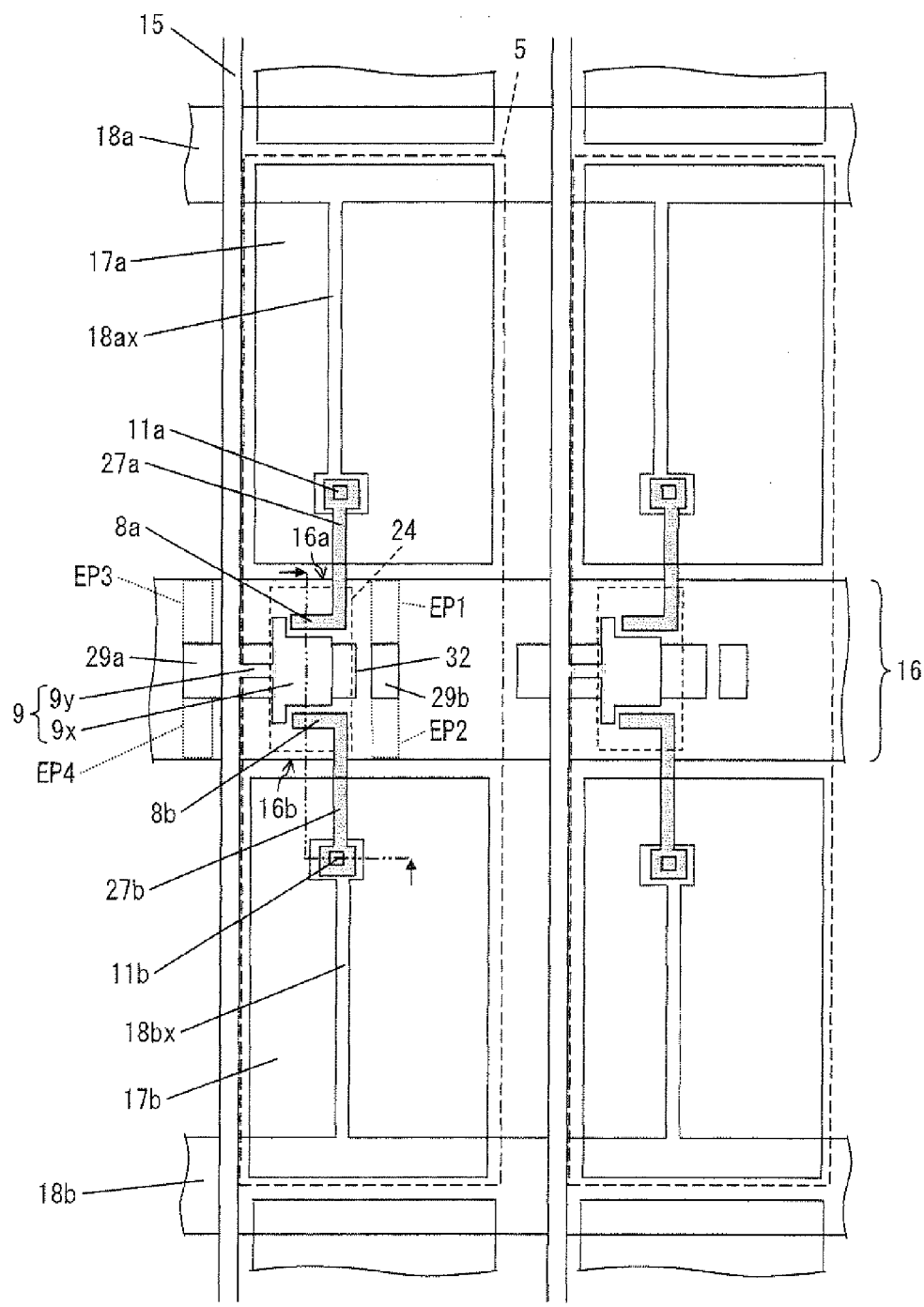
FIG. 37 is a plane drawing illustrating another modification example of the active matrix substrate of FIG. 21.

Moreover, the active matrix substrate illustrated in FIG. 21 may also be configured as shown in FIG. 37: the opening is divided into two and the bridging electrode 32 is provided in a gap between these openings 29a and 29b. With this, a state of alignment can be determined with use of two edges of the opening which are provided on the scanning signal line. Further, it is naturally possible to add, to the configuration of FIG. 37, (i) the configuration of partially bulging parts of the first opening 29a which parts overlap their respective one and the other of regions adjacent to the connecting electrode 9y or (ii) the configuration of providing the notch sections in their respective end portions (EP1-EP4) of the first and second scanning signal electrodes 16a and 16b.

The aforementioned active matrix substrate is configured such that each retention capacitor is provided by a pixel electrode, a retention capacitor wire, and an insulating film provided therebetween. However, a configuration of the retention capacitor is not limited to this. For example, the present active matrix substrate may also be configured such that an on-retention capacitor electrode connected to the drain electrode of a transistor and to the pixel electrode is provided on the retention capacitor wire, and this on-retention capacitor electrode, the retention capacitor wire, and an insulating film provided therebetween form the retention capacitor.

In the present invention, an extending direction of the data signal lines is defined as a column direction, and an extending direction of the scanning signal lines is defined as a row direction. However, this is just for convenience in explanation. For example, for a liquid crystal display in which a screen is rotatable by 90', the above definition is applied to a case where a rotation angle is 0°. On the other hand, in a case where a rotation angle is 90°, it goes without saying that an extending direction of the data signal lines is defined as a row direction, and an extending direction of the scanning signal lines is defined as a column direction.

In the present embodiment, the present liquid crystal display unit and liquid crystal display device are arranged as below.

Figure 12:
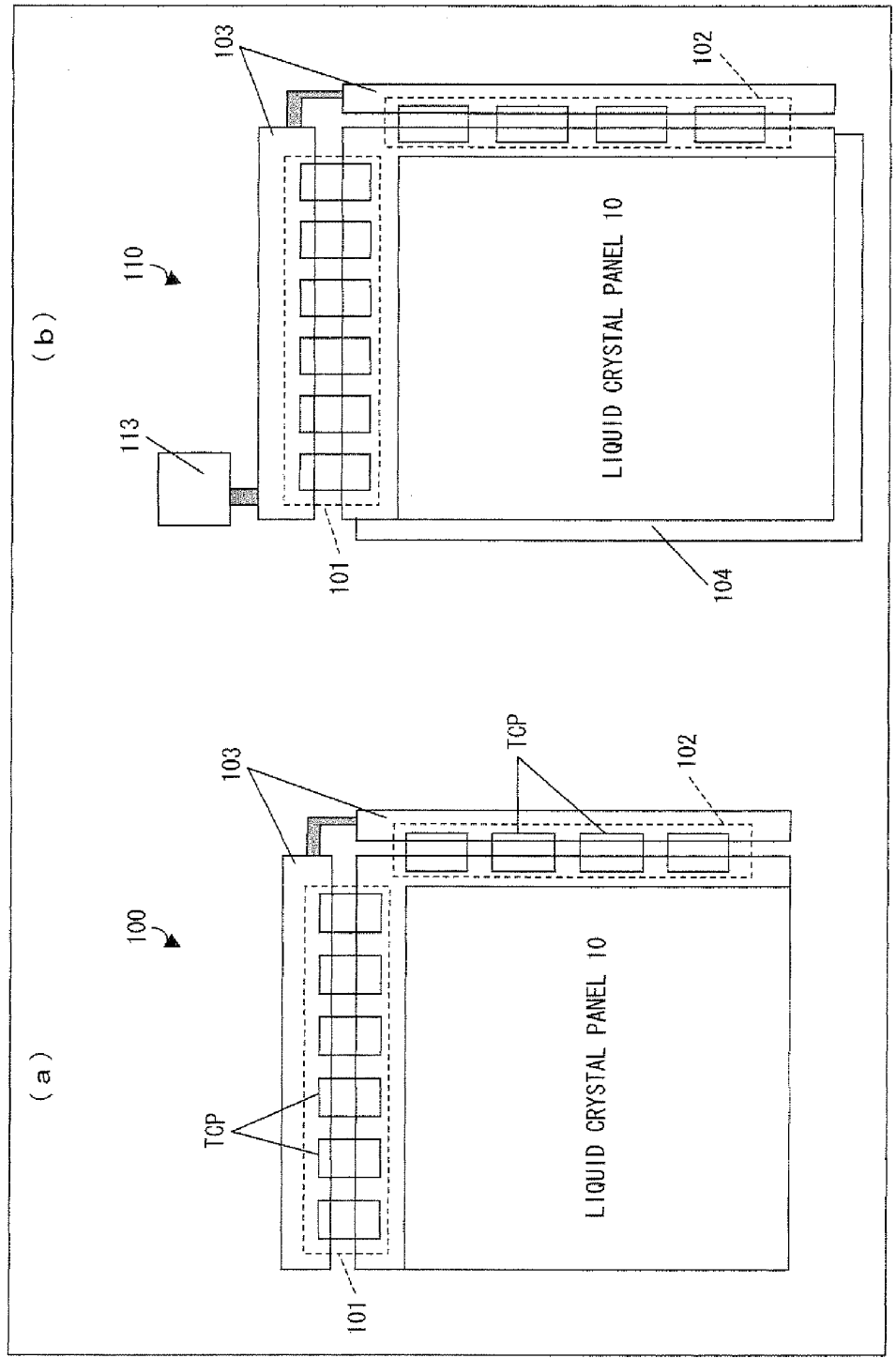
FIG. 12 is a drawing schematically illustrating a device including an active matrix substrate of the present invention. (a) of FIG. 12 schematically illustrates a configuration of a liquid crystal display unit of the present invention. (b) of FIG. 12 schematically illustrates a configuration of a liquid crystal display device of the present invention.
Figure 18:
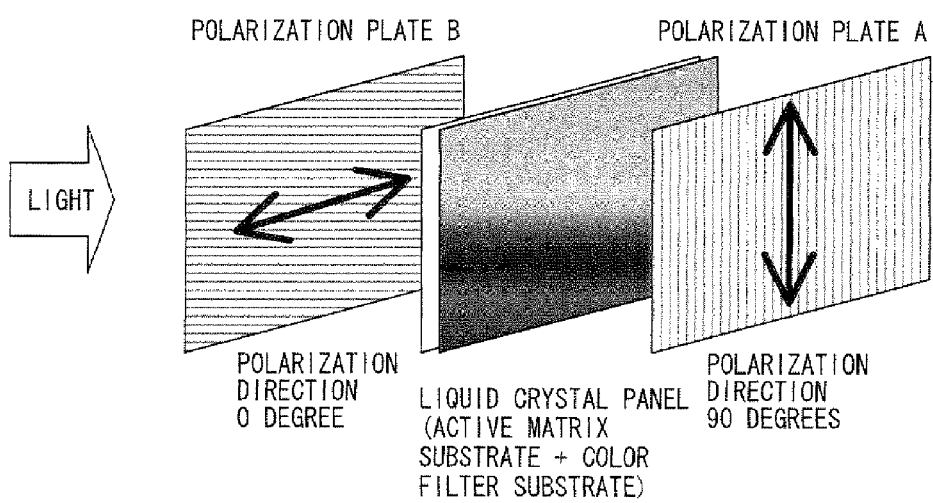
FIG. 18 is a drawing schematically illustrating how to attach a polarization plate to a liquid crystal panel of the present invention.

That is, as shown in FIG. 18, to either side of a liquid crystal panel, two polarization plates A and B are combined so that polarization axes of the polarization plates A and B intersect at right angles to each other. Furthermore, an optical compensation sheet or the like may be laminated on the polarization plate if necessary. Furthermore, an optical compensation sheet or the like may be laminated on the polarization plate if necessary. Next, as shown in FIG. 12 (a), drivers (a gate driver 102 and a source driver 101) are connected. The following description explains a connection by a TCP (Tape Career Package) method as one example. First, an ACF (Anisotropic Conductive Film) is temporarily pressed on a terminal section of the liquid crystal panel. Next, a TCP in which the drivers are loaded is punched out from a carrier tape. The TCP is aligned to a panel terminal electrode, and is heated and finally pressed. Thereafter, a circuit substrate 103 (PWB: Printed wiring board) for connecting the drivers TCP together and an input terminal of the TCP are connected together with the ACF. With this, a liquid crystal display unit 100 is provided.

Thereafter, as shown in FIG. 12 (b), a display control circuit 113 is connected to the drivers (101 and 102) of the liquid crystal display unit via the circuit board 103. By integrating the liquid crystal display unit and the display control circuit 113 with an illumination device (backlight unit) 104, a liquid crystal display device 110 is provided.

Figure 13:
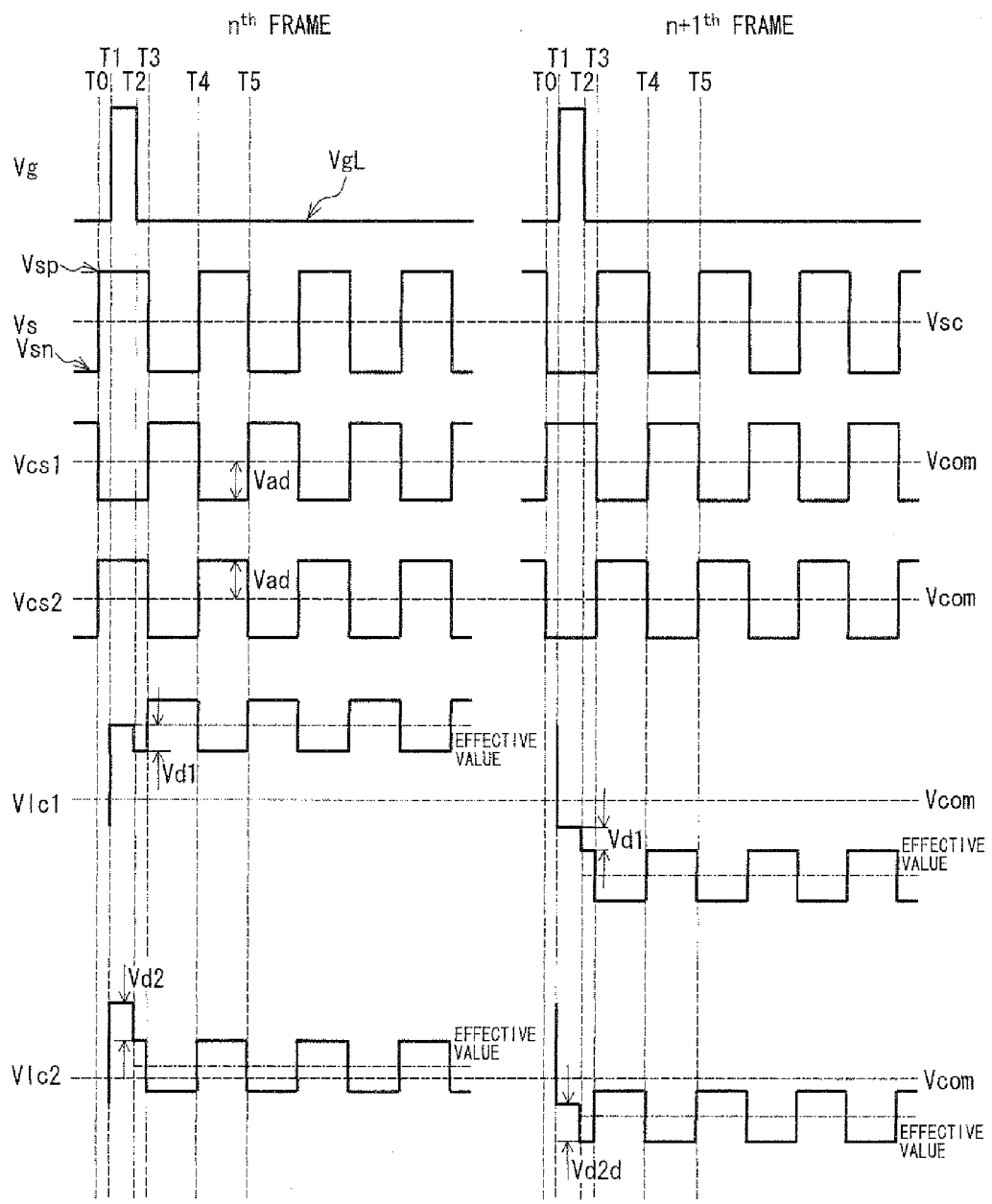
FIG. 13 is a timing chart illustrating a method for driving a liquid crystal display device of the present invention.

FIG. 13 is a timing chart showing operation of each section in the present liquid crystal display. It should be noted that Vg is a voltage of the scanning signal line 16, Vs is a voltage (source voltage) of the data signal line 15, Vcs1 is a voltage of the first retention capacity wire 18a, Vcs2 is a voltage of the second retention capacity wire 18b, Vlc1 is a voltage of a first pixel electrode 17a, and Vlc2 is a voltage of the second pixel electrode 17b. In a liquid crystal display device, an AC driving, such as a frame inversion driving, a line inversion driving, or a dot inversion driving is generally performed so that liquid crystals are not polarized. That is, a source voltage (Vsp) of a positive polarity with respect to the median Vsc of the source voltage in the nth frame is supplied, a source voltage (Vsn) of a negative polarity with respect to Vsc is supplied in the next (n+1)th frame is supplied, and further the dot inversion driving is performed for each frame. Further, the voltage of the first retention capacitor wire 18a and the second retention capacitor wire 18b are amplified with an amplitude voltage Vad, and their phases are shifted by 180°. That is, the voltages of the first and second retention capacitor wires 18a and 18b are controlled so that Vcs 1 is "H" and Vc2 is "L" immediately after Vg is "L" (the TFTs 12a and 12b are switched OFF) at T2.

Figure 14:
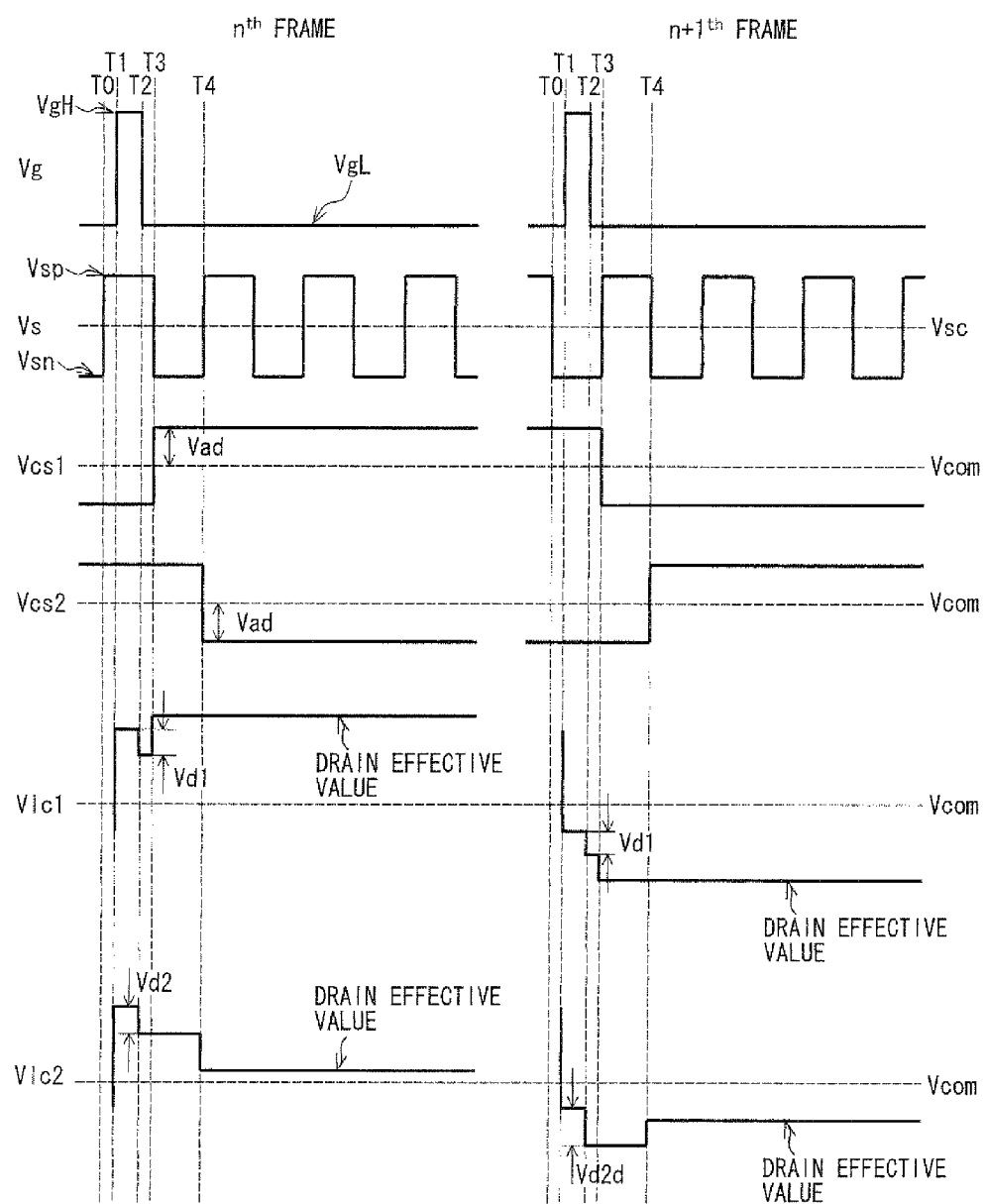
FIG. 14 is a timing chart illustrating another method for driving a liquid crystal display device of the present invention.

Furthermore, as shown in FIG. 14, the Vcs 1 can be a waveform which remains "High" (or "Low") at T3 immediately after Vg becomes "L" at T2 (the TFTs 12a and 12b are OFF) and the Vcs2 can be a waveform which remains "Low" (or "High") at T4 followed by one horizontal period (1H) from T3. That is, potentials are controlled in such a manner that: Vcs1 is suddenly increased after each transistor is switched OFF and the sudden rise state is maintained in the frame, and Vcs2 is suddenly decreased after 1H period from the sudden rise of Vcs 1 and the sudden fall state is maintained in the frame; or the Vcs1 is suddenly decreased after each transistor is switched OFF and the sudden fall state is maintained in the frame, and the Vcs2 is suddenly increased after 1H period from the sudden fall of Vcs1 and the sudden rise state is maintained in the frame. Thus, waveform distortion of the Vcs1 and Vcs2 has less influence on drain effective potential, thereby being effective in reducing uneven luminance.

Further, in the present invention, an extending direction of the scanning signal lines is defined as a row direction, and an extending direction of the data signal lines is defined as a column direction. However, this is just for convenience in explanation. It goes without saying that an extending direction of the scanning signal lines may be defined as a column direction, and an extending direction of the data signal lines may be defined as a row direction. In this case, "row" and "column" are replaced with each other in the above explanation.

Figure 15:
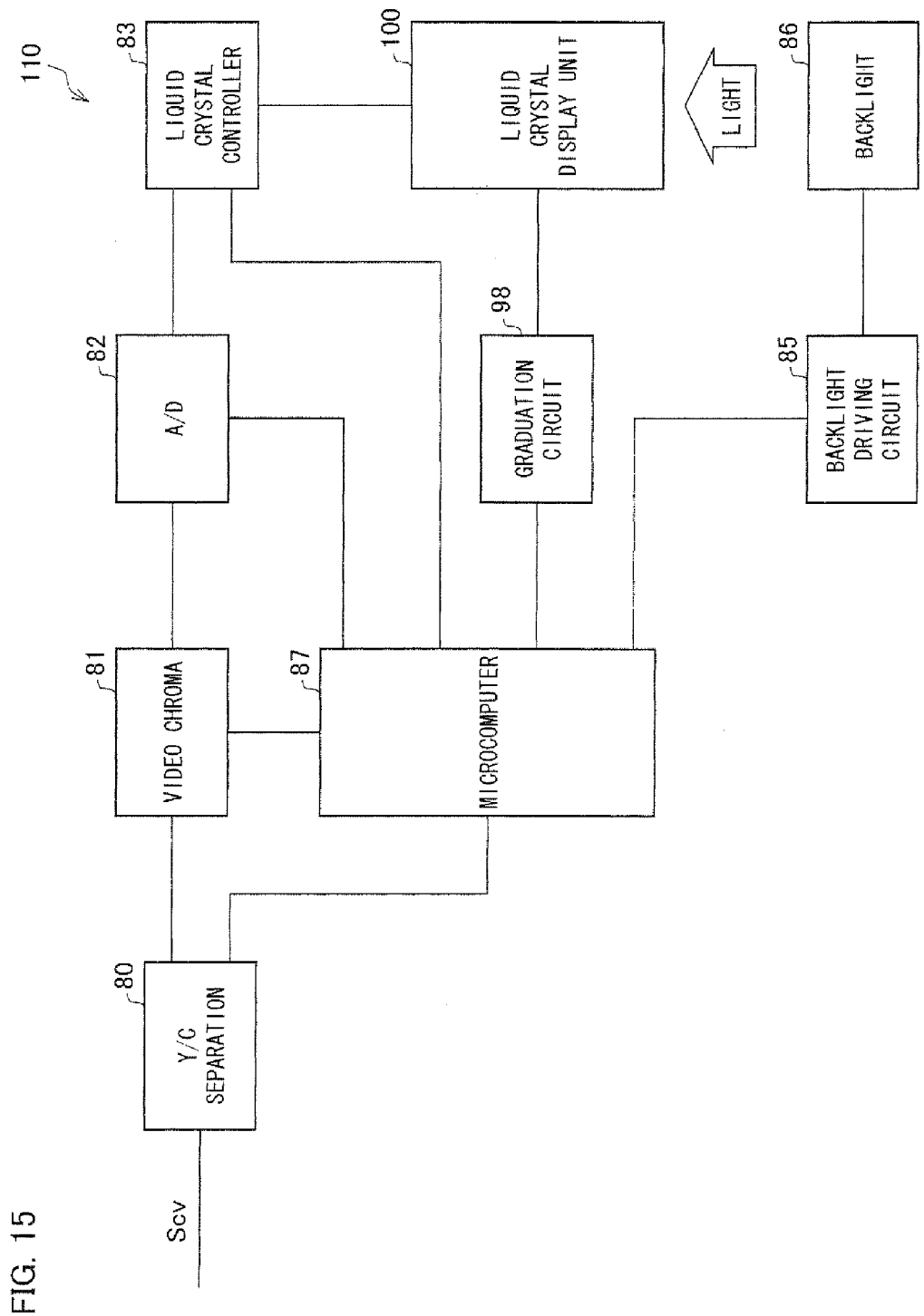
FIG. 15 is a block diagram explaining a function of a liquid crystal display device of the present invention.

Next, the following explains one example of configuration of the present liquid crystal display device in applying the liquid crystal display device to a television receiver. FIG. 15 is a block diagram showing a configuration of a liquid crystal display 110 for a television receiver. The liquid crystal display 110 includes a liquid crystal display unit 100, a Y/C separation circuit 80, a video chroma circuit 81, an A/D converter 82, a liquid crystal controller 83, a backlight drive circuit 85, a backlight 86, a microcomputer 87, and a gradation circuit 98.

The liquid crystal display unit 100 includes a liquid crystal panel described in the aforementioned embodiments, and source and gate drivers for driving the liquid crystal panel.

In the liquid crystal display 110 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to an analog RGB signal corresponding to three fundamental colors of light in the video chroma circuit 81. Further, the analog RGB signal is converted to a digital RGB signal by the A/D converter 82. The digital RGB signal is inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

The digital RGB signal is inputted to the liquid crystal display unit 100 from the liquid crystal controller 83 with a timing signal in accordance with the aforementioned sync signals at a predetermined timing. Furthermore, in the gradation circuit 98, gradation voltages of three fundamental colors R, G, and B of color display are generated, and these gradation voltages are also supplied to the liquid crystal display unit 100. In the liquid crystal display unit 100, drive signals (e.g., data signals and scanning signals) are generated by the source and gate drivers inside the liquid crystal display unit 100 in accordance with the RGB signal, the timing signal, and the gradation voltages. A color image is displayed on a display section inside the liquid crystal display unit 100 in accordance with the drive signals. It should be noted that for displaying an image by the liquid crystal display unit 100, light needs to be irradiated from a rear of the liquid crystal display unit 100. In the liquid crystal display device 110, the backlight drive circuit 85 drives the backlight 86 under control by the microcomputer 87 and thereby light is irradiated on a back side of the present liquid crystal panel.

Control of the whole system, including the aforementioned processes is carried out by the microcomputer 87. As the video signal (complex color video signal) inputted from the outside, not only a video signal in accordance with television broadcast but also a video signal picked up by a camera or supplied via the Internet line is also usable. In the liquid crystal display device 110, image display in accordance with, various video signals can be performed.

Figure 16:
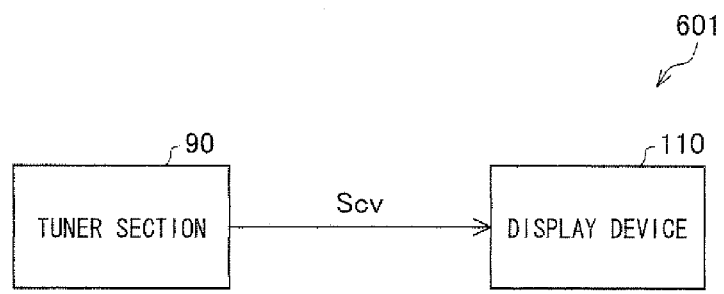
FIG. 16 is a block diagram explaining a function of a television receiver of the present invention.

In displaying an image by the liquid crystal display device 110 in accordance with television broadcast, a tuner section 90 is connected to the liquid crystal display device 110, as shown in FIG. 16. With this, a television receiver 601 of the present invention is configured. The tuner section 90 extracts a channel signal to be received from receiving waves (high-frequency signals) received by an antenna (not illustrated), and converts the channel signal to an intermediate frequency signal. The tuner section 90 detects the intermediate frequency signal, thereby extracting the complex color video signal Scv as the television signal. The complex color video signal Scv is inputted to the liquid crystal display device 110 as described above and an image is displayed by the liquid crystal display device 110 in accordance with the complex color video signal Scv.

Figure 17:
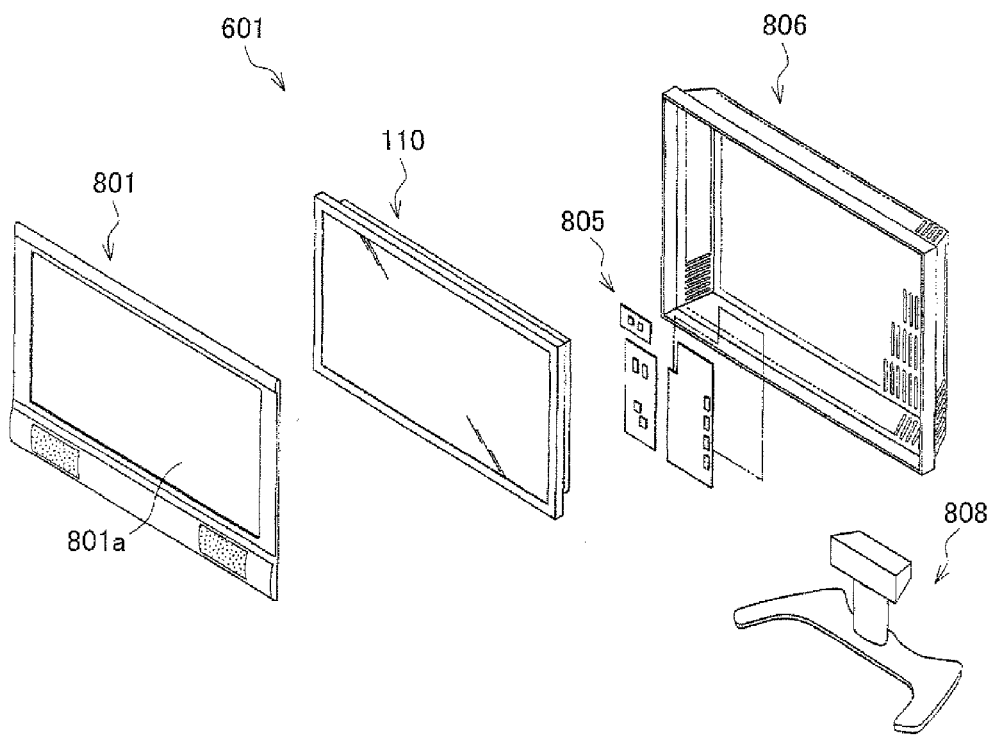
FIG. 17 is an exploded perspective view illustrating a configuration of a television receiver of the present invention.

FIG. 17 is an exploded perspective view showing one example of configuration of the present television receiver. As shown in FIG. 17, the present television receiver 601 includes, as constituent features thereof, a first housing 801 and a second housing 806 in addition to the liquid crystal display device 110. The liquid crystal display device 110 is arranged such that the first and second housings 801 and 806 hold the liquid crystal display 110 so as to wrap therein the liquid crystal display 110. The first housing 801 has an opening 801a for transmitting an image displayed on a display device 800. On the other hand, the second housing 806 covers a back side of the display device 800. The second housing 806 is provided with an operating circuit 805 for operating the display device 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A liquid crystal panel and a liquid crystal display of the present invention are suitable for a liquid crystal television, for example.

The invention claimed is:

1. An active matrix substrate, comprising:
scanning signal lines each extending in a row direction;
data signal lines each extending in a column direction; and
pixel regions each including a first transistor and a second transistor that are connected with a same data signal line, a first pixel electrode connected with the first transistor, and a second pixel electrode connected with the second transistor,
each of the scanning signal lines including an opening extending from outside a pixel region into the pixel region by crossing under a data signal line, and a first scanning electrode section and a second scanning electrode section that are provided on respective sides adjacent to the opening in such a manner that the first scanning electrode section and the second scanning electrode section face each other in a column direction with the opening therebetween,
a source electrode and a drain electrode of the first transistor being provided so as to overlap the first scanning electrode section and not to overlap a first end portion in the pixel region, and a source electrode and a drain electrode of the second transistor being provided so as to overlap the second scanning electrode section and not to overlap a second end portion in the pixel region, the first end portion being an end portion within the pixel region out of two end portions of the first scanning electrode section in a row direction and the second end portion being an end portion within the pixel region out of two end portions of the second scanning electrode section in a row direction, and wherein each of the first end portion and the second end portion includes a notch section.

2. The active matrix substrate as set forth in claim 1, wherein
a first drain drawing line is drawn from the drain electrode of the first transistor in such a manner as not to overlap the first end portion, and a second drain drawing line is drawn from the drain electrode of the second transistor in such a manner as not to overlap the second end portion, and
the first drain drawing line is connected with the first pixel electrode and the second drain drawing line is connected with the second pixel electrode.

3. The active matrix substrate as set forth in claim 2, further comprising:
a first retention capacitor line;
a first retention capacitor line extending section drawn from the first retention capacitor line;
a second retention capacitor line; and
a second retention capacitor line extending section drawn from the second retention capacitor line,
an end of the first retention capacitor line extending section overlapping an end of the first drain drawing line, and an end of the second retention capacitor line extending section overlapping an end of the second drain drawing line.

4. The active matrix substrate as set forth in claim 3, wherein
a contact hole connecting the first drain drawing line and the first pixel electrode is provided in such a manner as to overlap the end of the first drain drawing line, and a contact hole connecting the second drain drawing line and the second pixel electrode is provided in such a manner as to overlap the end of the second drain drawing line.

5. The active matrix substrate as set forth in claim 1, wherein the opening has a rectangular shape extending in a row direction.

6. The active matrix substrate as set forth in claim 1, wherein each of a third end portion and a fourth end portion includes a notch section, the third end portion being an end portion outside the pixel region out of two end portions of the first scanning electrode section in a row direction, and the fourth end portion being an end portion outside the pixel region out of two end portions of the second scanning electrode section in a row direction.

7. The active matrix substrate as set forth in claim 1, wherein an electrode extending from the data signal line serves as a source electrode that is common between the first transistor and the second transistor.

8. The active matrix substrate as set forth in claim 1, wherein
a first electrode serving as the source electrode of the first transistor, a second electrode serving as the source electrode of the second transistor, and a third electrode serving as a source electrode common between the first transistor and the second transistor extend from the data signal line in a row direction, and
the drain electrode of the first transistor is provided between the first electrode and the third electrode, and the drain electrode of the second transistor is provided between the third electrode and the second electrode.

9. The active matrix substrate as set forth in claim 1, wherein the scanning signal line extends in a row direction in such a manner as to cross the pixel region and the data signal line extends in a column direction in such a manner as to be along with an edge of the pixel region.

10. The active matrix substrate as set forth in claim 1, further comprising: a main electrode serving as a source electrode common between the first transistor and the second transistor; and a coupling electrode that couples the main electrode with the data signal line, the coupling electrode being positioned above the opening.

11. The active matrix substrate as set forth in claim 10, wherein a width of the coupling electrode in a column direction is smaller than a width of the main electrode in a column direction.

12. The active matrix substrate as set forth in claim 10, wherein the coupling electrode has a larger width in a row direction than in a column direction.

13. The active matrix substrate as set forth in claim 10, wherein the opening is designed such that at least a part of a portion overlapping one of two regions adjacent to the coupling electrode bulges in a column direction and at least a part of a portion overlapping the other of the two regions bulges in a column direction.

14. The active matrix substrate as set forth in claim 10, wherein a part of an edge of the main electrode which part is in contact with a channel region between the drain electrode of the first transistor and the main electrode is L-shaped, and a part of an edge of the main electrode which part is in contact with a channel region between the drain electrode of the second transistor and the main electrode is L-shaped.

15. A liquid crystal panel, comprising an active matrix substrate as set forth in claim 1.

16. The liquid crystal panel as set forth in claim 15, wherein a black matrix provided on a substrate facing the active matrix substrate overlaps the opening.

17. A liquid crystal display unit, comprising a liquid crystal panel as set forth in claim 15 and a driver.

18. A liquid crystal display device, comprising a liquid crystal display unit as set forth in claim 17 and an illuminating device.

19. A television receiver, comprising a liquid crystal display device as set forth in claim 18 and a tuner section for receiving television broadcasting.

20. An active matrix substrate, comprising:
scanning signal lines each extending in a row direction;
data signal lines each extending in a column direction; and
pixel regions each including a first transistor and a second transistor that are connected with a same data signal line, a first pixel electrode connected with the first transistor, and a second pixel electrode connected with the second transistor,
each of the scanning signal lines including
a first opening extending from outside a pixel region into the pixel region by crossing under a data signal line,
a second opening positioned side by side with respect to the first opening in a row direction,
a bridging electrode section positioned on a space between the first opening and the second opening, and
a first scanning electrode section and a second scanning electrode section that are provided on respective sides adjacent to a wormhole region consisting of the first opening, the second opening, and the bridging electrode section in such a manner that the first scanning electrode section and the second scanning electrode section sandwich the wormhole region in a column direction,
a source electrode and a drain electrode of the first transistor being provided so as to overlap the first scanning electrode section and not to overlap a first end portion in the pixel region, and a source electrode and a drain electrode of the second transistor being provided so as to overlap the second scanning electrode section and not to overlap a second end portion in the pixel region, the first end portion being an end portion within the pixel region out of two end portions of the first scanning electrode section in a row direction and the second end portion is a portion within the pixel region out of two end portions of the second scanning electrode section in a row direction.

21. The active matrix substrate as set forth in claim 20, wherein
a first drain drawing line is drawn from the drain electrode of the first transistor in such a manner as not to overlap the first end portion, and a second drain drawing line is drawn from the drain electrode of the second transistor in such a manner as not to overlap the second end portion, and
the first drain drawing line is connected with the first pixel electrode and the second drain drawing line is connected with the second pixel electrode.

22. The active matrix substrate as set forth in claim 21, further comprising:
a first retention capacitor line;
a first retention capacitor line extending section drawn from the first retention capacitor line;
a second retention capacitor line; and
a second retention capacitor line extending section drawn from the second retention capacitor line,
an end of the first retention capacitor line extending section overlapping an end of the first drain drawing line, and an end of the second retention capacitor line extending section overlapping an end of the second drain drawing line.

23. The active matrix substrate as set forth in claim 22, wherein a contact hole connecting the first drain drawing line and the first pixel electrode is provided in such a manner as to overlap the end of the first drain drawing line, and a contact hole connecting the second drain drawing line and the second pixel electrode is provided in such a manner as to overlap the end of the second drain drawing line.

24. The active matrix substrate as set forth in claim 20, wherein each of the first end portion, the second end portion, a third end portion, and a fourth end portion includes a notch section, the third end portion being an end portion outside the pixel region out of two end portions of the first scanning electrode section in a row direction, and the fourth end portion being an end portion outside the pixel region out of two end portions of the second scanning electrode section in a row direction.

25. The active matrix substrate as set forth in claim 20, wherein
a first electrode serving as a source electrode of the first transistor, a second electrode serving as a source electrode of the second transistor, and a third electrode serving as a source electrode common between the first transistor and the second transistor extend from the data signal line in a row direction, and
a drain electrode of the first transistor is provided between the first electrode and the third electrode, and a drain electrode of the second transistor is provided between the third electrode and the second electrode.

26. The active matrix substrate as set forth in claim 20, further comprising: a main electrode serving as a source electrode common between the first transistor and the second transistor; and a coupling electrode that couples the main electrode with the data signal line, the coupling electrode being positioned above the first opening.

27. The active matrix substrate as set forth in claim 26, wherein a width of the coupling electrode in a column direction is smaller than a width of the main electrode in a column direction.

28. The active matrix substrate as set forth in claim 26, wherein the coupling electrode has a larger width in a row direction than in a column direction.

29. The active matrix substrate as set forth in claim 26, wherein a part of an edge of the main electrode which part is in contact with a channel region between the drain electrode of the first transistor and the main electrode is L-shaped, and a part of an edge of the main electrode which part is in contact with a channel region between the drain electrode of the second transistor and the main electrode is L-shaped.

30. The active matrix substrate as set forth in claim 20, wherein the scanning signal line extends in a row direction in such a manner as to cross the pixel region and the data signal line extends in a column direction in such a manner as to be along with an edge of the pixel region.

31. A liquid crystal panel, comprising an active matrix substrate as set forth in claim 20.

32. A liquid crystal display unit, comprising a liquid crystal panel as set forth in claim 31 and a driver.

33. A liquid crystal display device, comprising a liquid crystal display unit as set forth in claim 32 and an illuminating device.

34. A television receiver, comprising a liquid crystal display device as set forth in claim 33 and a tuner section for receiving television broadcasting.

35. An active matrix substrate, comprising:
scanning signal lines each extending in a row direction;
data signal lines each extending in a column direction; and
pixel regions each including a first transistor and a second transistor that are connected with a same data signal line, a first pixel electrode connected with the first transistor, and a second pixel electrode connected with the second transistor,
each of the scanning signal lines including an opening extending from outside a pixel region into the pixel region by crossing under a data signal line, and a first scanning electrode section and a second scanning electrode section that are provided on respective sides adjacent to the opening in such a manner that the first scanning electrode section and the second scanning electrode section face each other in a column direction with the opening therebetween,
a first gate extending section being drawn from the first scanning electrode section in a direction away from the opening in the pixel region, and a second gate extending section being drawn from the second scanning electrode section in a direction away from the opening in the pixel region,
a source electrode and a drain electrode of the first transistor being provided so as to overlap the first gate extending section and not to overlap a first end portion, and a source electrode and a drain electrode of the second transistor being provided so as to overlap the second gate extending section and not to overlap a second end portion, the first end portion being an end portion within the pixel region out of two end portions of the first scanning electrode section in a row direction and the second end portion being an end portion within the pixel region out of two end portions of the second scanning electrode section in a row direction.

36. The active matrix substrate as set forth in claim 35 wherein the scanning signal line extends in a row direction in such a manner as to cross the pixel region and the data signal line extends in a column direction in such a manner as to be along with an edge of the pixel region.

37. A liquid crystal panel, comprising an active matrix substrate as set forth in claim 35.

38. The liquid crystal panel as set forth in claim 37, wherein a black matrix provided on a substrate facing the active matrix substrate overlaps the opening.

39. A liquid crystal display unit, comprising a liquid crystal panel as set forth in claim 37 and a driver.

40. A liquid crystal display device, comprising a liquid crystal display unit as set forth in claim 37 and an illuminating device.

41. A television receiver, comprising a liquid crystal display device as set forth in claim 40 and a tuner section for receiving television broadcasting.

42. An active matrix substrate, comprising:
scanning signal lines each extending in a row direction;
data signal lines each extending in a column direction; and
pixel regions each including a first transistor and a second transistor that are connected with a same data signal line, a first pixel electrode connected with the first transistor, and a second pixel electrode connected with the second transistor,
each of the scanning signal lines including
a first opening extending from outside a pixel region into the pixel region by crossing under a data signal line,
a second opening positioned side by side with respect to the first opening in a row direction,
a bridging electrode section positioned on a space between the first opening and the second opening, and
a first scanning electrode section and a second scanning electrode section that are provided on respective sides adjacent to a wormhole region consisting of the first opening, the second opening, and the bridging electrode section in such a manner that the first scanning electrode section and the second scanning electrode section sandwich the wormhole region in a column direction,
a first gate extending section being drawn from the first scanning electrode section in a direction away from the opening in the pixel region, and a second gate extending section being drawn from the second scanning electrode section in a direction away from the opening in the pixel region,
a source electrode and a drain electrode of the first transistor being provided so as to overlap the first gate extending section and not to overlap a first end portion, and a source electrode and a drain electrode of the second transistor being provided so as to overlap the second gate extending section and not to overlap a second end portion, the first end portion being an end portion within the pixel region out of two end portions of the first scanning electrode section in a row direction and the second end portion being an end portion within the pixel region out of two end portions of the second scanning electrode section in a row direction.

43. The active matrix substrate as set forth in claim 42, wherein the scanning signal line extends in a row direction in such a manner as to cross the pixel region and the data signal line extends in a column direction in such a manner as to be along with an edge of the pixel region.

44. A liquid crystal panel, comprising an active matrix substrate as set forth in claim 42.

45. A liquid crystal display unit, comprising a liquid crystal panel as set forth in claim 44 and a driver.

46. A liquid crystal display device, comprising a liquid crystal display unit as set forth in claim 45 and an illuminating device.

47. A television receiver, comprising a liquid crystal display device as set forth in claim 46 and a tuner section for receiving television broadcasting.

48. A method for producing an active matrix substrate including: scanning signal lines each extending in a row direction in such a manner as to cross pixel regions; and data signal lines each extending in a column direction in such a manner as to be along edges of pixel regions, each of the pixel regions including a first transistor and a second transistor that are connected with a same data signal line, a first pixel electrode connected with the first transistor, and a second pixel electrode connected with the second transistor, said method comprising the steps of:
forming a scanning signal line including (i) an opening extending from outside a pixel region into the pixel region and (ii) a first scanning electrode section and a second scanning electrode section that are provided on respective sides adjacent to the opening in such a manner that the first scanning electrode section and the second scanning electrode section face each other in a column direction with the opening therebetween;
forming (i) a first transistor whose gate electrode is a part of the first scanning electrode section, (ii) a second transistor whose gate electrode is a part of the second scanning electrode section, and (iii) the data signal line;
determining whether a short-circuit between the data signal line and the first scanning electrode section exists or not, and whether a short-circuit between the data signal line and the second scanning electrode section exists or not;
when a short-circuit between the data signal line and the first scanning electrode section exists, separating the first scanning electrode section including a short-circuited portion from the scanning signal line by cutting an electrode at a first end portion and a third end portion, and when a short-circuit between the data signal line and the second scanning electrode section exists, separating the second scanning electrode section including a short-circuited portion from the scanning signal line by cutting an electrode at a second end portion and a fourth end portion, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

49. A method for producing a liquid crystal panel including an active matrix substrate including: scanning signal lines each extending in a row direction in such a manner as to cross pixel regions; and data signal lines each extending in a column direction along edges of pixel regions, each of the pixel regions including a first transistor and a second transistor that are connected with a same data signal line, a first pixel electrode connected with the first transistor, and a second pixel electrode connected with the second transistor, said method comprising the steps of:
forming a scanning signal line including (i) an opening extending from outside a pixel region into the pixel region and (ii) a first scanning electrode section and a second scanning electrode section that are provided on respective sides adjacent to the opening in such a manner that the first scanning electrode section and the second scanning electrode section face each other in a column direction with the opening therebetween;

forming (i) a first transistor whose gate electrode is a part of the first scanning electrode section, (ii) a second transistor whose gate electrode is a part of the second scanning electrode section, and (iii) the data signal line;

determining whether a short-circuit between the data signal line and the first scanning electrode section exists or not, and whether a short-circuit between the data signal line and the second scanning electrode section exists or not;

when a short-circuit between the data signal line and the first scanning electrode section exists, separating the first scanning electrode section including a short-circuited portion from the scanning signal line by cutting an electrode at a first end portion and a third end portion, and when a short-circuit between the data signal line and the second scanning electrode section exists, separating the second scanning electrode section including a short-circuited portion from the scanning signal line by cutting an electrode at a second end portion and a fourth end portion, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

50. A method for producing an active matrix substrate including: scanning signal lines each extending in a row direction in such a manner as to cross pixel regions; and data signal lines each extending in a column direction in such a manner as to be along edges of pixel regions, each of the pixel regions including a first transistor and a second transistor that are connected with a same data signal line, a first pixel electrode connected with the first transistor, and a second pixel electrode connected with the second transistor, said method comprising the steps of:

forming a scanning signal line including (i) a first opening with a rectangular shape, extending from outside a pixel region into the pixel region, (ii) a second opening positioned side by side with respect to the first opening in a row direction, (iii) a bridging electrode section serving as a space between the first opening and the second opening, and (iv) a first scanning electrode section and a second scanning electrode section that are provided on respective sides adjacent to a wormhole region consisting of the first opening, the second opening, and the bridging electrode section in such a manner that the first scanning electrode section and the second scanning electrode section face each other in a column direction with the wormhole region therebetween;

forming (i) a first transistor whose gate electrode is a part of the first scanning electrode section, (ii) a second transistor whose gate electrode is a part of the second scanning electrode section, and (iii) the data signal line;

determining whether a short-circuit between the data signal line and the first scanning electrode section exists or not, and whether a short-circuit between the data signal line and the second scanning electrode section exists or not;

when a short-circuit between the data signal line and the first scanning electrode section exists, separating the first scanning electrode section including a short-circuited portion from the scanning signal line by cutting an electrode at a first end portion, a third end portion, and the bridging electrode section, and when a short-circuit between the data signal line and the second scanning electrode section exists, separating the second scanning electrode section including a short-circuited portion from the scanning signal line by cutting an electrode at a second end portion, a fourth end portion, and the bridging electrode section, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

51. A method for producing a liquid crystal panel including an active matrix substrate including: scanning signal lines each extending in a row direction in such a manner as to cross pixel regions; and data signal lines each extending in a column direction along edges of pixel regions, each of the pixel regions including a first transistor and a second transistor that are connected with a same data signal line, a first pixel electrode connected with the first transistor, and a second pixel electrode connected with the second transistor, said method comprising the steps of:

forming a scanning signal line including (i) a first opening with a rectangular shape, extending from outside a pixel region into the pixel region, (ii) a second opening positioned side by side with respect to the first opening in a row direction, (iii) a bridging electrode section serving as a space between the first opening and the second opening, and (iv) a first scanning electrode section and a second scanning electrode section that are provided on respective sides adjacent to a wormhole region consisting of the first opening, the second opening, and the bridging electrode section in such a manner that the first scanning electrode section and the second scanning electrode section face each other in a column direction with the wormhole region therebetween;

forming (i) a first transistor whose gate electrode is a part of the first scanning electrode section, (ii) a second transistor whose gate electrode is a part of the second scanning electrode section, and (iii) the data signal line;

determining whether a short-circuit between the data signal line and the first scanning electrode section exists or not, and whether a short-circuit between the data signal line and the second scanning electrode section exists or not;

when a short-circuit between the data signal line and the first scanning electrode section exists, separating the first scanning electrode section including a short-circuited portion from the scanning signal line by cutting an electrode at a first end portion, a third end portion, and the bridging electrode section, and when a short-circuit between the data signal line and the second scanning electrode section exists, separating the second scanning electrode section including a short-circuited portion from the scanning signal line by cutting an electrode at a second end portion, a fourth end portion, and the bridging electrode section, the first end portion being an end portion within the pixel region out of two end portions of the first scanning electrode section in a row direction, the third end portion being an end portion outside the pixel region out of the two end portions of the first scanning electrode section in a row direction, the second end portion being an end portion within the pixel region out of two end portions of the second scanning electrode section in a row direction, and the fourth end portion being an end portion outside the pixel region out of the two end portions of the second scanning electrode section in a row direction.

52. The method as set forth in claim 51, wherein two edges of the first opening along a column direction are used for alignment of a layer.